(12) United States Patent
Leiss et al.

(10) Patent No.: US 12,479,883 B2
(45) Date of Patent: Nov. 25, 2025

(54) METHODS OF REDUCING THE ENZYMATIC HYDROLYSIS ACTIVITY RATE IN A COMPOSITION OBTAINED FROM A PURIFICATION PLATFORM

(71) Applicants: Genentech, Inc., South San Francisco, CA (US); Hoffmann-La Roche Inc., Little Falls, NJ (US)

(72) Inventors: Michael Leiss, Schlehdorf (DE); Christian Meyer, Starnberg (DE); Alexandra Thomas Morris, Pacifica, CA (US); Bernhard Spensberger, Eberfing (DE); Yinges Yigzaw, San Ramon, CA (US); Franziska Edelmann, Wolfratshausen (DE); Roberto Falkenstein, Munich (DE); Tobias Graf, Penzberg (DE); Jie Gu, Thousand Oaks, CA (US); Jeevan Prabhakar, San Francisco, CA (US)

(73) Assignees: Genentech, Inc., South San Francisco, CA (US); Hoffmann-La Roche Inc., Little Falls, NJ (US)

( * ) Notice: Subject to any disclaimer, the term of this patent is extended or adjusted under 35 U.S.C. 154(b) by 796 days.

(21) Appl. No.: 17/517,531

(22) Filed: Nov. 2, 2021

(65) Prior Publication Data

US 2022/0194980 A1  Jun. 23, 2022

Related U.S. Application Data

(63) Continuation of application No. PCT/US2020/031164, filed on May 1, 2020.
(Continued)

(51) Int. Cl.
C07K 1/22 (2006.01)
A61K 39/395 (2006.01)
(Continued)

(52) U.S. Cl.
CPC .......... *C07K 1/22* (2013.01); *A61K 39/39591* (2013.01); *B01D 15/327* (2013.01);
(Continued)

(58) Field of Classification Search
CPC . C07K 1/22; C07K 1/165; C07K 1/20; C07K 1/34; C07K 1/36; C07K 16/00;
(Continued)

(56) References Cited

U.S. PATENT DOCUMENTS 4,676,980 A  6/1987 Segal
4,816,567 A  3/1989 Cabilly
(Continued)

FOREIGN PATENT DOCUMENTS

EP  0404097 A2  12/1990
WO  199311161 A1  6/1993
(Continued)

OTHER PUBLICATIONS

Arnold, "Fluid Purification Using Charge-Modified Depth Filtration Media", 2005, BioProcess International, p. 44-49. (Year: 2005).*
(Continued)

*Primary Examiner* — Kathryn Elizabeth Limbaugh
(74) *Attorney, Agent, or Firm* — Morrison & Foerster LLP

(57) ABSTRACT

The present disclosure provides purification platforms comprising a depth filter step and/or a hydrophobic interaction chromatography (HIC) step. Also disclosed herein are methods of using the purification platforms described herein and compositions obtained therefrom, such as pharmaceutical compositions.

18 Claims, 22 Drawing Sheets

Related U.S. Application Data

(60) Provisional application No. 62/961,609, filed on Jan. 15, 2020, provisional application No. 62/843,261, filed on May 3, 2019.

(51) Int. Cl.
  *B01D 15/32* (2006.01)
  *B01D 15/36* (2006.01)
  *B01D 15/38* (2006.01)
  *B01D 39/16* (2006.01)
  *B01D 39/20* (2006.01)
  *B01D 61/14* (2006.01)
  *C07K 1/16* (2006.01)
  *C07K 1/20* (2006.01)
  *C07K 1/34* (2006.01)
  *C07K 1/36* (2006.01)

(52) U.S. Cl.
  CPC ....... *B01D 15/362* (2013.01); *B01D 15/3809* (2013.01); *B01D 15/3847* (2013.01); *B01D 39/1623* (2013.01); *B01D 39/2068* (2013.01); *B01D 61/145* (2013.01); *C07K 1/165* (2013.01); *C07K 1/20* (2013.01); *C07K 1/34* (2013.01); *C07K 1/36* (2013.01); *B01D 61/147* (2013.01); *B01D 2239/0618* (2013.01); *B01D 2315/16* (2013.01)

(58) Field of Classification Search
  CPC ............... C07K 16/22; C07K 2317/10; C07K 2317/24; A61K 39/39591; A61K 39/395; A61K 39/505; B01D 15/327; B01D 15/362; B01D 15/3809; B01D 15/3847; B01D 39/1623; B01D 39/2086; B01D 61/145; B01D 61/147; B01D 2239/0618; B01D 2315/16
  See application file for complete search history.

(56) References Cited

U.S. PATENT DOCUMENTS

| | | | |
|---|---|---|---|
| 4,882,013 | A | 11/1989 | Turner et al. |
| 5,591,828 | A | 1/1997 | Bosslet |
| 5,731,168 | A | 3/1998 | Carter |
| 9,249,182 | B2 | 2/2016 | Herigstad |
| 10,342,876 | B2 | 7/2019 | Bak et al. |
| 11,518,781 | B2 | 12/2022 | Koehnlein |
| 2008/0069820 | A1 | 3/2008 | Fuh |
| 2011/0207196 | A1 | 8/2011 | Koehler |
| 2013/0090389 | A1 | 4/2013 | Vitins et al. |
| 2014/0010820 | A1 | 1/2014 | Wang et al. |
| 2014/0309403 | A1 | 10/2014 | Brown et al. |
| 2016/0176921 | A1* | 6/2016 | Rajendran ............... C07K 16/18 530/387.3 |
| 2016/0272674 | A1 | 9/2016 | Althouse et al. |
| 2017/0073396 | A1 | 3/2017 | Bataille |
| 2017/0189536 | A1* | 7/2017 | Connolly ............... A61K 47/26 |
| 2018/0360856 | A1 | 12/2018 | Holmes et al. |
| 2018/0369258 | A1 | 12/2018 | Holmes et al. |
| 2022/0135620 | A1 | 5/2022 | Seay et al. |
| 2022/0194980 | A1 | 6/2022 | Leiss et al. |
| 2023/0047100 | A1 | 2/2023 | Arcadu et al. |
| 2023/0049176 | A1 | 2/2023 | Pompiati |

FOREIGN PATENT DOCUMENTS

| | | |
|---|---|---|
| WO | 199850431 A2 | 11/1998 |
| WO | 199850431 A3 | 1/1999 |
| WO | 200177342 A1 | 10/2001 |
| WO | 2003100080 A2 | 12/2003 |
| WO | 2006044532 A1 | 4/2006 |
| WO | 2008024715 A2 | 2/2008 |
| WO | 2008024715 A3 | 11/2008 |
| WO | 2009080251 A1 | 7/2009 |
| WO | 2009080252 A1 | 7/2009 |
| WO | 2009080253 A1 | 7/2009 |
| WO | 2009089004 A1 | 7/2009 |
| WO | 2010048192 A2 | 4/2010 |
| WO | 2010048192 A3 | 6/2010 |
| WO | 2010112193 A1 | 10/2010 |
| WO | 2010115589 A1 | 10/2010 |
| WO | 2010136172 A1 | 12/2010 |
| WO | 2010145792 A1 | 12/2010 |
| WO | 2011034605 A2 | 3/2011 |
| WO | 2011034605 A3 | 8/2011 |
| WO | 2011150110 A1 | 12/2011 |
| WO | 2013009491 A2 | 1/2013 |
| WO | 2013026831 A1 | 2/2013 |
| WO | 2013028330 A2 | 2/2013 |
| WO | 2013028330 A3 | 8/2013 |
| WO | 2013177115 A2 | 11/2013 |
| WO | 2014004281 A1 | 1/2014 |
| WO | 2013177115 A3 | 2/2014 |
| WO | 2015023468 A1 | 2/2015 |
| WO | 2015031899 A1 | 3/2015 |
| WO | 2015077605 A1 | 5/2015 |
| WO | 2015095539 A1 | 6/2015 |
| WO | 2015150447 A1 | 10/2015 |
| WO | 2015198320 A1 | 12/2015 |
| WO | 2016016299 A1 | 2/2016 |
| WO | 2016106291 A1 | 6/2016 |
| WO | 2016172485 A2 | 10/2016 |
| WO | 2016172485 A3 | 12/2016 |
| WO | 2017027861 A1 | 2/2017 |
| WO | 2017031476 A2 | 2/2017 |
| WO | 2017095062 A1 | 6/2017 |
| WO | 2017218977 A2 | 12/2017 |
| WO | 2017218977 A3 | 1/2018 |
| WO | 2018035025 A1 | 2/2018 |
| WO | 2018170488 A1 | 9/2018 |
| WO | 2018200430 A1 | 11/2018 |
| WO | 2019191416 A1 | 10/2019 |
| WO | 2020006266 A1 | 1/2020 |
| WO | 2020023566 A1 | 1/2020 |
| WO | 2020159838 A1 | 8/2020 |
| WO | 2020200980 A1 | 10/2020 |
| WO | 2021144422 A1 | 7/2021 |
| WO | 2022094116 A1 | 5/2022 |

OTHER PUBLICATIONS

Al-Lazikani, B. et al. (1997). "Standard Conformations for the Canonical Structures of Immunoglobulins," J. Mol. Biol. 273:927-948.

Charlton, H.R. (Jan. 1, 1999). "Characterisation of a Generic Monoclorial Antibody Harvesting System for Adsorption of DNA by Depth Filters and Various Membranes," Bioseparation 8:281-291, 27 pages.

Chiu, J. et al. (May 2017). "Knockout of a Difficult-To-Remove CHO Host Cell Protein, Lipoprotein Lipase, For Improved Polysorbate Stability in Monoclonal Antibody Formulations: CHO LPL Knockout and Polysorbate Degradation," Biotechnology and Bioengineering 114(5):1006-1015, 22 pages.

Chothia, C. et al. (1987). "Canonical Structures for the Hypervariable Regions of Immunoglobulins," J. Mol. Biol. 196:901-917.

Chothia, C. et al. (Dec. 1989). "Conformations of Immunoglobulin Hypervariable Regions," Nature 342(6252):877-883.

Chothia, C. et al. (Dec. 5, 1985). "Domain Association in Immunoglobulin Molecules. The Packing of Variable Domains," J. Mol. Biol. 186(3):651-663.

Hall, T. et al. (May 2006, e-pub. Apr. 5, 2016). "Polysorbates 20 and 80 Degradation by Group XV Lysosomal Phospholipase A2 Isomer XI in, Monoclonal Antibody Formulations," Journal of Pharmaceutical Sciences 105(5):1633-1642.

Hollinger, P. et al. (Jul. 1993). "Diabodies: Small Bivalent and Bispecific Antibody Fragments," Proc. Natl. Acad. Sci. USA 90:6444-6448.

(56) References Cited

OTHER PUBLICATIONS

International Preliminary Report on Patentability, issued Nov. 2, 2021, for PCT Application No. PCT/US2020/031164, filed May 1, 2020, 9 pages.

International Search Report and Written Opinion, mailed Jul. 17, 2020, for PCT Application No. PCT/US2020/031164, filed May 1, 2020, 17 pages.

Invitation to Pay Additional Fees, mailed Feb. 10, 2022, for PCT Application No. PCT/US2021/057100, filed Oct. 28, 2021, 21 pages.

Jones, P. et al. (May 29, 1986). "Replacing the Complementarity-Determining Regions in a Human Antibody With Those From a Mouse," Nature 321:522-525.

Kabat, E.A. et al. (1991). Sequences of Proteins of Immunological Interest, 5th ed., Public Health Service, National Institutes of Health, Bethesda, MD. TOC, 21 pages.

Liu, H. et al. (Sep./Oct. 2010). "Recovery and Purification Process Development for Monoclonal Antibody Production," mAbs 2(5): 480-499.

Marichal-Gallardo, P.A. et al. (2012, e-pub. Jun. 26, 2012). "State-Of-The-Art in Downstream Processing of Monoclonal Antibodies: Process Trends in Design and Validation," Biotechnology Progress 28(4):899-916.

Morrison, S.C. et al. (Nov. 1984). "Chimeric Human Antibody Molecules: Mouse Antigen-Binding Domains With Human Constant Region Domains," Proc. Natl. Acad. Sci. USA 81:6851-6855.

Nguyen, H.C. et al. (May 11, 2018). "Improved HCP Reduction Using a New, All-Synthetic Depth Filtration Media Within an Antibody Purification Process," Biotechnology Journal 14(1):1700771, 11 pages.

Plückthun, A. (1994). "Antibodies from *Escherichia coli*," in Chapter 11 the Pharmacology of Monoclonal Antibodies, vol. 113, Rosenburg and Moore eds., Springer-Verlag, New York, pp. 269-315, 48 pages.

Presta, L.G. (1992). "Antibody Engineering," Current Opinion in Structural Biology, 2:593-596.

Riechmann, L. et al. (Mar. 24, 1988). "Reshaping Human Antibodies for Therapy," Nature 332:323-327.

Yigzaw, Y. et al. (2006, e-pub. Jan. 1, 2006). "Exploitation of the Adsorptive Properties of Depth, Filters for Host Cell Protein Removal During Monoclonal Antibody Purification," Biotechnology Progress 22(1):288-296.

Yu, D. et al. (Jun. 11, 2019). "Control of Antibody High and Low Molecular Weight Species by Depth Filtration-Based Cell Culture Harvesting," Biotechnology and Bioengineering 116(10):2610-2620.

Zhou, J.X. et al. (Oct. 1, 2008). "Implementation of Advanced Technologies in Commercial Monoclonal Antibody Production," Biotechnology Journal 3(9-10):1185-1200.

Atwell, S. et al. (1997). "Stable Heterodimers From Remodeling the Domain Interface of a Homodimer Using a Phage Display Library," J. Mol. Biol. 270 (1):26-35.

Brennan, M. et al. (Jul. 5, 1985). "Preparation of Bispecific Antibodies by Chemical Recombination of Monoclonal Immunoglobulin G1 Fragments," Science 229:81-83.

Chadd, H.E. et al. (2001). "Therapeutic Antibody Expression Technology," Curr. Opin. Biotechnol 12:188-194.

Giese, G. et al. (2018, e-pub. Nov. 29, 2017). "Bispecific Antibody Process Development: Assembly and Purification of Knob and Hole Bispecific Antibodies," Biotechnol. Prog. 34(2):397-404. Abstract Only, 3 pages.

Gruber, M. et al. (1994). "Efficient Tumor Cell Lysis Mediated by a Bispecific Single Chain Antibody Expressed in *Escherichia coli*," J. Immunol. 152:5368-5374.

Holliger, P. et al. (Sep. 2005, e-pub. Sep. 7, 2005) "Engineered Antibody Fragments and the Rise of Single Domains," Nat. Biotechnol. 23(9):1126-1136.

International Preliminary Report on Patentability, issued Jul. 19, 2022, for PCT Application No. PCT/EP2021/050809, filed Jan. 15, 2021, 8 pages.

International Search Report and Written Opinion, mailed Mar. 31, 2022 for PCT Application No. PCT/US2021/057100, filed Oct. 28, 2021, 24 pages.

Klein, C. et al. (Jun. 10, 2016, e-pub. Jul. 11, 2016). "The Use of CrossMab Technology for the Generation of Bi- and Multispecific Antibodies," MABS 8(6):1010-1020.

Kostelny, S.A. et al. (Mar. 1, 1992). "Formation of a Bispecific Antibody by the Use of Leucine Zippers," J. Immunol. 148(5):1547-1553.

Merchant, A. M. et al. (Jul. 1998). "An Efficient Route to Human Bispecific IgG," Nature Biotechnology 16:677-681.

Milstein, C. et al. (Oct. 6, 1983). "Hybrid Hybridomas and Their Use in Immunohistochemistry," Nature 305:537-540.

Onur, A. et al. (Sep. 12, 2018). "Multi-Layer Filters: Adsorption and Filtration Mechanisms for Improved Separation," Frontiers in Chemistry 6(417):1-11.

Ridgway, J.B.B. et al. (1996). "'Knobs-Into-Holes' Engineering of Antibody CH3 Domains for Heavy Chain Heterodimerization," Protein Engineering 9(7):617-621.

Schaefer, W. et al. (Jul. 5, 2011, e-pub. Jun. 20, 2011). "Immunoglobulin Domain Crossover as a Generic Approach for the Production of Bispecific IgG Antibodies," Proc. Natl. Acad. Sci. U.S.A. 108(27):11187-11192.

Singh, N. et al. (2017, e-pub. Jan. 12, 2017). "Development of Adsorptive Hybrid Filters to Enable Two-Step Purification of Biologics," MABS 9(2):350-364.

Spiess, C. et al. (2015, e-pub. Jan. 27, 2015). "Alternative Molecular Formats and Therapeutic Applications for Bispecific Antibodies," Mol. Immunol. 67:95-106.

Tutt, A. et al. (Jul. 1, 1991). "Trispecific F(ab')3 Derivatives that use Cooperative Signaling via the TCR/CD3 Complex and CD2 to Activate and Redirect Resting Cytotoxic T Cells," J. Immunol. 147(1):60-69.

U.S. Appl. No. 17/767,842, Davies et al, filed Apr. 8, 2022. (Copy not submitted herewith pursuant to the waiver of 37 C.F.R. § 1.98(a)(2)(iii) issued by the Office on Sep. 21, 2004).

Van Dijk, M.A. et al. (Aug. 2001). "Human Antibodies as Next Generation Therapeutics," Curr. Opin. Che. Biology 5(4):368-374.

Amara, J. et al. (Sep. 2016). "Novel Synthetic Adsorptive Depth Filter Media for CHO Harvest Clarification," Merck Poster, 1 page.

Anonymous (Jun. 2018). Millstak+® HC Pro Data Sheet, Merck, 5 pages.

European Office Action, dated May 17, 2023, for European Patent Application No. 21701079.2, 6 pages.

International Preliminary Report on Patentability, issued May 2, 2023, for PCT Application No. PCT/US2021/057100, filed Oct. 28, 2021, 14 pages.

Li, Y. (2017, e-pub. Apr. 13, 2017). "Effective Strategies for Host Cell Protein Clearance in Downstream Processing of Monoclonal Antibodies and Fc-Fusion Proteins," Protein Expression and Purification 134:96-103.

Lu, C. et al. (Jan./Feb. 2013, e-pub. Dec. 19, 2012). "Characterization of Monoclonal Antibody Size Variants Containing Extra Light Chains," Mabs 5(1):102-113.

Wang, S. et al. (2018, e-pub. Mar. 16, 2018). "Characterization of Product-Related Low Molecular Weight Impurities in Therapeutic Monoclonal Antibodies Using Hydrophilic Interaction Chromatography Coupled with Mass Spectrometry," J. of Pharmaceutical and Biomedical Analysis 154:468-475.

3M Purification Inc. (Oct. 22, 2020). "Polisher ST Scale-up Capsules: Scale-Up Capsules Installation and Operation Instruction," 34-8726-1126-3, Datasheet, 82 pages.

3M Purification Inc. (Sep. 2018). "Safety Information & Installation and Operation Instructions," 34-8723-4281-0 Datasheet, 80 pages.

Anonymous (Jun. 2020). "Prefilter Selection Guide," Merck KGaA MK_PG5156EM datasheet, 4 pages.

Follman, D.K. et al. (2004). "Factorial Screening of Antibody Purification Processing Using Three Chromatography Steps Without Protein A," Journal of Chromatography A 1024:79-85.

Ghose, S. et al. (2013). "Purification of Monoclonal Antibodies by Hydrophobic Interaction Chromatography Under No-Salt Conditions," Mabs. 5(5):795-800.

(56) References Cited

OTHER PUBLICATIONS

Kishore, R.S.K. et al. (Feb. 2011, e-pub Aug. 27, 2010) "Degradation of Polysorbates 20 and 80: Studies on Thermal Autoxidation and Hydrolysis," Journal of Pharmaceutical Sciences 100(2):721-731.

Pall Life Sciences Data Sheet (Sep. 2004). "Pall Mustang S Capsules," PELEH/02.SH/CS/09.2004 Datasheet, 4 pages.

International Search Report and Written Opinion, mailed Mar. 23, 2021, for PCT Application No. PCT/EP2021/050809, filed Jan. 15, 2021, 16 pages.

Xu, J. (2011). "Viral and Plasmid Transduction Systems: Methods to Modify Immune Cells for Cancer Immunotherapy," Nature Biotechnology, 29 pages.

GE Healthcare (Nov. 2013). "Instructions 71-7129-00 AF: Phenyl Sepharose High Performance; Butyl Sepharose High Performance," 16 pages.

Tianjin, J. et al. (2018). "Research Progress in Purification Technology of Antibody Drugs in Process of Large-Scale Production," China Academic Journal 35(10):6-11. English Abstract, 6 pages.

Hester, J. et al. (Oct. 2020). "Streamlined Polishing and Viral Clearance: Using a New Hybrid, Biomimetic, Single-Use Anion Exchanger," BioProcess International 18(10):70-76.

Millistak+ ® HC Pro (Sep. 9, 2020). Millipore, With English Translation. 12 pages.

Extended European Search Report, dated Jun. 25, 2020, for European Patent Application No. 20151994.9, 9 pages.

\* cited by examiner

METHODS OF REDUCING THE ENZYMATIC HYDROLYSIS ACTIVITY RATE IN A COMPOSITION OBTAINED FROM A PURIFICATION PLATFORM

CROSS-REFERENCE TO RELATED APPLICATIONS

This application is a continuation of International Application No. PCT/US2020/031164, filed on May 1, 2020, which claims priority benefit to U.S. Provisional Patent Application No. 62/961,609, filed on Jan. 15, 2020, and U.S. Provisional Patent Application No. 62/843,261, filed on May 3, 2019, the disclosure of each of which is hereby incorporated by reference in its entirety.

TECHNICAL FIELD

The present disclosure provides purification platforms comprising a depth filtration step and/or a hydrophobic interaction chromatography (HIC) step. Also disclosed herein are methods of using the purification platforms described herein and compositions obtained therefrom.

BACKGROUND

Biotherapeutic products, such as antibodies, produced from host cell cultures require purification to remove host cell proteins and other impurities that may impact, e.g., product quality and therapeutic efficacy. Current purification methods may not remove all host cell proteins and impurities, including host cell hydrolytic enzymes. Host cell proteins and impurities remaining with the purification target can thus impact the purification target itself as well as other additives, e.g., components added for formulation purposes, such as surfactants. Accordingly, there is a need for improved methods for purifying biotherapeutic products produced from host cell cultures for pharmaceutical use.

All references cited herein, including patent applications and publications, are incorporated by reference in their entirety.

BRIEF SUMMARY

In one aspect, provided is a method of reducing an enzymatic hydrolysis activity rate of a composition obtained from a purification platform, the method comprising subjecting a sample to the purification platform comprising: (a) a capture step; and (b) a depth filtration step, thereby reducing the enzymatic hydrolysis activity rate of the composition as compared to purification of the sample using the same purification platform without the depth filtration step.

In some embodiments, the enzymatic hydrolysis activity rate is an enzymatic polysorbate hydrolysis activity rate. In some embodiments, the relative reduction of the enzymatic hydrolysis activity rate of the composition, as compared to purification of the sample using the same purification platform without the depth filtration step, is at least about 20%.

In another aspect, provided is a method of reducing the level of one or more hydrolytic enzymes in a composition obtained from a purification platform, the method comprising subjecting a sample to the purification platform comprising: (a) a capture step; and (b) a depth filtration step, thereby reducing the level of the hydrolytic enzyme in the composition as compared to purification of the sample using the same purification platform without the depth filtration step. In some embodiments, the one or more hydrolytic enzymes are capable of hydrolyzing a polysorbate. In some embodiments, the relative reduction of the level of one or more hydrolytic enzymes in the composition, as compared to purification of the sample using the same purification platform without the depth filtration step, is at least about 20%.

In another aspect, provided is a method for reducing degradation of a polysorbate in a composition obtained from a purification platform, the method comprising subjecting a sample to the purification platform comprising: (a) a capture step; and (b) a depth filtration step, thereby reducing degradation of the polysorbate in the composition as compared to purification of the sample using the same purification platform without the depth filtration step. In some embodiments, the relative reduction of degradation of the polysorbate in the composition, as compared to purification of the sample using the same purification platform without the depth filtration step, is at least about 5%.

In some embodiments, the purification platform is for purification of a target from the sample, wherein the sample comprises the target and one or more host cell impurities. In some embodiments, the target comprises a polypeptide. In some embodiments, the host cell impurity is a host cell protein.

In some embodiments, the depth filtration step is performed prior to the capture step, or the depth filtration step is performed after the capture step.

In some embodiments, the depth filtration step comprises processing via a depth filter. In some embodiments, the depth filter comprises a substrate comprising one or more of a diatomaceous earth composition, a silica composition, a cellulose fiber, a polymeric fiber, a cohesive resin, and an ash composition. In some embodiments, at least a portion of the substrate of the depth filter comprises a surface modification. In some embodiments, the surface modification is one or more of a quaternary amine surface modification, a cationic surface modification, and an anionic surface modification. In some embodiments, the depth filter is selected from the group consisting of an EMPHAZE™ depth filter, a XOSP depth filter, a PDD1 depth filter, a ZETA PLUS™ 120ZA depth filter, and a ZETA PLUS™ 120ZB depth filter.

In some embodiments, the capture step comprises processing via affinity chromatography. In some embodiments, the affinity chromatography is selected from the group consisting of a protein A chromatography, a protein G chromatography, a protein A/G chromatography, a protein L chromatography, a FcXL chromatography, a protein XL chromatography, a kappa chromatography, and a kappaXL chromatography.

In some embodiments, the purification platform further comprises a virus inactivation step, wherein the virus inactivation step is performed after the capture step. In some embodiments, the depth filtration step is performed after the virus inactivation step.

In some embodiments, the purification platform further comprises another depth filtration step performed prior to the capture step.

In some embodiments, the purification platform further comprises one or more purification steps, and wherein the one or more purification steps is performed after the capture step, the depth filtration step, and, if present, the virus inactivation step. In some embodiments, the one or more purification steps comprise polypeptide purification steps. In some embodiments, the purification platform further comprises another depth filtration step performed prior to, in between, or after the one or more purification steps.

In some embodiments, the purification platform further comprises an ultrafiltration/diafiltration (UFDF) step, and wherein the UFDF step is performed after the one or more purification steps. In some embodiments, the purification platform further comprises another depth filtration step performed prior to or after the UFDF step.

In some embodiments, the purification platform further comprises a hydrophobic interaction chromatography (HIC) purification step. In some embodiments, the HIC purification step is performed prior to, in between, or after the one or more purification steps, if present. In some embodiments, the HIC purification step is performed after the one or more purification steps and prior to the UFDF step, if present.

In some embodiments, the purification platform further comprises a pH hold step, wherein the pH hold step is performed after the one or more purification steps, if present, and prior to the UFDF step.

In some embodiments, the purification platform further comprises a virus filtration step, wherein the virus filtration step is performed after the pH hold step and prior to the UFDF step. In some embodiments, the virus filtration step comprises processing via a virus filter.

In some embodiments, the HIC purification step comprises processing via a HIC filter.

In some embodiments, the one or more purification steps each independently comprise processing via a chromatography selected from the group consisting of: ion exchange chromatography, anion exchange chromatography, cation exchange chromatography, a hydrophobic charge induction chromatography, a ceramic hydroxyapatite chromatography, and a multimodal chromatography. In some embodiments, the one or more purification steps each independently comprise processing via a chromatography selected from the group consisting of: DEAE, DMAE, TMAE, QAE, SPSFF, SPXL, QSFF, MEP-Hypercel™, Capto MMC, and Capto Adhere.

In another aspect, provided is a method of reducing an enzymatic hydrolysis activity rate of a composition obtained from a purification platform, the method comprising subjecting a sample to the purification platform comprising, in the following order: (a) a capture step comprising processing via affinity chromatography; (b) a virus inactivation step; (c) a second polypeptide purification step; (d) a third polypeptide purification step; and (e) a ultrafiltration/diafiltration (UFDF) step, wherein the purification platform further comprises a depth filtration step performed at one or more of the following: (i) prior to the capture step; (ii) after the capture step and prior to the virus inactivation step; (iii) after the virus inactivation step and prior to the second polypeptide purification step; (iv) after the second polypeptide purification step and prior to the third polypeptide purification step; or (v) after the third polypeptide purification step and prior to the ultrafiltration/diafiltration (UFDF) step; thereby reducing the enzymatic hydrolysis activity rate of the composition as compared to purification of the sample using the same purification platform without the depth filtration step.

In some embodiments, the purification platform further comprises, in the following order, a pH hold step and a virus filtration step performed after the third polypeptide purification step and prior to the UFDF step. In some embodiments, the virus filtration step comprises processing via a virus filter.

In some embodiments, the purification platform further comprises a hydrophobic interaction chromatography (HIC) purification step performed at one or more of the following: (i) after the third polypeptide purification step and prior to the pH hold step; (ii) after the pH hold step and prior to the virus filtration step; or (iii) after the virus filtration step and prior to the UFDF step.

In some embodiments, the method further comprises determining the enzymatic hydrolysis activity rate of the composition.

In some embodiments, the method further comprises determining the level of one or more hydrolytic enzymes in the composition.

In some embodiments, the composition comprises a polysorbate. In some embodiments, the polysorbate is selected from the group consisting of polysorbate 20, polysorbate 40, polysorbate 60, and polysorbate 80.

In some embodiments, the method further comprises comprising a sample processing step.

In some embodiments, the sample is, or is derived from, a cell culture sample. In some embodiments, the cell culture sample comprises a host cell, and wherein the host cell is a Chinese hamster ovary (CHO) cell or an *E. coli* cell. In some embodiments, the sample comprises a host cell or components originating therefrom. In some embodiments, the sample comprises one or more host cell proteins, and wherein one of the one or more host cell proteins is a hydrolytic enzyme.

In some embodiments, the hydrolytic enzyme is a lipase, an esterase, a thioesterase, a phospholipase, or a ceramidase.

In some embodiments, the sample comprises a target, and wherein the target is an antibody moiety. In some embodiments, the antibody moiety is a monoclonal antibody. In some embodiments, the antibody moiety is a human, humanized, or chimeric antibody.

In some embodiments, the antibody moiety is selected from the group consisting of an anti-CD20 antibody, an anti-CD40 antibody, an anti-HER2 antibody, an anti-IL6 antibody, an anti-IgE antibody, an anti-IL13 antibody, an anti-TIGIT antibody, an anti-PD-L1 antibody, an anti-VEGF-A antibody, an anti-VEGF-A/ANG2 antibody, an anti-CD79b antibody, an anti-ST2 antibody, an anti-factor D antibody, an anti-factor IX antibody, an anti-factor X antibody, an anti-abeta antibody, an anti-tau antibody, an anti-CEA antibody, an anti-CEA/CD3 antibody, an anti-CD20/CD3 antibody, an anti-FcRH5/CD3 antibody, an anti-Her2/CD3 antibody, an anti-FGFR1/KLB antibody, a FAP-4-1BBL fusion protein, a FAP-IL2v fusion protein, and a TYRP1 TCB antibody.

In some embodiments, the antibody moiety is selected from the group consisting of ocrelizumab, pertuzumab, trastuzumab, tocilizumab, faricimab, polatuzumab, gantenerumab, cibisatamab, crenezumab, mosunetuzumab, tiragolumab, bevacizumab, rituximab, atezolizumab, obinutuzumab, lampalizumab, lebrikizumab, omalizumab ranibizumab, emicizumab, selicrelumab, prasinezumab, R06874281, and R07122290.

In another aspect, provided is a pharmaceutical composition obtained from any one of the methods described herein.

In another aspect, provided is a formulated antibody moiety composition comprising a polysorbate, wherein the composition has a reduced polysorbate hydrolysis activity rate, and wherein the shelf-life of the composition is more than 24 months.

In another aspect, provided is a formulated antibody moiety composition comprising an antibody moiety and a polysorbate, wherein the composition has a reduced polysorbate hydrolysis activity rate, wherein the shelf-life of the composition is extended compared to the shelf-life indicated in documents filed with a health authority related to the formulated antibody moiety composition, and wherein the shelf-life is extended by at least 6 months compared to the shelf-life indicated in said documents.

In another aspect, provided is a formulated antibody moiety composition comprising an antibody moiety, wherein the formulated antibody moiety composition has a reduced degradation of polysorbate, wherein the degradation is reduced by at least about 20% compared to the degradation indicated in documents filed with a health authority related to the formulated antibody moiety composition.

In another aspect, provided is a formulated antibody moiety composition comprising an antibody moiety and a polysorbate, wherein the polysorbate is degraded during storage of the liquid composition by 20% or less per year.

In some embodiments, the antibody moiety of a formulated antibody moiety composition is a monoclonal antibody. In some embodiments, the antibody moiety of a formulated antibody moiety composition is a human, humanized, or chimeric antibody.

In some embodiments, the antibody moiety of a formulated antibody moiety composition is selected from the group consisting of an anti-CD20 antibody, an anti-CD40 antibody, an anti-HER2 antibody, an anti-IL6 antibody, an anti-IgE antibody, an anti-IL13 antibody, an anti-TIGIT antibody, an anti-PD-L1 antibody, an anti-VEGF-A antibody, an anti-VEGF-A/ANG2 antibody, an anti-CD79b antibody, an anti-ST2 antibody, an anti-factor D antibody, an anti-factor IX antibody, an anti-factor X antibody, an anti-abeta antibody, an anti-tau antibody, an anti-CEA antibody, an anti-CEA/CD3 antibody, an anti-CD20/CD3 antibody, an anti-FcRH5/CD3 antibody, an anti-Her2/CD3 antibody, an anti-FGFR1/KLB antibody, a FAP-4-1 BBL fusion protein, a FAP-IL2v fusion protein, and a TYRP1 TCB antibody.

In some embodiments, the antibody moiety of a formulated antibody moiety composition is selected from the group consisting of ocrelizumab, pertuzumab, trastuzumab, tocilizumab, faricimab, polatuzumab, gantenerumab, cibisatamab, crenezumab, mosunetuzumab, tiragolumab, bevacizumab, rituximab, atezolizumab, obinutuzumab, lampalizumab, lebrikizumab, omalizumab ranibizumab, emicizumab, selicrelumab, prasinezumab, RO6874281, and RO7122290.

In some embodiments, the polysorbate hydrolysis activity rate of a formulated antibody moiety composition is reduced by at least about 20%. In some embodiments, the polysorbate is selected from the group consisting of polysorbate 20, polysorbate 40, polysorbate 60, and polysorbate 80.

In another aspect, provided is a method of reducing an enzymatic hydrolysis activity rate of a composition obtained from a purification platform, the method comprising subjecting a sample to the purification platform comprising, in order: (a) a capture step comprising processing via affinity chromatography; and (b) a purification step comprising processing via a chromatography selected from the group consisting of a HIC, a cation exchange chromatography, and a multimodal chromatography, wherein the purification platform further comprises one or more depth filtration steps, wherein the one or more depth filtration steps are performed at any one or more of: prior to the capture step; after the capture step; or after the capture step and prior to the purification step, wherein each depth filtration step comprises processing via a depth filter, and wherein the depth filter comprises materials selected from the group consisting of: (i) a silica and a polyacrylic fiber; (ii) a hydrogel Q (quaternary amine)-functionalized non-woven media and a multi-zone microporous membrane; and (iii) cellulose fibers, diatomaceous earth, and perlite, thereby reducing the enzymatic hydrolysis activity rate of the composition as compared to purification of the sample using the same purification platform without the one or more depth filtration steps. In some embodiments, the enzymatic hydrolysis activity rate is an enzymatic polysorbate hydrolysis activity rate. In some embodiments, the relative reduction of the enzymatic hydrolysis activity rate of the composition, as compared to purification of the sample using the same purification platform without the depth filtration step, is at least about 20%.

In another aspect, provided is a method of reducing the level of one or more hydrolytic enzymes in a composition obtained from a purification platform, the method comprising subjecting a sample to the purification platform comprising, in order: (a) a capture step comprising processing via affinity chromatography; and (b) a purification step comprising processing via a chromatography selected from the group consisting of a HIC, a cation exchange chromatography, and a multimodal chromatography, wherein the purification platform further comprises one or more depth filtration steps, wherein the one or more depth filtration steps are performed at any one or more of: prior to the capture step; after the capture step and prior to the purification step; or after the purification step, wherein each depth filtration step comprises processing via a depth filter, and wherein the depth filter comprises materials selected from the group consisting of: (i) a silica and a polyacrylic fiber; (ii) a hydrogel Q (quaternary amine)-functionalized non-woven media and a multi-zone microporous membrane; and (iii) cellulose fibers, diatomaceous earth, and perlite, thereby reducing the level of one or more hydrolytic enzymes in the composition as compared to purification of the sample using the same purification platform without the one or more depth filtration steps. In some embodiments, the one or more hydrolytic enzymes are capable of hydrolyzing a polysorbate. In some embodiments, the relative reduction of the level of one or more hydrolytic enzymes in the composition, as compared to purification of the sample using the same purification platform without the depth filtration step, is at least about 20%.

In another aspect, provided is a method of reducing degradation of a polysorbate in a composition obtained from a purification platform, the method comprising subjecting a sample to the purification platform comprising, in order: (a) a capture step comprising processing via affinity chromatography; and (b) a purification step comprising processing via a chromatography selected from the group consisting of a HIC, a cation exchange chromatography, and a multimodal chromatography, wherein the purification platform further comprises one or more depth filtration steps, wherein the one or more depth filtration steps are performed at any one or more of: prior to the capture step; after the capture step; or after the capture step and prior to the purification step, wherein each depth filtration step comprises processing via a depth filter, and wherein the depth filter comprises materials selected from the group consisting of: (i) a silica and a polyacrylic fiber; (ii) a hydrogel Q (quaternary amine)-functionalized non-woven media and a multi-zone microporous membrane; and (iii) cellulose fibers, diatomaceous earth, and perlite, thereby reducing degradation of a polysorbate in the composition as compared to purification of the sample using the same purification platform without the one or more depth filtration steps. In some embodiments, the relative reduction of degradation of the polysorbate in the composition, as compared to purification of the sample using the same purification platform without the depth filtration step, is at least about 5%.

In some embodiments, the depth filter comprising the silica and the polyacrylic fiber comprises a silica filter aid and a polyacrylic fiber pulp.

In some embodiments, depth filter comprising the hydrogel Q-functionalized non-woven media and the multi-zone microporous membrane comprises four layers comprising hydrogel Q-functionalized non-woven materials and a nine-zone microporous membrane.

In some embodiments, the depth filter comprising cellulose fibers, diatomaceous earth, and perlite comprises two layers, wherein each layer comprises a cellulose filter matrix, wherein the cellulose filter matrix is impregnated with a filter aid comprising one or more of diatomaceous earth or perlite, and wherein each layer further comprises a resin binder.

In some embodiments, the depth filter is selected based on the pH of the solution entering the depth filter. In some embodiments, the depth filter comprising the silica and the polyacrylic fiber is selected when the solution entering the depth filter is about 5 to about 6.5. In some embodiments, the depth filter comprising the hydrogel Q-functionalized non-woven media and the multi-zone microporous membrane is selected when the solution entering the depth filter is about 7 to about 8.5. In some embodiments, the method further comprises selecting the depth filter based on the pH of the solution entering the depth filter.

In some embodiments, the purification platform comprises, in order, a depth filtration step comprising processing via the depth filter comprising the hydrogel Q-functionalized non-woven media and a multi-zone microporous membrane, the capture step comprising processing via a protein A chromatography, and the purification step.

In some embodiments, the purification step comprises processing via the HIC. In some embodiments, the HIC is phenyl SEPHAROSE® fast flow chromatography.

In some embodiments, the purification step comprises processing via the cation exchange chromatography. In some embodiments, the cation exchange chromatography is POROS 50HS.

In some embodiments, the purification platform further comprises a second depth filtration step comprising processing via the depth filter comprising the silica and the polyacrylic fiber, and wherein the second depth filtration step occurs after the capture step and prior to the purification step.

In some embodiments, the purification step comprises processing via the multimodal chromatography. In some embodiments, the multimodal chromatography is Capto Adhere.

In some embodiments, the purification platform further comprises a second depth filtration step comprising processing via the depth filter comprising the hydrogel Q-functionalized non-woven media and a multi-zone microporous membrane, and wherein the second depth filtration step occurs after the capture step and prior to the purification step.

In some embodiments, the purification platform is for purification of a target from the sample, wherein the sample comprises the target and one or more host cell impurities. In some embodiments, the target comprises a polypeptide. In some embodiments, the host cell impurity is a host cell protein.

In some embodiments, the purification platform further comprises a virus inactivation step, wherein the virus inactivation step is performed after the capture step. In some embodiments, the one or more depth filtration steps are performed after the virus inactivation step.

In some embodiments, the purification platform further comprises an ultrafiltration/diafiltration (UFDF) step, and wherein the UFDF step is performed after the purification step.

In some embodiments, the method described herein further comprises determining the enzymatic hydrolysis activity rate of the composition.

In some embodiments, the method described herein further comprises determining the level of one or more hydrolytic enzymes in the composition.

In some embodiments, the composition comprises a polysorbate. In some embodiments, the polysorbate is selected from the group consisting of polysorbate 20, polysorbate 40, polysorbate 60, and polysorbate 80.

In some embodiments, the method described herein further comprises a sample processing step.

In some embodiments, the sample is, or is derived from, a cell culture sample. In some embodiments, the cell culture sample comprises a host cell, and wherein the host cell is a Chinese hamster ovary (CHO) cell or an *E. coli* cell. In some embodiments, the sample comprises a host cell or components originating therefrom.

In some embodiments, the sample comprises one or more host cell proteins, and wherein one of the one or more host cell proteins is a hydrolytic enzyme. In some embodiments, the hydrolytic enzyme is a lipase, an esterase, a thioesterase, a phospholipase, or a ceramidase. In some embodiments, the sample comprises a target, and wherein the target is an antibody moiety. In some embodiments, the antibody moiety is a monoclonal antibody. In some embodiments, the antibody moiety is a human, humanized, or chimeric antibody. In some embodiments, the antibody moiety is selected from the group consisting of an anti-CD20 antibody, an anti-CD40 antibody, an anti-HER2 antibody, an anti-IL6 antibody, an anti-IgE antibody, an anti-IL13 antibody, an anti-TIGIT antibody, an anti-PD-L1 antibody, an anti-VEGF-A antibody, an anti-VEGF-A/ANG2 antibody, an anti-CD79b antibody, an anti-ST2 antibody, an anti-factor D antibody, an anti-factor IX antibody, an anti-factor X antibody, an anti-abeta antibody, an anti-tau antibody, an anti-CEA antibody, an anti-CEA/CD3 antibody, an anti-CD20/CD3 antibody, an anti-FcRH5/CD3 antibody, an anti-Her2/CD3 antibody, an anti-FGFR1/KLB antibody, a FAP-4-1 BBL fusion protein, a FAP-IL2v fusion protein, and a TYRP1 TCB antibody. In some embodiments, the antibody moiety is selected from the group consisting of ocrelizumab, pertuzumab, trastuzumab, tocilizumab, faricimab, polatuzumab, gantenerumab, cibisatamab, crenezumab, mosunetuzumab, tiragolumab, bevacizumab, rituximab, atezolizumab, obinutuzumab, lampalizumab, lebrikizumab, omalizumab ranibizumab, emicizumab, selicrelumab, prasinezumab, R06874281, and R07122290.

In another aspect, provided is a pharmaceutical composition obtained from any of the methods described herein.

Those skilled in the art will recognize that several embodiments are possible within the scope and spirit of the disclosure of this application. The disclosure is illustrated further by the examples below, which are not to be construed as limiting the disclosure in scope or spirit to the specific procedures described therein.

BRIEF DESCRIPTION OF THE DRAWINGS

FIG. 18A shows results obtained from CF 238. FIG. 18B shows results obtained from CF 239.

DETAILED DESCRIPTION

Figure 1A:
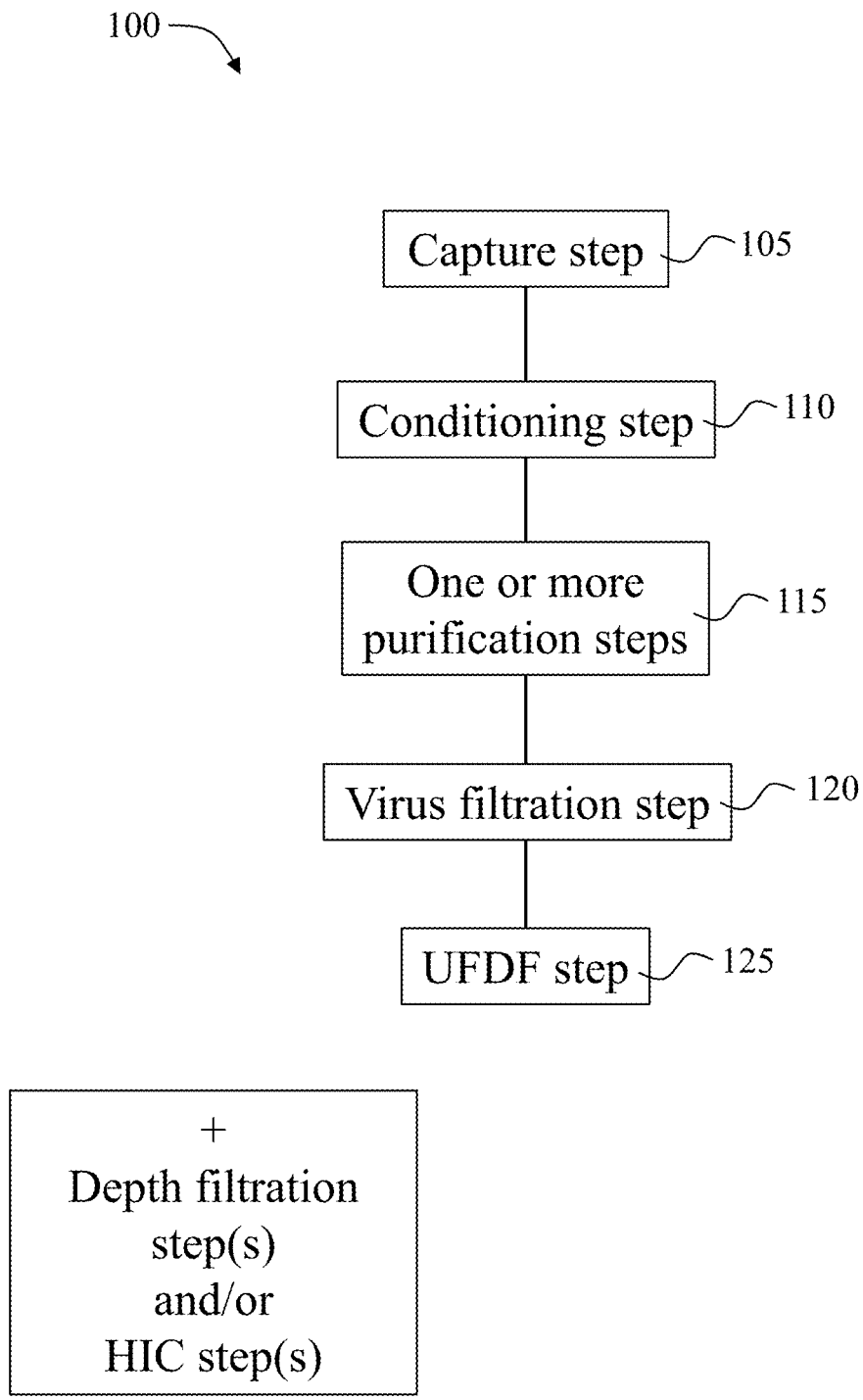
FIG. 1A shows exemplary steps of a purification platform 100.

The present application provides, in some aspects, methods for purifying a target from a sample comprising the target, the methods comprising subjecting the sample to a purification platform disclosed herein comprising one or more depth filter steps and/or one or more hydrophobic interaction chromatography (HIC) steps.

The present disclosure is based, in part, on the unexpected finding that a purification platform comprising one or more depth filter steps, such as a depth filter step performed on host cell culture fluid (HCCF) and/or on affinity chromatography eluate, reduces the enzymatic hydrolysis activity rate of a composition obtained therefrom. Additionally, the present disclosure is based, in part, on the unexpected finding that a purification platform comprising one or more HIC steps reduces the enzymatic hydrolysis activity rate of a composition obtained therefrom, and that a purification platform comprising both a depth filtration step and a HIC step may further reduce the enzymatic hydrolysis activity rate of a composition obtained therefrom.

It will also be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects.

Definitions

For purposes of interpreting this specification, the following definitions will apply and, whenever appropriate, terms used in the singular will also include the plural and vice versa. In the event that any definition set forth below conflicts with any document incorporated herein by reference, the definition set forth shall control.

The term "antibody moiety" includes full-length antibodies and antigen-binding fragments thereof. In some embodiments, a full-length antibody comprises two heavy chains and two light chains. The variable regions of the light and heavy chains are responsible for antigen binding. The variable regions in both chains generally contain three highly variable loops called the complementarity determining regions (CDRs) (light chain (LC) CDRs including LC-CDR1, LC-CDR2, and LC-CDR3, heavy chain (HC) CDRs including HC-CDR1, HC-CDR2, and HC-CDR3). CDR boundaries for the antibodies and antigen-binding fragments disclosed herein may be defined or identified by the conventions of Kabat, Chothia, or Al-Lazikani (Al-Lazikani 1997; Chothia 1985; Chothia 1987; Chothia 1989; Kabat 1987; Kabat 1991). The three CDRs of the heavy or light chains are interposed between flanking stretches known as framework regions (FRs), which are more highly conserved than the CDRs and form a scaffold to support the hypervariable loops. The constant regions of the heavy and light chains are not involved in antigen binding, but exhibit various effector functions. Antibodies are assigned to classes based on the amino acid sequence of the constant region of their heavy chain. The five major classes or isotypes of antibodies are IgA, IgD, IgE, IgG, and IgM, which are characterized by the presence of α, δ, ε, γ, and μ heavy chains, respectively. Several of the major antibody classes are divided into subclasses such as IgG1 (γ1 heavy chain), IgG2 (γ2 heavy chain), IgG3 (γ3 heavy chain), IgG4 (γ4 heavy chain), IgA1 (al heavy chain), or lgA2 (α2 heavy chain). In some embodiments, the antibody moiety is a chimeric antibody. In some embodiments, the antibody moiety is a semi-synthetic antibody. In some embodiments, the antibody moiety is a diabody. In some embodiments, the antibody moiety is a humanized antibody. In some embodiments, the antibody moiety is a multispecific antibody, such as a bispecific antibody. In some embodiments, the antibody moiety is linked to a fusion protein. In some embodiments the antibody moiety is linked to an immunostimulating protein, such as an interleukin. In some embodiments the antibody moiety is linked to a protein which facilitates the entry across the blood brain barrier.

The term "antigen-binding fragment" as used herein refers to an antibody fragment including, for example, a diabody, a Fab, a Fab', a F(ab')2, an Fv fragment, a disulfide stabilized Fv fragment (dsFv), a (dsFv)2, a bispecific dsFv (dsFv-dsFv'), a disulfide stabilized diabody (ds diabody), a single-chain antibody molecule (scFv), an scFv dimer (bivalent diabody), a multispecific antibody formed from a portion of an antibody comprising one or more CDRs, a camelized single domain antibody, a nanobody, a domain antibody, a bivalent domain antibody, or any other antibody fragment that binds to an antigen but does not comprise a complete antibody structure. An antigen-binding fragment is capable of binding to the same antigen to which the parent antibody or a parent antibody fragment (e.g., a parent scFv) binds. In some embodiments, an antigen-binding fragment may comprise one or more CDRs from a particular human antibody grafted to a framework region from one or more different human antibodies.

The term "chimeric antibodies" refer to antibodies in which a portion of the heavy and/or light chain is identical with or homologous to corresponding sequences in antibodies derived from a particular species or belonging to a particular antibody class or subclass, while the remainder of the chain(s) is identical with or homologous to corresponding sequences in antibodies derived from another species or belonging to another antibody class or subclass, as well as fragments of such antibodies, so long as they exhibit a biological activity of this invention (see U.S. Pat. No. 4,816,567; and Morrison et al., *Proc. Natl. Acad. Sci. USA*, 81:6851-6855 (1984)).

The term "multispecific antibodies" as used herein refer to monoclonal antibodies that have binding specificities for at least two different sites, i.e., different epitopes on different antigens or different epitopes on the same antigen. In certain aspects, the multispecific antibody has two binding specificities (bispecific antibody). In certain aspects, the multispecific antibody has three or more binding specificities. Multispecific antibodies may be prepared as full length antibodies or antibody fragments.

The term "semi-synthetic" in reference to an antibody or antibody moiety means that the antibody or antibody moiety has one or more naturally occurring sequences and one or more non-naturally occurring (i.e., synthetic) sequences.

"Fv" is the minimum antibody fragment which contains a complete antigen-recognition and -binding site. This fragment consists of a dimer of one heavy- and one light-chain variable region domain in tight, non-covalent association. From the folding of these two domains emanate six hypervariable loops (3 loops each from the heavy and light chain) that contribute the amino acid residues for antigen binding and confer antigen binding specificity to the antibody. However, even a single variable domain (or half of an Fv comprising only three CDRs specific for an antigen) has the ability to recognize and bind antigen, although at a lower affinity than the entire binding site.

"Single-chain Fv," also abbreviated as "sFv" or "scFv," are antibody fragments that comprise the $V_H$ and $V_L$ antibody domains connected into a single polypeptide chain. In some embodiments, the scFv polypeptide further comprises a polypeptide linker between the $V_H$ and $V_L$ domains which enables the scFv to form the desired structure for antigen binding. For a review of scFv, see Pluckthun in *The Pharmacology of Monoclonal Antibodies*, vol. 113, Rosenburg and Moore eds., Springer-Verlag, New York, pp. 269-315 (1994).

The term "diabodies" refers to small antibody fragments prepared by constructing scFv fragments (see preceding paragraph) typically with short linkers (such as about 5 to about 10 residues) between the $V_H$ and $V_L$ domains such that inter-chain but not intra-chain pairing of the V domains is achieved, resulting in a bivalent fragment, i.e., fragment having two antigen-binding sites. Bispecific diabodies are heterodimers of two "crossover" scFv fragments in which the $V_H$ and $V_L$ domains of the two antibodies are present on different polypeptide chains. Diabodies are described more fully in, for example, EP 404,097; WO 93/11161; and Hollinger et al., *Proc. Natl. Acad. Sci. USA*, 90:6444-6448 (1993).

"Humanized" forms of non-human (e.g., rodent) antibodies are chimeric antibodies that contain minimal sequence derived from the non-human antibody. For the most part, humanized antibodies are human immunoglobulins (recipient antibody) in which residues from a hypervariable region (HVR) of the recipient are replaced by residues from a hypervariable region of a non-human species (donor antibody) such as mouse, rat, rabbit or non-human primate having the desired antibody specificity, affinity, and capability. In some instances, framework region (FR) residues of the human immunoglobulin are replaced by corresponding non-human residues. Furthermore, humanized antibodies can comprise residues that are not found in the recipient antibody or in the donor antibody. These modifications are made to further refine antibody performance. In general, the humanized antibody will comprise substantially all of at least one, and typically two, variable domains, in which all or substantially all of the hypervariable loops correspond to those of a non-human immunoglobulin and all or substantially all of the FRs are those of a human immunoglobulin sequence. The humanized antibody optionally also will comprise at least a portion of an immunoglobulin constant region (Fc), typically that of a human immunoglobulin. For further details, see Jones et al., *Nature* 321:522-525 (1986); Riechmann et al., *Nature* 332:323-329 (1988); and Presta, *Curr. Op. Struct. Biol.* 2:593-596 (1992).

In some embodiments, the methods described herein comprise one or more depth filtration steps. A depth filtrations step is a chromatography technique comprising processing via a depth filter. In some embodiments, the depth filter comprises a porous filtration medium capable of retaining portions of a sample, such as cell components and debris, wherein filtration occurs, e.g., within the depth of the filter material. In some embodiments, the depth filter comprises synthetic material, non-synthetic material, or a combination thereof. In some embodiments, the depth filter comprises a substrate comprising one or more of a diatomaceous earth composition, a silica composition, a cellulose fiber, a polymeric fiber, a cohesive resin, and an ash composition. In some embodiments, at least a portion of the substrate of the depth filter comprises a surface modification. In some embodiments, the surface modification is one or more of a quaternary amine surface modification, a cationic surface modification, and an anionic surface modification. In some embodiments, the depth filter is selected from the group consisting of an EMPHAZE™ depth filter (such as an EMPHAZE™ AEX depth filter), a XOSP depth filter, a PDD1 depth filter, a ZETA PLUS™ 120ZA depth filter, and a ZETA PLUS™ 120ZB depth filter.

In some embodiments, the depth filter comprises cellulose fibers, diatomaceous earth, and perlite. In some embodiments, the depth filter comprises two layers, wherein each layer comprises a cellulose filter matrix, and wherein the cellulose filter matrix is impregnated with a filter aid comprising one or more of diatomaceous earth or perlite. In some embodiments, the depth filter comprises two layers, wherein each layer comprises a cellulose filter matrix, wherein the cellulose filter matrix is impregnated with a filter aid comprising one or more of diatomaceous earth or perlite, and wherein each layer further comprises a resin binder. In some embodiments, the depth filter is a PDD1 depth filter.

In some embodiments, the depth filter comprises a silica, such as a silica filter aid, and a polyacrylic fiber. In some embodiments, the depth filter comprises two layers of filter media, wherein a first layer comprises a silica, such as a silica filter aid, and a second layer comprises a polyacrylic fiber, such as a polyacrylic fiber pulp. In some embodiments, the depth filter is a depth filter comprising synthetic material and does not comprise diatomaceous earth and/or perlite. In some embodiments, the depth filter is a XOSP depth filter.

In some embodiments, the silica filter aid is a precipitated silica filter aid. In some embodiments, the filter aid is an aspect of the filter, such as a layer, that aids with performing the filter function. In some embodiments, the silica filter aid is a silica gel filter aid. In some embodiments, the silica filter aid has about 50% of silanols ionized at pH 7. In some embodiments, the silica filter aid is a silica gel filter aid, wherein about 50% of silanols of the silica filter aid are ionized at pH 7. In some embodiments, the silica filter aid is precipitated from silicas, such as SIPERNAT® (Evonik Industries AG), or silica gels, such as Kieseigel 60 (Merck KGaA). In some embodiments, the polyacrylic fiber is a non-woven polyacrylic fiber pulp. In some embodiments, the polyacrylic fiber is an electrospun polyacrylic nanofiber. In some embodiments, the degree of fibrillation of the polyacrylic fibers correlates with a Canadian Standard Freeness (CSF) from about 10 mL to about 800 mL. In some embodiments, the depth filter has a pore size of about 0.05 μm to about 0.2 such as about 0.1 In some embodiments, the depth filter has a surface area of about 0.1 $m^2$ to about 1.5 $m^2$, such as about 0.11 $m^2$, about 0.55 $m^2$, or about 1.1 $m^2$. In some embodiments, the depth filter does not comprise diatomaceous earth and/or perlite. In some embodiments, the depth filter comprises two layers of filter media, wherein a first layer comprises a silica filter aid having about 50% of silanols ionized at pH 7, and a second layer comprises a polyacrylic fiber pulp having a degree of fibrillation of the polyacrylic fibers correlating with a Canadian Standard Freeness (CSF) from about 10 mL to about 800 mL, and wherein the depth filter does not comprise diatomaceous earth.

In some embodiments, the depth filter comprises a hydrogel Q (quaternary amine)-functionalized non-woven material, and a multizone microporous membrane. In some embodiments, the depth filter comprises four layers comprising hydrogel Q-functionalized non-woven materials, and a nine-zone microporous membrane. In some embodiments, the non-woven material comprises polypropylene. In some embodiments, the depth filter is a depth filter comprising synthetic material and does not comprise diatomaceous earth and/or perlite. In some embodiments, the depth filter is an EMPHAZE™ AEX depth filter.

In some embodiments, the depth filter comprises multiple components or layers. In some embodiments, the depth filter comprises multiple layers comprising one or more layers comprising anion-exchange (AEX) functional polymers. In some embodiments, the layer comprising AEX functional polymers comprises a quaternary ammonium (Q), such as a Q functional hydrogel. In some embodiments, the layer comprising AEX functional polymers comprises a quaternary ammonium (Q) functional polymer associated with a non-woven article. In some embodiments, the layer comprising AEX functional polymers comprises a quaternary ammonium (Q) functional hydrogel covalently grafted to a fine-fiber polypropylene non-woven scaffold. In some embodiments, the depth filter comprises multiple layers comprising a layer comprising a multi-zone membrane comprising a nine-zone membrane with a pore size of about 0.05 μm to about 0.3 such as about 0.22 In some embodiments, the depth filter does not comprise diatomaceous earth.

In some embodiments, the methods described herein comprise one or more hydrophobic interaction chromatography (HIC) steps. A HIC step is a chromatography technique comprising processing via a HIC medium, such as a HIC filter or a HIC column. In some embodiments, the HIC medium comprises hydrophobic moieties comprising, e.g., methyl, ethyl, propyl, octyl, or phenyl groups. In some embodiments, the sample is applied to a HIC medium in a polar buffer. In some embodiments, the polypeptide is eluted from a HIC medium using a step-wise elution with an aqueous buffer with decreasing salt concentrations, increasing concentrations of detergent, and/or an adjusted pH.

In some embodiments, the methods described herein are capable of reducing an enzymatic hydrolysis activity rate of a composition obtained from a purification platform. In some embodiments, the enzymatic hydrolysis activity rate represents the activity rate of one or more hydrolytic enzymes, such as one or more different hydrolytic enzymes. In some embodiments, the enzymatic hydrolysis activity rate is a surrogate measurement of the activity of one or more enzymes in the composition. In some embodiments, the enzymatic hydrolysis activity rate is measured via a surrogate substrate. In some embodiments, the enzymatic hydrolysis activity rate is assessed by measuring the hydrolytic product of one or more hydrolytic enzymes.

The terms "comprising," "having," "containing," and "including," and other similar forms, and grammatical equivalents thereof, as used herein, are intended to be equivalent in meaning and to be open ended in that an item or items following any one of these words is not meant to be an exhaustive listing of such item or items, or meant to be limited to only the listed item or items. For example, an article "comprising" components A, B, and C can consist of (i.e., contain only) components A, B, and C, or can contain not only components A, B, and C but also one or more other components. As such, it is intended and understood that "comprises" and similar forms thereof, and grammatical equivalents thereof, include disclosure of embodiments of "consisting essentially of" or "consisting of."

Where a range of values is provided, it is understood that each intervening value, to the tenth of the unit of the lower limit, unless the context clearly dictates otherwise, between the upper and lower limit of that range and any other stated or intervening value in that stated range, is encompassed within the disclosure, subject to any specifically excluded limit in the stated range. Where the stated range includes one or both of the limits, ranges excluding either or both of those included limits are also included in the disclosure.

Reference to "about" a value or parameter herein includes (and describes) variations that are directed to that value or parameter per se. For example, description referring to "about X" includes description of "X."

As used herein, including in the appended claims, the singular forms "a," "or," and "the" include plural referents unless the context clearly dictates otherwise.

Purification Platforms

In some aspects of the present disclosure, there is provided a purification platform comprising a depth filtration step and/or a hydrophobic interaction chromatography (HIC) step. In some embodiments, the purification platform represents a workflow for purifying, to any degree, a target from a sample comprising the target. In some embodiments, the process workflow of a purification platform is the sequential order of steps involved in the purification of a target from a sample comprising the target.

For purposes of example and explanation of the disclosure herein, a sequence workflow of a portion of an exemplary purification platform 100 is illustrated in FIG. 1A. As shown in FIG. 1A, the purification platform 100 comprises sequential steps including, but not limited to, a capture step 105, a conditioning step 110, one or more purification steps 115, such as one or more polypeptide purification steps, a virus filtration step 120, and an ultrafiltration/diafiltration (UFDF) step 125. In some embodiments, the exemplary purification platform shown in FIG. 1A comprises one or more depth filtration steps. In some embodiments, the exemplary purification platform shown in FIG. 1A comprises a depth filtration step performed after a conditioning step 110 and prior to one or more purification steps. In some embodiments, the exemplary purification platform shown in FIG. 1A comprises a depth filtration step performed prior to a capture step 105. In some embodiments, the exemplary purification platform shown in FIG. 1A comprises one or more HIC steps. In some embodiments, the HIC step is performed after the one or more purification steps, after a pH hold step of a virus filtration step, and/or after a virus filtration step. In some embodiments, the exemplary purification platform shown in FIG. 1A comprises one or more depth filtration steps and one or more HIC steps.

One of ordinary skill in the art will readily understand that purification platforms described herein guide the workflow for purifying a target from a sample comprising the target, the components used to perform each step of the workflow of the purification platform, and the components and reagents used therein. In some instances of the present disclosure, descriptions of the purification platforms, and methods of use thereof, are provided in a modular manner. Such disclosure is not meant to limit the scope of the present application. The present disclosure encompasses any combinations and/or arrangements of purification platforms encompassed by the disclosure of individual components and/or steps thereof.

Depth Filtration Steps

In some aspects, the present disclosure provides a purification platform comprising a depth filtration step. As described herein, a depth filtration step can be placed at any of one or more positions within a purification platform. In some embodiments, the purification platform described herein comprises one or more depth filtration steps, such as any of 2, 3, 4, or 5 depth filtration steps, positioned at any stage of the process workflow. In some embodiments, wherein the purification platform comprises more than one depth filtration step, the depth filtration steps are not performed in direct sequential order, i.e., without some intervening step of the purification platform performed between the depth filtration steps. In some embodiments, wherein the purification platform comprises more than one depth filtration step, the depth filtration steps are the same. In some embodiments, wherein the purification platform comprises more than one depth filtration step, the depth filtration steps are different, e.g., comprise use of a different depth filter.

In some embodiments, wherein the purification platform comprises more than one depth filtration step, a first depth filtration step occurs prior to a capture step comprising processing via protein A chromatography, and a second depth filtration step occurs after the capture step and prior to a purification step.

In some embodiments, the depth filtration step comprises processing via a depth filter. In some embodiments, the depth filter is a depth filter comprising synthetic material. Depth filtration steps, including what is involved with the processing via a depth filter, are known in the art. See, e.g., Yigzaw et al., *Biotechnol Prog,* 22, 2006, and Liu et al., *mAbs,* 2, 2010, which are hereby incorporated by reference in their entirety. One of ordinary skill in the art will understand, e.g., components, conditions, and reagents involved with a depth filtration step.

In some embodiments, the methods described herein comprise one or more depth filtration steps each comprising processing via a depth filter, wherein the depth filter is selected based on the pH of the solution entering the depth filter. In some embodiments, the depth filter comprising a silica and a polyacrylic fiber, such as a XOSP depth filter, is selected when the solution entering the depth filter is about 5 to about 6.5. In some embodiments, the depth filter comprising a silica and a polyacrylic fiber, such as a XOSP depth filter, is selected when the solution entering the depth filter is about 6.5 or less, such as about any of 6.4 or less, 6.3 or less, 6.2 or less, 6.1 or less, 6.0 or less, 5.9 or less, 5.8 or less, 5.7 or less, 5.6 or less, 5.5 or less, 5.4 or less, 5.3 or less, 5.2 or less, 5.1 or less, or 5.0 or less. In some embodiments, the depth filter comprising a silica and a polyacrylic fiber, such as a XOSP depth filter, is selected when the solution entering the depth filter is about any of 6.5, 6.4, 6.3, 6.2, 6.1, 6.0, 5.9, 5.8, 5.7, 5.6, 5.5, 5.4, 5.3, 5.2, 5.1, or 5.0. In some embodiments, the depth filter comprising a hydrogel Q-functionalized non-woven media and a multi-zone microporous membrane, such as an EMPHAZE™ depth filter, is selected when the solution entering the depth filter is about 7 to about 8.5. In some embodiments, the depth filter comprising a hydrogel Q-functionalized non-woven media and a multi-zone microporous membrane, such as an EMPHAZE™ depth filter, is selected when the solution entering the depth filter is about 7 or more, such as about any of 7.1 or more, 7.2 or more, 7.3 or more, 7.4 or more, 7.5 or more, 7.6 or more, 7.7 or more, 7.8 or more, 7.9 or more, 8.0 or more, 8.1 or more, 8.2 or more, 8.3 or more, 8.4 or more, or 8.5 or more. In some embodiments, the depth filter comprising a hydrogel Q-functionalized non-woven media and a multi-zone microporous membrane, such as an EMPHAZE™ depth filter, is selected when the solution entering the depth filter is about any of 7, 7.1, 7.2, 7.3, 7.4, 7.5, 7.6, 7.7, 7.8, 7.9, 8.0, 8.1, 8.2, 8.3, 8.4, or 8.5. In some embodiments of the methods described herein, the method may further comprise selecting the depth filter based on the pH of the solution entering the depth filter. One of ordinary skill in the art will readily appreciate that in some instances the solution, and the characteristics thereof, entering the depth filter may be based on the target, such as a polypeptide (e.g., an antibody), purified using the purification platform(s) described herein. Accordingly, in some embodiments, a characteristic of a target, such as pI, is used as the basis for selecting a depth filter for use in the purification platforms described herein.

In some embodiments, the depth filter comprises a substrate comprising one or more of a diatomaceous earth composition, a silica composition, a cellulose fiber, a polymeric fiber, a cohesive resin, a synthetic particulate, an ionic charged resin, and an ash composition. In some embodiments, the depth filter comprises diatomaceous earth. In some embodiments, the depth filter comprises anion exchange media.

In some embodiments, at least a portion of the substrate of a depth filter comprises a surface modification. In some embodiments, the surface modification is one or more of a quaternary amine surface modification, a cationic surface modification, and an anionic surface modification.

In some embodiments, the depth filter is selected from the group consisting of an EMPHAZE™ depth filter (such as an EMPHAZE™ AEX depth filter), a XOSP depth filter, a PDD1 depth filter, a ZETA PLUS™ 120ZA depth filter, and a ZETA PLUS™ 120ZB depth filter.

HIC Steps

In some aspects, the present disclosure provides a purification platform comprising a HIC step. As described herein, a HIC step can be placed at any one or more positions within a purification platform. In some embodiments, the purification platform described herein comprises one or more HIC steps, such as any of 2, 3, 4, or 5 HIC steps, positioned at any stage of the process workflow. In some embodiments, wherein the purification platform comprises more than one HIC steps, the HIC steps are not performed in direct sequential order, i.e., without some intervening step of the purification platform performed between the HIC steps. In some embodiments, wherein the purification platform comprises more than one HIC step, the HIC steps are the same. In some embodiments, wherein the purification platform comprises more than one HIC step, the HIC steps are different, e.g., comprise use of a different HIC medium.

In some embodiments, the HIC step comprises processing via a HIC medium, such as a HIC column or HIC membrane. HIC steps, including what is involved with the processing via a HIC medium, are known in the art. See, e.g., Liu et al. *mAbs,* 2, 2010, which is hereby incorporated by reference. One of ordinary skill in the art will understand, for example, components, conditions, and reagents involved with a HIC step.

In some embodiments, the HIC medium comprises a hydrophobic resin. In some embodiments, at least a portion of the substrate of a HIC medium comprises a surface modification. In some embodiments, the surface modification is a phenyl or butyl surface modification.

In some embodiments, the HIC step is a flow-through mode HIC step. In some embodiments, the HIC step is a bind-and-elute mode HIC step.

In some embodiments, the purification platform comprises: one or more depth filtration steps positioned at any stage of the process workflow; and one or more HIC steps positioned at any stage of the process workflow.

Capture Steps

In some embodiments, the purification platform comprises a capture step. In some embodiments, the capture step comprises processing via affinity chromatography.

Capture steps, including what is involved with processing via, e.g., affinity chromatography, are known in the art. See, e.g., Liu et al. *mAbs,* 2, 2010, which is hereby incorporated by reference.

In some embodiments, the affinity chromatography is selected from the group consisting of a protein A chromatography, a protein G chromatography, a protein A/G chromatography, a protein L chromatography, a protein XL chromatography, a FcXL chromatography, a kappa chromatography, and a kappaXL chromatography. In some embodiments, the capture step comprises processing via protein A chromatography. In some embodiments, the capture step comprises processing via FcXL chromatography.

In some embodiments, the protein A chromatography is a silica-based protein A chromatography. In some embodiments, the protein A chromatography is an agarose-based protein A chromatography. In some embodiments, the protein A chromatography is an organic polymer-based protein A chromatography.

In some embodiments, the protein A chromatography is selected from the group consisting of Prose vA™, Prosep® vA Ultra, Protein A Sepharose® Fast Flow, MabSelect™ MabSelect™ SuRe, Poros® A, and MabCapture™

Conditioning Steps

In some embodiments, the purification platform comprises a conditioning step. In some embodiments, the conditioning step is performed after a capture step.

Conditioning steps, including what is involved with processing for a conditioning step, are known in the art. See, e.g., Liu et al. *mAbs,* 2, 2010, which is hereby incorporated by reference.

In some embodiments, the conditioning step comprises a virus inactivation step, such as a low pH hold step. In some embodiments, the low pH hold step is performed at a pH of about 2.5 to about 4. In some embodiments, the low pH hold step is configured for viral inactivation. In some embodiments, the low pH hold step is capable of inactivating endogenous/adventitious viruses.

One or More Purification Steps

In some embodiments, the purification platform comprises one or more purification steps. In some embodiments, the one or more purification steps are performed after a capture step and a conditioning step. In some embodiments, the one or more purification steps comprise a polypeptide purification steps. In some embodiments, the one or more purification steps comprise more than one, such as any of 2, 3, 4, or 5, polypeptide purification steps.

Polypeptide purification steps, including what is involved with processing for a polypeptide purification step, are known in the art. See, e.g., Liu et al. *mAbs,* 2, 2010, which is hereby incorporated by reference.

In some embodiments, the polypeptide purification step comprises processing via a chromatography selected from the group consisting of: ion exchange chromatography, anion exchange chromatography, cation exchange chromatography, a hydrophobic charge induction chromatography, a ceramic hydroxyapatite chromatography, and a multimodal chromatography.

In some embodiments, the polypeptide purification step comprises processing via a chromatography selected from the group consisting of: diethylaminoethyl (DEAE), dimethylaminoethyl (DMAE), trimethylaminoethyl (TMAE), quartenary amine, quaternary aminoethyl (QAE), sulphopropyl (SP), SP-Sepharose® (crosslinked, beaded-form of agarose) Fast Flow (FF), SP-Sepharose® XL, quartenary amine (Q) Sepharose® FF, mercaptoethylpyridine (MEP)-Hypercel™, Capto MMC (multimodal chromatography), Capto Adhere, Poros® XS, and Poros® 50HS.

In some embodiments, the polypeptide purification step is a bind-and-elute polypeptide purification step. In some embodiments, the polypeptide purification step is a flow-through polypeptide purification step. In some embodiments, the polypeptide purification step is a weak partitioning chromatography polypeptide purification step. In some embodiments, the polypeptide purification step is an overload polypeptide purification step.

Virus Filtration Steps

In some embodiments, the purification platform comprises a virus filtration step. In some embodiments, the virus filtration step is performed after one or more purification steps.

Virus filtration steps, including what is involved with processing for a virus filtration step, are known in the art. See, e.g., Liu et al. *mAbs,* 2, 2010, and U.S. Application No. 20140309403, which are hereby incorporated by reference.

In some embodiments, the virus filtration step comprises processing via a virus filter. In some embodiments, the virus filtration step comprises a pH hold step. In some embodiments, processing via a virus filter is performed after the pH hold step.

UFDF Steps

In some embodiments, the purification platform comprises an UFDF step. In some embodiments, the UFDF step is performed after the one or more purification steps and/or after the virus filtration step.

UFDF steps, including what is involved with processing for an UFDF step, are known in the art. See, e.g., Liu et al. *mAbs,* 2, 2010, which is hereby incorporated by reference.

In some embodiments, the UFDF step comprises processing via ultrafiltration. In some embodiments, the UFDF step is performed in tangential flow filtration (TFF) mode. In some embodiments, the UFDF step comprises processing via a tangential flow filtration, such as high performance tangential flow filtration.

As discussed above, the purification platforms disclosed in the present application may comprise any combination and arrangement of purification steps, including those described herein. For example, in some embodiments, the purification platform comprises a capture step; and a depth filtration step. In some embodiments, the depth filtration step is performed prior to the capture step. In some embodiments, the depth filtration step is performed after the capture step. In some embodiments, the purification platform further comprises a second depth filtration step. In some embodiments, the purification platform further comprises a HIC step.

In some embodiments, the purification platform comprises, in sequence: a capture step; and a conditioning step, wherein the purification platform further comprises a depth filtration step. In some embodiments, the depth filtration step is performed prior to the capture step. In some embodiments, the depth filtration step is performed after the capture step and prior to the conditioning step. In some embodiments, the depth filtration step is performed after the conditioning step. In some embodiments, the purification platform further comprises a second depth filtration step. In some embodiments, the purification platform further comprises a HIC step.

In some embodiments, the purification platform comprises, in sequence: a capture step; a conditioning step; and one or more purification steps, wherein the purification platform further comprises a depth filtration step. In some embodiments, the depth filtration step is performed prior to the capture step. In some embodiments, the depth filtration step is performed after the capture step and prior to the conditioning step. In some embodiments, the depth filtration step is performed after the conditioning step and prior to the one or more purification steps. In some embodiments, the depth filtration step is performed between any of the one or more purification steps, if more than one purification step is present, or after the one or more purification steps. In some embodiments, the purification platform further comprises a second depth filtration step, such as a depth filtration step performed prior to the capture step. In some embodiments, the purification platform further comprises a HIC step, such as a HIC step performed after the one or more purification steps.

In some embodiments, the purification platform comprises, in sequence: a capture step; a conditioning step; one or more purification steps; and a virus filtration step, wherein the purification platform further comprises a depth filtration step. In some embodiments, the depth filtration step is performed prior to the capture step. In some embodiments, the depth filtration step is performed after the capture step and prior to the conditioning step. In some embodiments, the depth filtration step is performed after the conditioning step and prior to the one or more purification steps. In some embodiments, the depth filtration step is performed between any of the one or more purification steps, if more than one purification step is present, or after the one or more purification steps. In some embodiments, the depth filtration step is performed after the one or more purification steps and prior to the virus filtration step. In some embodiments, the depth filtration step is performed after the virus filtration step. In some embodiments, the purification platform further comprises a second depth filtration step, such as a depth filtration step performed prior to the capture step. In some embodiments, the purification platform further comprises a HIC step, such as selected from one or more HIC steps performed after the one or more purification steps and/or after or during, such as after a pH hold step of the virus filtration step, the virus filtration step.

In some embodiments, the purification platform comprises, in sequence: a capture step; a conditioning step; one or more purification steps; and an UFDF step, wherein the purification platform further comprises a depth filtration step. In some embodiments, the depth filtration step is performed prior to the capture step. In some embodiments, the depth filtration step is performed after the capture step and prior to the conditioning step. In some embodiments, the depth filtration step is performed after the conditioning step and prior to the one or more purification steps. In some embodiments, the depth filtration step is performed between any of the one or more purification steps, if more than one purification step is present, or after the one or more purification steps. In some embodiments, the depth filtration step is performed after the one or more purification steps and prior to the UFDF step. In some embodiments, the depth filtration step is performed after the UFDF step. In some embodiments, the purification platform further comprises a second depth filtration step, such as a depth filtration step performed prior to the capture step. In some embodiments, the purification platform further comprises a HIC step, such as selected from one or more HIC steps performed after the one or more purification steps and/or after the UFDF step.

In some embodiments, the purification platform comprises, in sequence: a capture step; a conditioning step; one or more purification steps; a virus filtration step; and an UFDF step, wherein the purification platform further comprises a depth filtration step. In some embodiments, the depth filtration step is performed prior to the capture step. In some embodiments, the depth filtration step is performed after the capture step and prior to the conditioning step. In some embodiments, the depth filtration step is performed after the conditioning step and prior to the one or more purification steps. In some embodiments, the depth filtration step is performed between any of the one or more purification steps, if more than one purification step is present, or after the one or more purification steps. In some embodiments, the depth filtration step is performed after the one or more purification steps and prior to the virus filtration step. In some embodiments, the depth filtration step is performed after the virus filtration step and prior to the UFDF step. In some embodiments, the depth filtration step is performed after the UFDF step. In some embodiments, the purification platform further comprises a second depth filtration step, such as a depth filtration step performed prior to the capture step. In some embodiments, the purification platform further comprises a HIC step, such as selected from one or more HIC steps performed after the one or more purification steps, and/or after or during, such as after a pH hold step of the virus filtration step, the virus filtration step, and/or after the UFDF step.

In some embodiments, the purification platform comprises a capture step; and a HIC step. In some embodiments, the HIC step is performed prior to the capture step. In some embodiments, the HIC step is performed after the capture step. In some embodiments, the purification platform further comprises a second HIC step. In some embodiments, the purification platform further comprises a depth filtration step, such as a depth filtration step performed after the capture step.

In some embodiments, the purification platform comprises, in sequence: a capture step; and a conditioning step, wherein the purification platform further comprises a HIC step. In some embodiments, the HIC step is performed prior to the capture step. In some embodiments, the HIC step is performed after the capture step and prior to the conditioning step. In some embodiments, the HIC step is performed after the conditioning step. In some embodiments, the purification platform further comprises a second HIC step. In some embodiments, the purification platform further comprises a depth filtration step, such as a depth filtration step performed after the capture step.

In some embodiments, the purification platform comprises, in sequence: a capture step; a conditioning step; and one or more purification steps, wherein the purification platform further comprises a HIC step. In some embodiments, the HIC step is performed prior to the capture step. In some embodiments, the HIC step is performed after the capture step and prior to the conditioning step. In some embodiments, the HIC step is performed after the conditioning step and prior to the one or more purification steps. In some embodiments, the HIC step is performed between any of the one or more purification steps, if more than one purification step is present, or after the one or more purification steps. In some embodiments, the purification platform further comprises a second HIC step, such as a HIC step performed after the one or more purification steps. In some embodiments, the purification platform further comprises a depth filtration step, such as a depth filtration step performed after the capture step.

In some embodiments, the purification platform comprises, in sequence: a capture step; a conditioning step; one or more purification steps; and a virus filtration step, wherein the purification platform further comprises a HIC step. In some embodiments, the HIC step is performed prior to the capture step. In some embodiments, the HIC step is performed after the capture step and prior to the conditioning step. In some embodiments, the HIC step is performed after the conditioning step and prior to the one or more purification steps. In some embodiments, the HIC step is performed between any of the one or more purification steps, if more than one purification step is present, or after the one or more purification steps. In some embodiments, the HIC step is performed after the one or more purification steps and prior to the virus filtration step. In some embodiments, the HIC step is performed after the virus filtration step. In some embodiments, the purification platform further comprises a second HIC step, such as a HIC step performed after the one or more purification steps. In some embodiments, the purification platform further comprises a depth filtration step, such as a depth filtration step performed after the capture step.

In some embodiments, the purification platform comprises, in sequence: a capture step; a conditioning step; one or more purification steps; and an UFDF step, wherein the purification platform further comprises a HIC step. In some embodiments, the HIC step is performed prior to the capture step. In some embodiments, the HIC step is performed after the capture step and prior to the conditioning step. In some embodiments, the HIC step is performed after the conditioning step and prior to the one or more purification steps. In some embodiments, the HIC step is performed between any of the one or more purification steps, if more than one purification step is present, or after the one or more purification steps. In some embodiments, the HIC step is performed after the one or more purification steps and prior to the UFDF step. In some embodiments, the HIC step is performed after the UFDF step. In some embodiments, the purification platform further comprises a second HIC step, such as a HIC step performed after the one or more purification steps. In some embodiments, the purification platform further comprises a depth filtration step, such as a depth filtration step performed after the capture step.

In some embodiments, the purification platform comprises, in sequence: a capture step; a conditioning step; one or more purification steps; a virus filtration step; and an UFDF step, wherein the purification platform further comprises a HIC step. In some embodiments, the HIC step is performed prior to the capture step. In some embodiments, the HIC step is performed after the capture step and prior to the conditioning step. In some embodiments, the HIC step is performed after the conditioning step and prior to the one or more purification steps. In some embodiments, the HIC step is performed between any of the one or more purification steps, if more than one purification step is present, or after the one or more purification steps. In some embodiments, the HIC step is performed after the one or more purification steps and prior to the virus filtration step. In some embodiments, the HIC step is performed after the virus filtration step and prior to the UFDF step. In some embodiments, the HIC step is performed after the UFDF step. In some embodiments, the purification platform further comprises a second HIC step, such as a HIC step performed after the one or more purification steps. In some embodiments, the purification platform further comprises a depth filtration step, such as a depth filtration step performed after the capture step.

Samples, Components Thereof and Compositions Obtained from Purification Platforms In some aspects, the purification platforms described herein are useful for purifying, to any degree, a target from a sample comprising the target.

In some embodiments, the sample is a host cell sample. In some embodiments, the sample is a host cell culture fluid (HCCF). In some embodiments, the sample comprises a portion of a host cell culture fluid. In some embodiments, the sample is derived from a host cell culture fluid. In some embodiments, the sample comprises a host cell. In some embodiments, the sample comprises a component of a host cell, such as host cell debris. In some embodiments, the host cell is a bacterial cell. In some embodiments, the host cell is an insect cell. In some embodiments, the host cell is a mammalian cell. In some embodiments, the host cell is a Chinese hamster ovary (CHO) cell. In some embodiments, the host cell is an *E. coli* cell.

In some embodiments, the sample has been processed, such as subjected to a processing step performed prior to subjecting the sample to a purification platform described herein. In some embodiments, the sample comprises a surfactant. In some embodiments, the sample comprises a polysorbate. In some embodiments, the polysorbate is selected from the group consisting of polysorbate 20, polysorbate 40, polysorbate 60, and polysorbate 80.

In some embodiments, the sample comprises a target. In some embodiments, the target comprises a polypeptide. In some embodiments, the target is a polypeptide. In some embodiments, the target is a polypeptide complex. In some embodiments, the target is an antibody moiety. In some embodiments, the antibody moiety is a monoclonal antibody. In some embodiments, the antibody moiety is a humanized antibody. In some embodiments, the antibody moiety is selected from the group consisting of an anti-CD20 antibody, an anti-CD40 antibody, an anti-HER2 antibody, an anti-IL6 antibody, an anti-IgE antibody, an anti-IL13 antibody, an anti-TIGIT antibody, an anti-PD-L1 antibody, an anti-VEGF-A antibody, an anti-VEGF-A/ANG2 antibody, an anti-CD79b antibody, an anti-ST2 antibody, an anti-factor D antibody, an anti-factor IX antibody, an anti-factor X antibody, an anti-abeta antibody, an anti-tau antibody, an anti-CEA antibody, an anti-CEA/CD3 antibody, an anti-CD20/CD3 antibody, an anti-FcRH5/CD3 antibody, an anti-Her2/CD3 antibody, an anti-FGFR1/KLB antibody, a FAP-4-1 BBL fusion protein, a FAP-IL2v fusion protein, and a TYRP1 TCB antibody. In some embodiments, the antibody moiety is selected from the group consisting of ocrelizumab, pertuzumab, trastuzumab, tocilizumab, faricimab, polatuzumab, gantenerumab, cibisatamab, crenezumab, mosunetuzumab, tiragolumab, bevacizumab, rituximab, atezolizumab, obinutuzumab, lampalizumab, lebrikizumab, omalizumab ranibizumab, emicizumab, selicrelumab, prasinezumab, R06874281, and R07122290.

In some embodiments, the sample comprises one or more host cell proteins. In some embodiments, the host cell protein is a hydrolytic enzyme. In some embodiments, the hydrolytic enzyme is a lipase, an esterase, a thioesterase, a phospholipase, or a ceramidase. In some embodiments, the hydrolytic enzyme is a multi-enzyme protein. In some embodiments, the multi-enzyme protein is a fatty acid synthase. In some embodiments, the fatty acid synthase comprises a thioesterase subunit.

The purification platforms described herein, in some instances, may comprise numerous purification steps. In some embodiments, the term "composition" is used herein to describe any input (except the initial sample input to the purification platform), intermediate, or output of any stage of the purification platform. For example, in some embodiments, use of the term "composition" is not limited to describing the final output of the purification platform.

In some embodiments, the composition comprises a surfactant. In some embodiments, the composition comprises a polysorbate. In some embodiments, the polysorbate is selected from the group consisting of polysorbate 20, polysorbate 40, polysorbate 60, and polysorbate 80.

In some embodiments, the composition comprises a target. In some embodiments, the target comprises a polypeptide. In some embodiments, the target is a polypeptide. In some embodiments, the target is a polypeptide complex. In some embodiments, the target is an antibody moiety. In some embodiments, the antibody moiety is a monoclonal antibody. In some embodiments, the antibody moiety is a humanized antibody. In some embodiments, the antibody moiety is selected from the group consisting of an anti-CD20 antibody, an anti-CD40 antibody, an anti-HER2 antibody, an anti-IL6 antibody, an anti-IgE antibody, an anti-IL13 antibody, an anti-TIGIT antibody, an anti-PD-L1 antibody, an anti-VEGF-A antibody, an anti-VEGF-A/ANG2 antibody, an anti-CD79b antibody, an anti-ST2 antibody, an anti-factor D antibody, an anti-factor IX antibody, an anti-factor X antibody, an anti-abeta antibody, an anti-tau antibody, an anti-CEA antibody, an anti-CEA/CD3 antibody, an anti-CD20/CD3 antibody, an anti-FcRH5/CD3 antibody, an anti-Her2/CD3 antibody, an anti-FGFR1/KLB antibody, a FAP-4-1 BBL fusion protein, a FAP-IL2v fusion protein, and a TYRP1 TCB antibody. In some embodiments, the antibody moiety is selected from the group consisting of ocrelizumab, pertuzumab, trastuzumab, tocilizumab, faricimab, polatuzumab, gantenerumab, cibisatamab, crenezumab, mosunetuzumab, tiragolumab, bevacizumab, rituximab, atezolizumab, obinutuzumab, lampalizumab, lebrikizumab, omalizumab ranibizumab, emicizumab, selicrelumab, prasinezumab, R06874281, and R07122290.

In some embodiments, the composition comprises one or more host cell proteins. In some embodiments, the host cell protein is a hydrolytic enzyme. In some embodiments, the hydrolytic enzyme is a lipase, an esterase, a thioesterase, a phospholipase, or a ceramidase.

Additional Steps

In some aspects, the present disclosure provides additional steps involved or associated with a purification platform described herein. Additional steps involved or associated with a purification platform, and methods for conducting such steps, are known. See, e.g., Liu et al., *mAbs*, 2, 2010, which is hereby incorporated by reference in its entirety.

In some embodiments, the purification platform further comprises a sample processing step, such as a sample preparation step. In some embodiments, the purification platform further comprises a clarification step, such as to clarify HCCF. In some embodiments, the purification platform further comprises a host cell and host cell debris removal step, such as to remove host cells and host cell debris from a sample and/or a composition obtained from the purification platform. In some embodiments, the purification platform further comprises a centrifugation step. In some embodiments, the purification platform further comprises a sterile filtration step. In some embodiments, the purification platform further comprises a tangential flow micro-filtration step. In some embodiments, the purification platform further comprises a flocculation/precipitation step.

Methods of Using a Purification Platform

In some aspects, the present disclosure describes methods of using the purification platforms described herein. In some embodiments, the method comprises subjecting a sample comprising a target to a purification platform described herein.

In some aspects, provided herein are methods of reducing an enzymatic hydrolysis activity rate of a composition obtained from a purification platform described herein comprising one or more depth filtration steps and/or one or more HIC steps, the method comprising subjecting a sample to the purification platform, thereby reducing the enzymatic hydrolysis activity rate of the composition as compared to purification of the sample using the same purification platform without one or more of the depth filtration steps and/or one or more of the HIC steps. In some embodiments, the relative reduction of the enzymatic hydrolysis activity rate of the composition, as compared to purification of the sample using the same purification platform without one or more of the depth filtration steps and/or one or more of the HIC steps, is at least about 5%, such as at least about any of 10%, 15%, 20%, 25%, 30%, 35%, 40%, 45%, 50%, 55%, 60%, 65%, 70%, 75%, 80%, 85%, or 90%. In some embodiments, the enzymatic hydrolysis activity rate is an enzymatic polysorbate hydrolysis activity rate.

In some aspects, provided herein are methods of reducing the level of one or more hydrolytic enzymes in a composition obtained from a purification platform described herein comprising one or more depth filtration steps and/or one or more HIC steps, the method comprising subjecting a sample to the purification platform, thereby reducing the level of the hydrolytic enzyme in the composition as compared to purification of the sample using the same purification platform without one or more of the depth filtration steps and/or one or more of the HIC steps. In some embodiments, the relative reduction of the level of one or more hydrolytic enzymes in the composition, as compared to purification of the sample using the same purification platform without one or more of the depth filtration steps and/or one or more of the HIC steps, is at least about 5%, such as at least about any of 10%, 15%, 20%, 25%, 30%, 35%, 40%, 45%, 50%, 55%, 60%, 65%, 70%, 75%, 80%, 85%, or 90%. In some embodiments, the one or more hydrolytic enzymes are capable of hydrolyzing a polysorbate.

In some aspects, provided herein are methods of reducing degradation of a polysorbate in a composition obtained from a purification platform described herein comprising one or more depth filtration steps and/or one or more HIC steps, the method comprising subjecting a sample to the purification platform, thereby reducing degradation of the polysorbate in the composition as compared to purification of the sample using the same purification platform without one or more of the depth filtration steps and/or one or more of the HIC steps. In some embodiments, the relative reduction of degradation of the polysorbate in the composition, as compared to purification of the sample using the same purification platform without one or more of the depth filtration steps and/or one or more of the HIC steps, is at least about 5%, such as at least about any of 10%, 15%, 20%, 25%, 30%, 35%, 40%, 45%, 50%, 55%, 60%, 65%, 70%, 75%, 80%, 85%, or 90%.

In some aspects, provided herein are methods of increasing shelf-life of a composition obtained from a purification platform described herein comprising one or more depth filtration steps and/or one or more HIC steps, the method comprising subjecting a sample to the purification platform, thereby increasing shelf-life of the composition as compared to purification of the sample using the same purification platform without one or more of the depth filtration steps and/or one or more of the HIC steps. In some embodiments, the relative increase in shelf-life of the composition, as compared to purification of the sample using the same purification platform without one or more of the depth filtration steps and/or one or more of the HIC steps, is at least about 1 week, such as at least about any of 2 weeks, 1 month, 2 months, 3 months, 4 months, 5 months, 6 months, 9 months, 12 months, 18 months, 24 months, or more than 24 months. In some embodiments, the shelf-life of the composition, as compared to purification of the sample using the same purification platform without one or more of the depth filtration steps and/or one or more of the HIC steps, is at least about 1 week, such as at least about any of 2 weeks, 1 month, 2 months, 3 months, 4 months, 5 months, 6 months, 9 months, 12 months, 18 months, 24 months, 30 months, 36 months, 42 months, 48 months, or more than 48 months. In some embodiments, the shelf-life of the composition is more than 6 months, more than 9 months, more than 12 months, more than 18 months, more than 24 months, more than 30 months, more than 36 months, more than 42 months, more than 48 months, or more than 48 months.

In some aspects, provided herein are methods of producing a composition with less degraded polysorbate, the composition obtained from a purification platform described herein comprising one or more depth filtration steps and/or one or more HIC steps, the method comprising subjecting a sample to the purification platform, thereby producing the composition with less degraded polysorbate as compared to purification of the sample using the same purification platform without one or more of the depth filtration steps and/or one or more of the HIC steps.

In some aspects, provided herein are methods of reducing aggregation of a target in a composition obtained from a purification platform described herein comprising one or more depth filtration steps and/or one or more HIC steps, the method comprising subjecting a sample to the purification platform, thereby reducing aggregation of the target in the composition as compared to purification of the sample using the same purification platform without one or more of the depth filtration steps and/or one or more of the HIC steps.

As described herein, one or more attributes of a composition obtain from subjecting a sample to a purification platform comprising one or more depth filtration steps and/or one or more HIC steps are as compared to purification of the sample using the same purification platform without one or more of the depth filtration steps and/or one or more of the HIC steps. One of ordinary skill in the art will understand that, in some instances, such comparisons must be performed under appropriate conditions allowing for a meaningful comparison. For example, temporal factors that may impact a reading of an enzymatic hydrolysis activity rate must be taken into consideration when comparing a composition obtained from a purification platform comprising one or more depth filtration steps and/or one or more HIC steps to purification of the sample using the same purification platform without one or more of the depth filtration steps and/or one or more of the HIC steps. Additional relevant factors to consider for comparison of a composition with a reference include the experimental conditions, the assay used, temperature conditions, pH, timing, sample, buffer(s), and sample source(s).

In some embodiments, the method comprises subjecting a sample comprising a target to a purification platform comprising a capture step; and a depth filtration step. In some embodiments, the depth filtration step is performed prior to the capture step. In some embodiments, the depth filtration step is performed after the capture step. In some embodiments, the purification platform further comprises a second depth filtration step. In some embodiments, the purification platform further comprises a HIC step.

In some embodiments, the method comprises subjecting a sample comprising a target to a purification platform comprising, in sequence: a capture step; and a conditioning step, wherein the purification platform further comprises a depth filtration step. In some embodiments, the depth filtration step is performed prior to the capture step. In some embodiments, the depth filtration step is performed after the capture step and prior to the conditioning step. In some embodiments, the depth filtration step is performed after the conditioning step. In some embodiments, the purification platform further comprises a second depth filtration step. In some embodiments, the purification platform further comprises a HIC step.

In some embodiments, the method comprises subjecting a sample comprising a target to a purification platform comprising, in sequence: a capture step; a conditioning step; and one or more purification steps, wherein the purification platform further comprises a depth filtration step. In some embodiments, the depth filtration step is performed prior to the capture step. In some embodiments, the depth filtration step is performed after the capture step and prior to the conditioning step. In some embodiments, the depth filtration step is performed after the conditioning step and prior to the one or more purification steps. In some embodiments, the depth filtration step is performed between any of the one or more purification steps, if more than one purification step is present, or after the one or more purification steps. In some embodiments, the purification platform further comprises a second depth filtration step, such as a depth filtration step performed prior to the capture step. In some embodiments, the purification platform further comprises a HIC step, such as a HIC step performed after the one or more purification steps.

In some embodiments, the method comprises subjecting a sample comprising a target to a purification platform comprising, in sequence: a capture step; a conditioning step; one or more purification steps; and a virus filtration step, wherein the purification platform further comprises a depth filtration step. In some embodiments, the depth filtration step is performed prior to the capture step. In some embodiments, the depth filtration step is performed after the capture step and prior to the conditioning step. In some embodiments, the depth filtration step is performed after the conditioning step and prior to the one or more purification steps. In some embodiments, the depth filtration step is performed between any of the one or more purification steps, if more than one purification step is present, or after the one or more purification steps. In some embodiments, the depth filtration step is performed after the one or more purification steps and prior to the virus filtration step. In some embodiments, the depth filtration step is performed after the virus filtration step. In some embodiments, the purification platform further comprises a second depth filtration step, such as a depth filtration step performed prior to the capture step. In some embodiments, the purification platform further comprises a HIC step, such as selected from one or more HIC steps performed after the one or more purification steps and/or after or during, such as after a pH hold step of the virus filtration step, the virus filtration step.

In some embodiments, the method comprises subjecting a sample comprising a target to a purification platform comprising, in sequence: a capture step; a conditioning step; one or more purification steps; and an UFDF step, wherein the purification platform further comprises a depth filtration step. In some embodiments, the depth filtration step is performed prior to the capture step. In some embodiments, the depth filtration step is performed after the capture step and prior to the conditioning step. In some embodiments, the depth filtration step is performed after the conditioning step and prior to the one or more purification steps. In some embodiments, the depth filtration step is performed between any of the one or more purification steps, if more than one purification step is present, or after the one or more purification steps. In some embodiments, the depth filtration step is performed after the one or more purification steps and prior to the UFDF step. In some embodiments, the depth filtration step is performed after the UFDF step. In some embodiments, the purification platform further comprises a second depth filtration step, such as a depth filtration step performed prior to the capture step. In some embodiments, the purification platform further comprises a HIC step, such as selected from one or more HIC steps performed after the one or more purification steps and/or after the UFDF step.

In some embodiments, the method comprises subjecting a sample comprising a target to a purification platform comprising, in sequence: a capture step; a conditioning step; one or more purification steps; a virus filtration step; and an UFDF step, wherein the purification platform further comprises a depth filtration step. In some embodiments, the depth filtration step is performed prior to the capture step. In some embodiments, the depth filtration step is performed after the capture step and prior to the conditioning step. In some embodiments, the depth filtration step is performed after the conditioning step and prior to the one or more purification steps. In some embodiments, the depth filtration step is performed between any of the one or more purification steps, if more than one purification step is present, or after the one or more purification steps. In some embodiments, the depth filtration step is performed after the one or more purification steps and prior to the virus filtration step. In some embodiments, the depth filtration step is performed after the virus filtration step and prior to the UFDF step. In some embodiments, the depth filtration step is performed after the UFDF step. In some embodiments, the purification platform further comprises a second depth filtration step, such as a depth filtration step performed prior to the capture step. In some embodiments, the purification platform further comprises a HIC step, such as selected from one or more HIC steps performed after the one or more purification steps, and/or after or during, such as after a pH hold step of the virus filtration step, the virus filtration step, and/or after the UFDF step.

In some embodiments, the method comprises subjecting a sample comprising a target to a purification platform comprising a capture step; and a HIC step. In some embodiments, the HIC step is performed prior to the capture step. In some embodiments, the HIC step is performed after the capture step. In some embodiments, the purification platform further comprises a second HIC step. In some embodiments, the purification platform further comprises a depth filtration step, such as a depth filtration step performed after the capture step.

In some embodiments, the method comprises subjecting a sample comprising a target to a purification platform comprising, in sequence: a capture step; and a conditioning step, wherein the purification platform further comprises a HIC step. In some embodiments, the HIC step is performed prior to the capture step. In some embodiments, the HIC step is performed after the capture step and prior to the conditioning step. In some embodiments, the HIC step is performed after the conditioning step. In some embodiments, the purification platform further comprises a second HIC step. In some embodiments, the purification platform further comprises a depth filtration step, such as a depth filtration step performed after the capture step.

In some embodiments, the method comprises subjecting a sample comprising a target to a purification platform comprising, in sequence: a capture step; a conditioning step; and one or more purification steps, wherein the purification platform further comprises a HIC step. In some embodiments, the HIC step is performed prior to the capture step. In some embodiments, the HIC step is performed after the capture step and prior to the conditioning step. In some embodiments, the HIC step is performed after the conditioning step and prior to the one or more purification steps. In some embodiments, the HIC step is performed between any of the one or more purification steps, if more than one purification step is present, or after the one or more purification steps. In some embodiments, the purification platform further comprises a second HIC step, such as a HIC step performed after the one or more purification steps. In some embodiments, the purification platform further comprises a depth filtration step, such as a depth filtration step performed after the capture step.

In some embodiments, the method comprises subjecting a sample comprising a target to a purification platform comprising, in sequence: a capture step; a conditioning step; one or more purification steps; and a virus filtration step, wherein the purification platform further comprises a HIC step. In some embodiments, the HIC step is performed prior to the capture step. In some embodiments, the HIC step is performed after the capture step and prior to the conditioning step. In some embodiments, the HIC step is performed after the conditioning step and prior to the one or more purification steps. In some embodiments, the HIC step is performed between any of the one or more purification steps, if more than one purification step is present, or after the one or more purification steps. In some embodiments, the HIC step is performed after the one or more purification steps and prior to the virus filtration step. In some embodiments, the HIC step is performed after the virus filtration step. In some embodiments, the purification platform further comprises a second HIC step, such as a HIC step performed after the one or more purification steps. In some embodiments, the purification platform further comprises a depth filtration step, such as a depth filtration step performed after the capture step.

In some embodiments, the method comprises subjecting a sample comprising a target to a purification platform comprising, in sequence: a capture step; a conditioning step; one or more purification steps; and an UFDF step, wherein the purification platform further comprises a HIC step. In some embodiments, the HIC step is performed prior to the capture step. In some embodiments, the HIC step is performed after the capture step and prior to the conditioning step. In some embodiments, the HIC step is performed after the conditioning step and prior to the one or more purification steps. In some embodiments, the HIC step is performed between any of the one or more purification steps, if more than one purification step is present, or after the one or more purification steps. In some embodiments, the HIC step is performed after the one or more purification steps and prior to the UFDF step. In some embodiments, the HIC step is performed after the UFDF step. In some embodiments, the purification platform further comprises a second HIC step, such as a HIC step performed after the one or more purification steps. In some embodiments, the purification platform further comprises a depth filtration step, such as a depth filtration step performed after the capture step.

In some embodiments, the method comprises subjecting a sample comprising a target to a purification platform comprising, in sequence: a capture step; a conditioning step; one or more purification steps; a virus filtration step; and an UFDF step, wherein the purification platform further comprises a HIC step. In some embodiments, the HIC step is performed prior to the capture step. In some embodiments, the HIC step is performed after the capture step and prior to the conditioning step. In some embodiments, the HIC step is performed after the conditioning step and prior to the one or more purification steps. In some embodiments, the HIC step is performed between any of the one or more purification steps, if more than one purification step is present, or after the one or more purification steps. In some embodiments, the HIC step is performed after the one or more purification steps and prior to the virus filtration step. In some embodiments, the HIC step is performed after the virus filtration step and prior to the UFDF step. In some embodiments, the HIC step is performed after the UFDF step. In some embodiments, the purification platform further comprises a second HIC step, such as a HIC step performed after the one or more purification steps. In some embodiments, the purification platform further comprises a depth filtration step, such as a depth filtration step performed after the capture step.

Figure 1B:
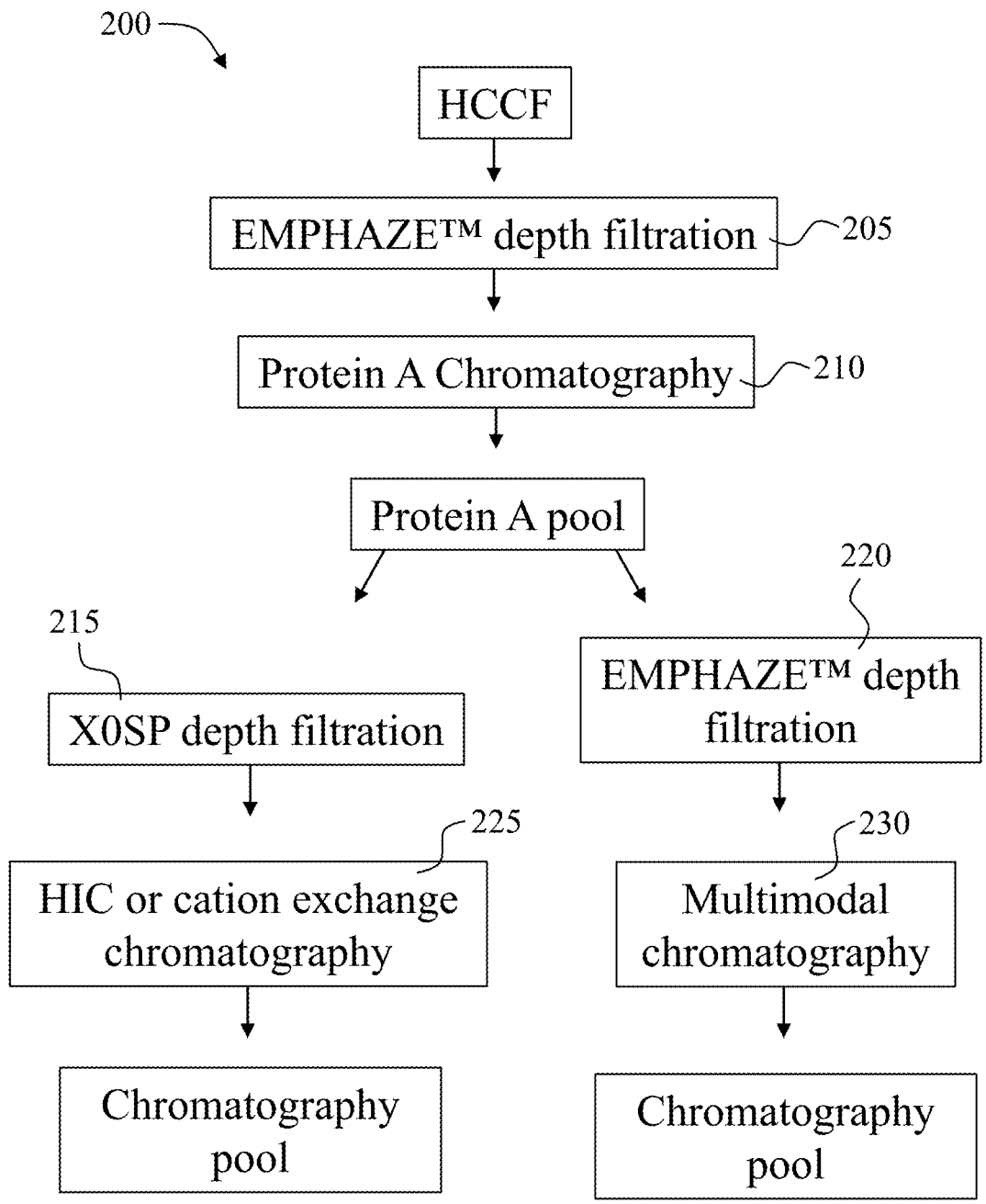
FIG. 1B shows exemplary options for steps of purification platforms.

For purposes of example and explanation of the disclosure herein, a sequence workflow of options available for aspects an exemplary purification platform 200 are illustrated in FIG. 1B. As shown in FIG. 1B, the purification platform comprises: a protein A chromatography step 210; a further chromatography step selected from a HIC 225, a cation exchange chromatography 225, or a multimodal chromatography 230; and one or more depth filtration steps selected from any of an EMPHAZE™ depth filtration step 205 performed on HCCF prior to a protein A chromatography step, a XOSP depth filtration step 215 performed on a protein A pool, or an EMPHAZE™ depth filtration step 220 performed on a protein A pool.

According to FIG. 1B, in some embodiments, the purification platform comprises an EMPHAZE™ depth filtration step 205 performed on HCCF prior to subjecting the EMPHAZE™ depth filtration pool to protein A chromatography 210. In such embodiments, the protein A pool is subjected to either a XOSP depth filtration step 215 or an EMPHAZE™ depth filtration step 220, prior to downstream chromatography steps. In some embodiments, wherein the purification platform comprises a XOSP depth filtration step 215, the protein A pool is condition prior to the XOSP depth filtration step 215 by adjusting the pH of the protein A pool to about 5 to about 6.5. In some embodiments, wherein the purification platform comprises a XOSP depth filtration step 215, the XOSP depth filtration pool is further subjected to HIC (such as phenyl SEPHAROSE® fast flow) or cation exchange chromatography (such as POROS 50HS). In some embodiments, wherein the purification platform comprises an EMPHAZE™ depth filtration step 220, the protein A pool is condition prior to the EMPHAZE™ depth filtration step 220 by adjusting the pH of the protein A pool to about 7 to about 8.5. In some embodiments, wherein the purification platform comprises an EMPHAZE™ depth filtration step 220, the EMPHAZE™ depth filtration pool is further subjected to multimodal chromatography (such as Capto Adhere).

According to FIG. 1B, in some embodiments, the purification platform does not comprises an EMPHAZE™ depth filtration step 205 performed on HCCF. In such embodiments, the HCCF is subjected to a protein A chromatography 210, and the protein A pool is subjected to either a XOSP depth filtration step 215 or an EMPHAZE™ depth filtration step 220, prior to downstream chromatography steps. In some embodiments, wherein the purification platform comprises a XOSP depth filtration step 215, the protein A pool is condition prior to the XOSP depth filtration step 215 by adjusting the pH of the protein A pool to about 5 to about 6.5. In some embodiments, wherein the purification platform comprises a XOSP depth filtration step 215, the XOSP depth filtration pool is further subjected to HIC (such as phenyl SEPHAROSE® fast flow) or cation exchange chromatography (such as POROS 50HS). In some embodiments, wherein the purification platform comprises an EMPHAZE™ depth filtration step 220, the protein A pool is condition prior to the EMPHAZE™ depth filtration step 220 by adjusting the pH of the protein A pool to about 7 to about 8.5. In some embodiments, wherein the purification platform comprises an EMPHAZE™ depth filtration step 220, the EMPHAZE™ depth filtration pool is further subjected to multimodal chromatography (such as Capto Adhere).

In some embodiments, the method comprises subjecting a sample comprising a target to a purification platform comprising, in order: (a) a depth filtration step comprising processing via a depth filter comprising a hydrogel Q-functionalized non-woven media and a multi-zone microporous membrane; (b) a capture step comprising processing via a protein A chromatography; and (c) a purification step, wherein the purification step comprises processing via a chromatography selected from the group consisting of a HIC, a cation exchange chromatography, and a multimodal chromatography. In some embodiments, the depth filter is an EMPHAZE™ depth filter. In some embodiments, the HIC is phenyl SEPHAROSE® fast flow chromatography. In some embodiments, the cation exchange chromatography is POROS 50HS. In some embodiments, the multimodal chromatography is Capto Adhere.

In some embodiments, the method comprises subjecting a sample comprising a target to a purification platform comprising, in order: (a) a first depth filtration step comprising processing via a first depth filter comprising a hydrogel Q-functionalized non-woven media and a multi-zone microporous membrane; (b) a capture step comprising processing via a protein A chromatography; (c) a second depth filtration step comprising processing via a second depth filter comprising a hydrogel Q-functionalized non-woven media and a multi-zone microporous membrane; and (d) a purification step comprising processing via a multimodal chromatography. In some embodiments, the first depth filter and the second depth filter is an EMPHAZE™ depth filter. In some embodiments, the multimodal chromatography is Capto Adhere. In some embodiments, the second depth filter comprising the hydrogel Q-functionalized non-woven media and the multi-zone microporous membrane is selected when the solution entering the depth filter is about 7 to about 8.5.

In some embodiments, the method comprises subjecting a sample comprising a target to a purification platform comprising, in order: (a) a capture step comprising processing via a protein A chromatography; (b) a depth filtration step comprising processing via a depth filter comprising a hydrogel Q-functionalized non-woven media and a multi-zone microporous membrane; and (c) a purification step comprising processing via a multimodal chromatography. In some embodiments, the depth filter is an EMPHAZE™ depth filter. In some embodiments, the multimodal chromatography is Capto Adhere. In some embodiments, the depth filter comprising the hydrogel Q-functionalized non-woven media and the multi-zone microporous membrane is selected when the solution entering the depth filter is about 7 to about 8.5.

In some embodiments, the method comprises subjecting a sample comprising a target to a purification platform comprising, in order: (a) a first depth filtration step comprising processing via a first depth filter; (b) a capture step comprising processing via a protein A chromatography; and (c) a second depth filtration step comprising processing via a second depth filter. In some embodiments, the first depth filter comprises a hydrogel Q-functionalized non-woven media and a multi-zone microporous membrane. In some embodiments, the first depth filter is an EMPHAZE™ depth filter. In some embodiments, the first depth filter comprises an inorganic filter aid, cellulose and a resin system. In some embodiments, the first depth filter is a 120ZB depth filter. In some embodiments, the second depth filter comprises a silica and a polyacrylic fiber. In some embodiments, the second depth filter is a XOSP depth filter. In some embodiments, the method further comprises a conditioning step. In some embodiments, the method further comprises one or more purification steps.

In some embodiments, the method comprises subjecting a sample comprising a target to a purification platform comprising, in order: (a) a first depth filtration step comprising processing via a first depth filter comprising a hydrogel Q-functionalized non-woven media and a multi-zone microporous membrane; (b) a capture step comprising processing via a protein A chromatography; (c) a second depth filtration step comprising processing via a second depth filter comprising a silica and a polyacrylic fiber; and (d) a purification step comprising processing via a cation exchange chromatography. In some embodiments, the first depth filter is an EMPHAZE™ depth filter. In some embodiments, the second depth filter is a XOSP depth filter. In some embodiments, the cation exchange chromatography is POROS 50HS. In some embodiments, the second depth filter comprising the silica and the polyacrylic fiber is selected when the solution entering the depth filter is about 5 to about 6.5.

In some embodiments, the method comprises subjecting a sample comprising a target to a purification platform comprising, in order: (a) a first depth filtration step comprising processing via a first depth filter comprising a hydrogel Q-functionalized non-woven media and a multi-zone microporous membrane; (b) a capture step comprising processing via a protein A chromatography; (c) a second depth filtration step comprising processing via a second depth filter comprising a silica and a polyacrylic fiber; and (d) a purification step comprising processing via a HIC. In some embodiments, the first depth filter is an EMPHAZE™ depth filter. In some embodiments, the second depth filter is a XOSP depth filter. In some embodiments, the HIC is phenyl SEPHAROSE® fast flow chromatography. In some embodiments, the second depth filter comprising the silica and the polyacrylic fiber is selected when the solution entering the depth filter is about 5 to about 6.5.

In some embodiments, the method comprises subjecting a sample comprising a target to a purification platform comprising, in order: (a) a capture step comprising processing via a protein A chromatography; and (b) a depth filtration step comprising processing via a depth filter. In some embodiments, the depth filter comprises a silica and a polyacrylic fiber. In some embodiments, the depth filter is a XOSP depth filter. In some embodiments, the method further comprises a conditioning step. In some embodiments, the method further comprises one or more purification steps.

In some embodiments, the method comprises subjecting a sample comprising a target to a purification platform comprising, in order: (a) a capture step comprising processing via a protein A chromatography; (b) a depth filtration step comprising processing via a depth filter comprising a silica and a polyacrylic fiber; and (c) a purification step comprising processing via a cation exchange chromatography. In some embodiments, the depth filter is a XOSP depth filter. In some embodiments, the cation exchange chromatography is POROS 50HS. In some embodiments, the depth filter comprising the silica and the polyacrylic fiber is selected when the solution entering the depth filter is about 5 to about 6.5.

In some embodiments, the method comprises subjecting a sample comprising a target to a purification platform comprising, in order: (a) a capture step comprising processing via a protein A chromatography; (b) a depth filtration step comprising processing via a depth filter comprising a silica and a polyacrylic fiber; and (c) a purification step comprising processing via a HIC. In some embodiments, the depth filter is a XOSP depth filter. In some embodiments, the HIC is phenyl SEPHAROSE® fast flow chromatography. In some embodiments, the depth filter comprising the silica and the polyacrylic fiber is selected when the solution entering the depth filter is about 5 to about 6.5.

Additional Method Steps

In some embodiments, the methods described herein further comprise additional methods steps. In some embodiments, the method further comprises a cell culture step. In some embodiments, the method further comprises a formulation step, such as processing a composition to form a pharmaceutically acceptable composition, or a precursor thereof.

In some embodiments, the method further comprises determining the enzymatic hydrolysis activity rate of the composition. In some embodiments, the method further comprises performing a lipase activity assay on a composition obtained from a purification platform described herein. In some embodiments, the lipase activity assay comprises measuring the lipase activity of one or more hydrolytic enzymes by monitoring the conversion of a substrate, such as a non-fluorescent substrate, to a detectable product of the hydrolytic enzyme, such as a fluorescent product. In some embodiments, the substrate comprises an ester bond. In some embodiments, the method further comprises determining the product of one or more hydrolytic enzymes, e.g., as described in WO2018035025, which is hereby incorporated by reference in its entirety. In some embodiments, the method further comprises determining the level of free fatty acids (FFA) in a composition obtained from a purification platform described herein by performing a Fatty Acid Mass Spectrometry (FAMS) assay. In some embodiments, the method further comprises determining the level of one or more hydrolytic enzymes in the composition. In some embodiments, the method further comprises a determining a shelf-life of a composition. In some embodiments, the method further comprises determining the level of aggregates of a target in a composition.

Pharmaceutical Compositions

In some aspects, the present disclosure provides pharmaceutical compositions obtained from the purification platforms described herein. In some embodiments, the pharmaceutical composition is obtained from a method described herein. In some embodiments, the pharmaceutical composition is a purified composition. In some embodiments, the pharmaceutical composition is a sterile pharmaceutical composition.

In some embodiments, the pharmaceutical composition comprises an antibody moiety. In some embodiments, the pharmaceutical composition comprises an antibody moiety and a polysorbate. In some embodiments, the pharmaceutical composition comprises an antibody moiety, a polysorbate, and a host cell impurity, such as a host cell protein, e.g., a hydrolytic enzyme.

In some embodiments, the pharmaceutical composition comprises a polysorbate. In some embodiments, the pharmaceutical composition is selected from the group consisting of polysorbate 20, polysorbate 40, polysorbate 60, and polysorbate 80.

In some embodiments, the pharmaceutical composition has a reduced enzymatic hydrolysis activity rate, as compared to a composition obtained from purification of the same sample using the same purification platform without one or more of the depth filtration steps and/or one or more of the HIC steps.

In some embodiments, the pharmaceutical composition has a reduced level of one or more hydrolytic enzymes, as compared to a composition obtained from purification of the same sample using the same purification platform without one or more of the depth filtration steps and/or one or more of the HIC steps.

In some embodiments, the pharmaceutical composition has reduced degradation of a polysorbate, as compared to a composition obtained from purification of the same sample using the same purification platform without one or more of the depth filtration steps and/or one or more of the HIC steps.

In some embodiments, the pharmaceutical composition has increased shelf-life, as compared to a composition obtained from purification of the same sample using the same purification platform without one or more of the depth filtration steps and/or one or more of the HIC steps.

In some embodiments, the pharmaceutical composition has less degraded polysorbate, as compared to a composition obtained from purification of the same sample using the same purification platform without one or more of the depth filtration steps and/or one or more of the HIC steps.

In some embodiments, the pharmaceutical composition has reduced aggregation of a target, as compared to a composition obtained from purification of the same sample using the same purification platform without one or more of the depth filtration steps and/or one or more of the HIC steps.

Formulated Antibody Moiety Compositions

In some aspects, the present disclosure provides formulated antibody moiety compositions obtained from the purification platforms described herein. In some embodiments, the formulated antibody moiety composition is obtained from a method described herein.

In some embodiments, the formulated antibody moiety composition comprises an antibody moiety. In some embodiments, the formulated antibody moiety composition comprises an antibody moiety and a polysorbate. In some embodiments, the formulated antibody moiety composition comprises an antibody moiety, a polysorbate, and a host cell impurity, such as a host cell protein, e.g., a hydrolytic enzyme.

In some embodiments, the formulated antibody moiety compositions described herein have an increased shelf-life as compared to a reference, such as a formulated antibody moiety composition obtained from the same purification platform without one or more of the depth filtration steps and/or one or more of the HIC steps. In some embodiments, the shelf-life is assessed, such as measured, via aggregation of an antibody moiety of a formulated antibody moiety composition. In some embodiments, the shelf-life is assessed, such as measured, via preservation of one or more functionalities of an antibody moiety of a formulated antibody moiety composition. In some embodiments, the shelf-life is assessed, such as measured, via activity, such as binding activity, of an antibody moiety of a formulated antibody moiety composition.

In some embodiments, the formulated antibody moiety composition comprising an antibody moiety and a polysorbate has a reduced polysorbate hydrolysis activity rate, wherein the shelf-life of the composition is more than about 12 months, such as more than about any of 13 months, 14 months, 15 months, 16 months, 17 months, 18 months, 19 months, 20 months, 21 months, 22 months, 23 months, 24 months, 25 months, 26 months, 27 months, 28 months, 29 months, 30 months, 31 months, 32 months, 33 months, 34 months, 35 months, or 36 months. In some embodiments, the formulated antibody moiety composition having a reduced polysorbate hydrolysis activity rate is as compared to a reference, such as a formulated antibody moiety composition obtained from the same purification platform without one or more of the depth filtration steps and/or one or more of the HIC steps. In some embodiments, the reduced polysorbate hydrolysis activity rate is a reduced relative polysorbate hydrolysis activity rate.

In some embodiments, the formulated antibody moiety composition comprising an antibody moiety and a polysorbate has a reduced polysorbate hydrolysis activity rate, wherein the shelf-life of the composition is extended compared to the shelf-life indicated in documents filed with a health authority related to the formulated antibody moiety composition, and wherein the shelf-life is extended by at least about 2 months, such as at least about any of 3 months, 4 months, 5 months, 6 months, 7 months, 8 months, 9 months, 10 months, 11 months, or 12 months, as compared to the shelf-life indicated in said documents. In some embodiments, the formulated antibody moiety composition having a reduced polysorbate hydrolysis activity rate is as compared to a reference, such as a formulated antibody moiety composition obtained from the same purification platform without one or more of the depth filtration steps and/or one or more of the HIC steps. In some embodiments, the reduced polysorbate hydrolysis activity rate is a reduced relative polysorbate hydrolysis activity rate.

In some embodiments, the formulated antibody moiety composition comprising an antibody moiety and a polysorbate has a reduced degradation of polysorbate, wherein the degradation is reduced by at least about 5%, such as at least about any of 10%, 15%, 20%, 25%, 30%, 35%, 40%, 45%, 50%, 55%, 60%, 65%, 70%, 75%, 80%, 85%, 90%, 95%, or 100%, as compared to the degradation indicated in documents filed with a health authority related to the formulated antibody moiety composition. In some embodiments, the formulated antibody moiety composition having a reduced degradation of polysorbate is as compared to a reference, such as a formulated antibody moiety composition obtained from a same purification platform without one or more of the depth filtration steps and/or one or more of the HIC steps. In some embodiments, the reduced degradation of polysorbate is a reduced relative degradation of polysorbate.

In some embodiments, the polysorbate hydrolysis activity rate of a formulated antibody moiety composition is reduced by at least about 5%, such as at least about any of 10%, 15%, 20%, 25%, 30%, 35%, 40%, 45%, 50%, 55%, 60%, 65%, 70%, 75%, 80%, 85%, 90%, 95%, or 100%, as compared to a reference.

In some embodiments, the formulated antibody moiety composition comprises an antibody moiety and a polysorbate, wherein the polysorbate is degraded during storage of the liquid composition by about 50% or less per year, such as about any of 45% or less per year, 40% or less per year, 35% or less per year, 30% or less per year, 25% or less per year, 20% or less per year, 15% or less per year, 10% or less per year, or 5% or less per year.

In some embodiments, the formulated antibody moiety compositions described herein have reduced aggregate formation for at least about 6 months, such as at least about any of 7 months, 8 months, 9 months, 10 months, 11 months, 12 months, 13 months, 14 months, 15 months, 16 months, 17 months, 18 months, 19 months, 20 months, 21 months, 22 months, 23 months, or 24 months, as compared to a reference, such as a formulated antibody moiety composition obtained from the same purification platform without one or more of the depth filtration steps and/or one or more of the HIC steps. In some embodiments, the formulated antibody moiety compositions described herein have at least about 20% less, such as at least about any of 25% less, 30% less, 35% less, 40% less, 45% less, 50% less, 55% less, 65% less, 70% less, 75% less, 80% less, 85% less, 90% less, 95% less, or 100% less, aggregate formation as compared to a reference for at least about 6 months, such as at least about any of 7 months, 8 months, 9 months, 10 months, 11 months, 12 months, 13 months, 14 months, 15 months, 16 months, 17 months, 18 months, 19 months, 20 months, 21 months, 22 months, 23 months, or 24 months, wherein the reference is a formulated antibody moiety composition obtained from the same purification platform without one or more of the depth filtration steps and/or one or more of the HIC steps. Methods for assessing, such as measuring, aggregate formation are known in the art and include, e.g., visual inspection, dynamic light scattering, static light scattering, and optical density measurements.

In some embodiments, the formulated antibody moiety compositions described herein maintain at least about 50%, such as at least about any of 55%, 60%, 70%, 75%, 80%, 85%, 90%, 95%, 96%, 97%, 98%, 99%, of the antibody moiety activity, such as compared to a reference for at least about 6 months, such as at least about any of 7 months, 8 months, 9 months, 10 months, 11 months, 12 months, 13 months, 14 months, 15 months, 16 months, 17 months, 18 months, 19 months, 20 months, 21 months, 22 months, 23 months, or 24 months, wherein the reference is a formulated antibody moiety composition obtained from the same purification platform without one or more of the depth filtration steps and/or one or more of the HIC steps.

In some embodiments, the antibody moiety is a monoclonal antibody.

In some embodiments, the antibody moiety is a human, humanized, or chimeric antibody.

In some embodiments, the antibody is selected from the group consisting of an anti-CD20 antibody, an anti-CD40 antibody, an anti-HER2 antibody, an anti-IL6 antibody, an anti-IgE antibody, an anti-IL13 antibody, an anti-TIGIT antibody, an anti-PD-L1 antibody, an anti-VEGF-A antibody, an anti-VEGF-A/ANG2 antibody, an anti-CD79b antibody, an anti-ST2 antibody, an anti-factor D antibody, an anti-factor IX antibody, an anti-factor X antibody, an anti-abeta antibody, an anti-tau antibody, an anti-CEA antibody, an anti-CEA/CD3 antibody, an anti-CD20/CD3 antibody, an anti-FcRH5/CD3 antibody, an anti-Her2/CD3 antibody, an anti-FGFR1/KLB antibody, a FAP-4-1 BBL fusion protein, a FAP-IL2v fusion protein, and a TYRP1 TCB antibody.

In some embodiments, the antibody moiety is selected from the group consisting of ocrelizumab, pertuzumab, trastuzumab, tocilizumab, faricimab, polatuzumab, gantenerumab, cibisatamab, crenezumab, mosunetuzumab, tiragolumab, bevacizumab, rituximab, atezolizumab, obinutuzumab, lampalizumab, lebrikizumab, omalizumab ranibizumab, emicizumab, selicrelumab, prasinezumab, R06874281, and R07122290.

In some embodiments, the polysorbate is selected from the group consisting of polysorbate 20, polysorbate 40, polysorbate 60, and polysorbate 80.

Further aspects reported herein are formulated antibody compositions with low polysorbate degradation during storage. One aspect of the invention is a formulated antibody composition comprising an antibody/protein and a polysorbate, wherein the polysorbate is degraded during storage/shelf life of the formulated antibody composition by 20% or less (in one embodiment 15% or less, in one embodiment 12% or less, in one embodiment 10% or less, in one embodiment 9% or less, in one embodiment 8% or less, in one embodiment 7% or less, in one embodiment 6% or less, in one embodiment 5% or less, in one embodiment 4% or less, in one embodiment 3% or less, in one embodiment 2% or less, in one embodiment 1% or less) per year. In one embodiment the polysorbate is degraded during storage of the liquid composition by 10% or less per year.

Another aspect is a formulated antibody composition comprising an antibody and a polysorbate, wherein after one year the polysorbate is present in the composition at a concentration of at least 80% (in one embodiment at least 85%, in one embodiment at least 88%, in one embodiment at least 90%, in one embodiment at least 91%, in one embodiment at least 92%, in one embodiment at least 93%, in one embodiment at least 94%, in one embodiment at least 95%, in one embodiment at least 96%, in one embodiment at least 97%, in one embodiment at least 98%, in one embodiment at least 99% of the initial concentration, wherein the initial concentration is the concentration upon formulation or beginning of storage of the antibody in the liquid composition.

Exemplary Embodiments

Embodiment 1. A method of reducing an enzymatic hydrolysis activity rate of a composition obtained from a purification platform, the method comprising subjecting a sample to the purification platform comprising: (a) a capture step; and (b) a depth filtration step, thereby reducing the enzymatic hydrolysis activity rate of the composition as compared to purification of the sample using the same purification platform without the depth filtration step.

Embodiment 2. The method of embodiment 1, wherein the enzymatic hydrolysis activity rate is an enzymatic polysorbate hydrolysis activity rate.

Embodiment 3. The method of embodiment 1 or 2, wherein the relative reduction of the enzymatic hydrolysis activity rate of the composition, as compared to purification of the sample using the same purification platform without the depth filtration step, is at least about 20%.

Embodiment 4. A method of reducing the level of one or more hydrolytic enzymes in a composition obtained from a purification platform, the method comprising subjecting a sample to the purification platform comprising: (a) a capture step; and (b) a depth filtration step, thereby reducing the level of the hydrolytic enzyme in the composition as compared to purification of the sample using the same purification platform without the depth filtration step.

Embodiment 5. The method of embodiment 4, wherein the one or more hydrolytic enzymes are capable of hydrolyzing a polysorbate.

Embodiment 6. The method of embodiment 4 or 5, wherein the relative reduction of the level of one or more hydrolytic enzymes in the composition, as compared to purification of the sample using the same purification platform without the depth filtration step, is at least about 20%.

Embodiment 7. A method for reducing degradation of a polysorbate in a composition obtained from a purification platform, the method comprising subjecting a sample to the purification platform comprising: (a) a capture step; and (b) a depth filtration step, thereby reducing degradation of the polysorbate in the composition as compared to purification of the sample using the same purification platform without the depth filtration step.

Embodiment 8. The method of embodiment 7, wherein the relative reduction of degradation of the polysorbate in the composition, as compared to purification of the sample using the same purification platform without the depth filtration step, is at least about 5%.

Embodiment 9. The method of any one of embodiments 1-8, wherein the purification platform is for purification of a target from the sample, wherein the sample comprises the target and one or more host cell impurities.

Embodiment 10. The method of embodiment 9, wherein the target comprises a polypeptide.

Embodiment 11. The method of embodiment 9 or 10, wherein the host cell impurity is a host cell protein.

Embodiment 12. The method of any one of embodiments 1-11, wherein the depth filtration step is performed prior to the capture step, or the depth filtration step is performed after the capture step.

Embodiment 13. The method of any one of embodiments 1-12, wherein the depth filtration step comprises processing via a depth filter.

Embodiment 14. The method of embodiment 13, wherein the depth filter comprises a substrate comprising one or more of a diatomaceous earth composition, a silica composition, a cellulose fiber, a polymeric fiber, a cohesive resin, and an ash composition.

Embodiment 15. The method of embodiment 14, wherein at least a portion of the substrate of the depth filter comprises a surface modification.

Embodiment 16. The method of embodiment 15, wherein the surface modification is one or more of a quaternary amine surface modification, a cationic surface modification, and an anionic surface modification.

Embodiment 17. The method of any one of embodiments 14-16, wherein the depth filter is selected from the group consisting of an EMPHAZE™ depth filter, a PDD1 depth filter, a ZETA PLUS™ 120ZA depth filter, and a ZETA PLUS™ 120ZB depth filter.

Embodiment 18. The method of any one of embodiments 1-17, wherein the capture step comprises processing via affinity chromatography.

Embodiment 19. The method of embodiment 18, wherein the affinity chromatography is selected from the group consisting of a protein A chromatography, a protein G chromatography, a protein A/G chromatography, a protein L chromatography, a FcXL chromatography, a protein XL chromatography, a kappa chromatography, and a kappaXL chromatography.

Embodiment 20. The method of any one of embodiments 1-19, wherein the purification platform further comprises a virus inactivation step, wherein the virus inactivation step is performed after the capture step.

Embodiment 21. The method of embodiment 20, wherein the depth filtration step is performed after the virus inactivation step.

Embodiment 22. The method of any one of embodiments 1-21, wherein the purification platform further comprises another depth filtration step performed prior to the capture step.

Embodiment 23. The method of any one of embodiments 1-22, wherein the purification platform further comprises one or more purification steps, and wherein the one or more purification steps is performed after the capture step, the depth filtration step, and, if present, the virus inactivation step.

Embodiment 24. The method of embodiment 23, wherein the one or more purification steps comprise polypeptide purification steps.

Embodiment 25. The method of embodiment 23 or 24, wherein the purification platform further comprises another depth filtration step performed prior to, in between, or after the one or more purification steps.

Embodiment 26. The method of any one of embodiments 1-25, wherein the purification platform further comprises an ultrafiltration/diafiltration (UFDF) step, and wherein the UFDF step is performed after the one or more purification steps.

Embodiment 27. The method of embodiment 26, wherein the purification platform further comprises another depth filtration step performed prior to or after the UFDF step.

Embodiment 28. The method of any one of embodiments 1-27, wherein the purification platform further comprises a hydrophobic interaction chromatography (HIC) purification step.

Embodiment 29. The method of embodiment 28, wherein the HIC purification step is performed prior to, in between, or after the one or more purification steps, if present.

Embodiment 30. The method of embodiment 28, wherein the HIC purification step is performed after the one or more purification steps and prior to the UFDF step, if present.

Embodiment 31. The method of embodiment 26 or 27, wherein the purification platform further comprises a pH hold step, wherein the pH hold step is performed after the one or more purification steps, if present, and prior to the UFDF step.

Embodiment 32. The method of embodiment 31, wherein the purification platform further comprises a virus filtration step, wherein the virus filtration step is performed after the pH hold step and prior to the UFDF step.

Embodiment 33. The method of embodiment 32, wherein the virus filtration step comprises processing via a virus filter.

Embodiment 34. The method of embodiment 28, wherein the HIC purification step comprises processing via a HIC filter.

Embodiment 35. The method of any one of embodiments 23-34, wherein the one or more purification steps each independently comprise processing via a chromatography selected from the group consisting of: ion exchange chromatography, anion exchange chromatography, cation exchange chromatography, a hydrophobic charge induction chromatography, a ceramic hydroxyapatite chromatography, and a multimodal chromatography.

Embodiment 36. The method of any one of embodiments 23-35, wherein the one or more purification steps each independently comprise processing via a chromatography selected from the group consisting of: DEAE, DMAE, TMAE, QAE, SPSFF, SPXL, QSFF, MEP-Hypercel™, Capto MMC, and Capto Adhere.

Embodiment 37. A method of reducing an enzymatic hydrolysis activity rate of a composition obtained from a purification platform, the method comprising subjecting a sample to the purification platform comprising, in the following order: (a) a capture step comprising processing via affinity chromatography; (b) a virus inactivation step; (c) a second polypeptide purification step; (d) a third polypeptide purification step; and (e) a ultrafiltration/diafiltration (UFDF) step, wherein the purification platform further comprises a depth filtration step performed at one or more of the following: (i) prior to the capture step; (ii) after the capture step and prior to the virus inactivation step; (iii) after the virus inactivation step and prior to the second polypeptide purification step; (iv) after the second polypeptide purification step and prior to the third polypeptide purification step; or (v) after the third polypeptide purification step and prior to the ultrafiltration/diafiltration (UFDF) step; thereby reducing the enzymatic hydrolysis activity rate of the composition as compared to purification of the sample using the same purification platform without the depth filtration step.

Embodiment 38. The method of embodiment 37, wherein the purification platform further comprises, in the following order, a pH hold step and a virus filtration step performed after the third polypeptide purification step and prior to the UFDF step.

Embodiment 39. The method of embodiment 38, wherein the virus filtration step comprises processing via a virus filter.

Embodiment 40. The method of any one of embodiments 37-39, wherein the purification platform further comprises a hydrophobic interaction chromatography (HIC) purification step performed at one or more of the following: (i) after the third polypeptide purification step and prior to the pH hold step; (ii) after the pH hold step and prior to the virus filtration step; or (iii) after the virus filtration step and prior to the UFDF step.

Embodiment 41. The method of any one of embodiments 1-40, further comprising determining the enzymatic hydrolysis activity rate of the composition.

Embodiment 42. The method of any one of embodiments 1-41, further comprising determining the level of one or more hydrolytic enzymes in the composition.

Embodiment 43. The method of any one of embodiments 1-42, wherein the composition comprises a polysorbate.

Embodiment 44. The method of embodiment 43, wherein the polysorbate is selected from the group consisting of polysorbate 20, polysorbate 40, polysorbate 60, and polysorbate 80.

Embodiment 45. The method of any one of embodiments 1-44, further comprising a sample processing step.

Embodiment 46. The method of any one of embodiments 1-45, wherein the sample is, or is derived from, a cell culture sample.

Embodiment 47. The method of embodiment 46, wherein the cell culture sample comprises a host cell, and wherein the host cell is a Chinese hamster ovary (CHO) cell or an *E. coli* cell.

Embodiment 48. The method of any one of embodiments 1-47, wherein the sample comprises a host cell or components originating therefrom.

Embodiment 49. The method of any one of embodiments 1-48, wherein the sample comprises one or more host cell proteins, and wherein one of the one or more host cell proteins is a hydrolytic enzyme.

Embodiment 50. The method of embodiment 49, wherein the hydrolytic enzyme is a lipase, an esterase, a thioesterase, a phospholipase, or a ceramidase.

Embodiment 51. The method of any one of embodiments 1-50, wherein the sample comprises a target, and wherein the target is an antibody moiety.

Embodiment 52. The method of embodiment 51, wherein the antibody moiety is a monoclonal antibody.

Embodiment 53. The method of embodiment 51 or 52, wherein the antibody moiety is a human, humanized, or chimeric antibody.

Embodiment 54. The method of any one of embodiments 51-53, wherein the antibody moiety is selected from the group consisting of an anti-CD20 antibody, an anti-CD40 antibody, an anti-HER2 antibody, an anti-IL6 antibody, an anti-IgE antibody, an anti-IL13 antibody, an anti-TIGIT antibody, an anti-PD-L1 antibody, an anti-VEGF-A antibody, an anti-VEGF-A/ANG2 antibody, an anti-CD79b antibody, an anti-ST2 antibody, an anti-factor D antibody, an anti-factor IX antibody, an anti-factor X antibody, an anti-abeta antibody, an anti-tau antibody, an anti-CEA antibody, an anti-CEA/CD3 antibody, an anti-CD20/CD3 antibody, an anti-FcRH5/CD3 antibody, an anti-Her2/CD3 antibody, an anti-FGFR1/KLB antibody, a FAP-4-1 BBL fusion protein, a FAP-IL2v fusion protein, and a TYRP1 TCB antibody.

Embodiment 55. The method of any one of embodiments 51-54, wherein the antibody moiety is selected from the group consisting of ocrelizumab, pertuzumab, trastuzumab, tocilizumab, faricimab, polatuzumab, gantenerumab, cibisatamab, crenezumab, mosunetuzumab, tiragolumab, bevacizumab, rituximab, atezolizumab, obinutuzumab, lampalizumab, lebrikizumab, omalizumab ranibizumab, emicizumab, selicrelumab, prasinezumab, RO6874281, and RO7122290.

Embodiment 56. A pharmaceutical composition obtained from the method of any one of embodiments 1-55.

Embodiment 57. A formulated antibody moiety composition comprising an antibody moiety and a polysorbate wherein the composition has a reduced polysorbate hydrolysis activity rate, wherein the shelf-life of the composition is more than 24 months.

Embodiment 58. A formulated antibody moiety composition comprising an antibody moiety and a polysorbate, wherein the composition has a reduced polysorbate hydrolysis activity rate, wherein the shelf-life of the composition is extended compared to the shelf-life indicated in documents filed with a health authority related to the formulated antibody moiety composition, wherein the shelf-life is extended by at least 6 months compared to the shelf-life indicated in said documents.

Embodiment 59. A formulated antibody moiety composition comprising an antibody moiety, wherein the formulated antibody moiety composition has a reduced degradation of polysorbate, wherein the degradation is reduced by at least about 20% compared to the degradation indicated in documents filed with a health authority related to the formulated antibody moiety composition.

Embodiment 60. A formulated antibody moiety composition comprising an antibody moiety and a polysorbate, wherein the polysorbate is degraded during storage of the liquid composition by 20% or less per year.

Embodiment 61. The formulated antibody moiety composition of any one of embodiments 57-60, wherein the antibody moiety is a monoclonal antibody.

Embodiment 62. The formulated antibody moiety composition of any one of embodiments 57-61, wherein the antibody moiety is a human, humanized, or chimeric antibody.

Embodiment 63. The formulated antibody moiety composition of any one of embodiments 57-62, wherein the antibody is selected from the group consisting of an anti-CD20 antibody, an anti-CD40 antibody, an anti-HER2 antibody, an anti-IL6 antibody, an anti-IgE antibody, an anti-IL13 antibody, an anti-TIGIT antibody, an anti-PD-L1 antibody, an anti-VEGF-A antibody, an anti-VEGF-A/ANG2 antibody, an anti-CD79b antibody, an anti-ST2 antibody, an anti-factor D antibody, an anti-factor IX antibody, an anti-factor X antibody, an anti-abeta antibody, an anti-tau antibody, an anti-CEA antibody, an anti-CEA/CD3 antibody, an anti-CD20/CD3 antibody, an anti-FcRH5/CD3 antibody, an anti-Her2/CD3 antibody, an anti-FGFR1/KLB antibody, a FAP-4-1 BBL fusion protein, a FAP-IL2v fusion protein, and a TYRP1 TCB antibody.

Embodiment 64. The formulated antibody moiety composition of any one of embodiments 57-63, wherein the antibody moiety is selected from the group consisting of ocrelizumab, pertuzumab, trastuzumab, tocilizumab, faricimab, polatuzumab, gantenerumab, cibisatamab, crenezumab, mosunetuzumab, tiragolumab, bevacizumab, rituximab, atezolizumab, obinutuzumab, lampalizumab, lebrikizumab, omalizumab ranibizumab, emicizumab, selicrelumab, prasinezumab, RO6874281, and RO7122290.

Embodiment 65. The formulated antibody moiety composition of any one of embodiments 57-64, wherein the polysorbate hydrolysis activity rate is reduced by at least about 20%.

Embodiment 66. The formulated antibody moiety composition of any one of embodiments 57-65, wherein the polysorbate is selected from the group consisting of polysorbate 20, polysorbate 40, polysorbate 60, and polysorbate 80.

Embodiment 67. A method of reducing an enzymatic hydrolysis activity rate of a composition obtained from a purification platform, the method comprising subjecting a sample to the purification platform comprising, in order: (a) a capture step comprising processing via affinity chromatography; and (b) a purification step comprising processing via a chromatography selected from the group consisting of a HIC, a cation exchange chromatography, and a multimodal chromatography, wherein the purification platform further comprises one or more depth filtration steps, wherein the one or more depth filtration steps are performed at any one or more of: prior to the capture step; after the capture step; or after the capture step and prior to the purification step, wherein each depth filtration step comprises processing via a depth filter, and wherein the depth filter comprises materials selected from the group consisting of: (i) a silica and a polyacrylic fiber; (ii) a hydrogel Q (quaternary amine)-functionalized non-woven media and a multi-zone microporous membrane; and (iii) cellulose fibers, diatomaceous earth, and perlite, thereby reducing the enzymatic hydrolysis activity rate of the composition as compared to purification of the sample using the same purification platform without the one or more depth filtration steps.

Embodiment 68. The method of embodiment 67, wherein the enzymatic hydrolysis activity rate is an enzymatic polysorbate hydrolysis activity rate.

Embodiment 69. The method of embodiment 67 or 68, wherein the relative reduction of the enzymatic hydrolysis activity rate of the composition, as compared to purification of the sample using the same purification platform without the depth filtration step, is at least about 20%.

Embodiment 70. A method of reducing the level of one or more hydrolytic enzymes in a composition obtained from a purification platform, the method comprising subjecting a sample to the purification platform comprising, in order: (a) a capture step comprising processing via affinity chromatography; and (b) a purification step comprising processing via a chromatography selected from the group consisting of a HIC, a cation exchange chromatography, and a multimodal chromatography, wherein the purification platform further comprises one or more depth filtration steps, wherein the one or more depth filtration steps are performed at any one or more of: prior to the capture step; after the capture step and prior to the purification step; or after the purification step, wherein each depth filtration step comprises processing via a depth filter, and wherein the depth filter comprises materials selected from the group consisting of: (i) a silica and a polyacrylic fiber; (ii) a hydrogel Q (quaternary amine)-functionalized non-woven media and a multi-zone microporous membrane; and (iii) cellulose fibers, diatomaceous earth, and perlite, thereby reducing the level of one or more hydrolytic enzymes in the composition as compared to purification of the sample using the same purification platform without the one or more depth filtration steps.

Embodiment 71. The method of embodiment 70, wherein the one or more hydrolytic enzymes are capable of hydrolyzing a polysorbate.

Embodiment 72. The method of embodiment 70 or 71, wherein the relative reduction of the level of one or more hydrolytic enzymes in the composition, as compared to purification of the sample using the same purification platform without the depth filtration step, is at least about 20%.

Embodiment 73. A method of reducing degradation of a polysorbate in a composition obtained from a purification platform, the method comprising subjecting a sample to the purification platform comprising, in order: (a) a capture step comprising processing via affinity chromatography; and (b) a purification step comprising processing via a chromatography selected from the group consisting of a HIC, a cation exchange chromatography, and a multimodal chromatography, wherein the purification platform further comprises one or more depth filtration steps, wherein the one or more depth filtration steps are performed at any one or more of: prior to the capture step; after the capture step; or after the capture step and prior to the purification step, wherein each depth filtration step comprises processing via a depth filter, and wherein the depth filter comprises materials selected from the group consisting of: (i) a silica and a polyacrylic fiber; (ii) a hydrogel Q (quaternary amine)-functionalized non-woven media and a multi-zone microporous membrane; and (iii) cellulose fibers, diatomaceous earth, and perlite, thereby reducing degradation of a polysorbate in the composition as compared to purification of the sample using the same purification platform without the one or more depth filtration steps.

Embodiment 74. The method of embodiment 73, wherein the relative reduction of degradation of the polysorbate in the composition, as compared to purification of the sample using the same purification platform without the depth filtration step, is at least about 5%.

Embodiment 75. The method of any one of embodiments 67-74, wherein the depth filter comprising the silica and the polyacrylic fiber comprises a silica filter aid and a polyacrylic fiber pulp.

Embodiment 76. The method of any one of embodiments 67-74, wherein the depth filter comprising the hydrogel Q-functionalized non-woven media and the multi-zone microporous membrane comprises four layers comprising hydrogel Q-functionalized non-woven materials and a nine-zone microporous membrane.

Embodiment 77. The method of any one of embodiments 67-74, wherein the depth filter comprising cellulose fibers, diatomaceous earth, and perlite comprises two layers, wherein each layer comprises a cellulose filter matrix, wherein the cellulose filter matrix is impregnated with a filter aid comprising one or more of diatomaceous earth or perlite, and wherein each layer further comprises a resin binder.

Embodiment 78. The method of any one of embodiments 67-77, wherein the depth filter is selected based on the pH of the solution entering the depth filter.

Embodiment 79. The method of embodiment 78, wherein the depth filter comprising the silica and the polyacrylic fiber is selected when the solution entering the depth filter is about 5 to about 6.5.

Embodiment 80. The method of embodiment 78, wherein the depth filter comprising the hydrogel Q-functionalized non-woven media and the multi-zone microporous membrane is selected when the solution entering the depth filter is about 7 to about 8.5.

Embodiment 81. The method of any one of embodiments 67-80, further comprising selecting the depth filter based on the pH of the solution entering the depth filter.

Embodiment 82. The method of any one of embodiments 67-81, wherein the purification platform comprises, in order, a depth filtration step comprising processing via the depth filter comprising the hydrogel Q-functionalized non-woven media and a multi-zone microporous membrane, the capture step comprising processing via a protein A chromatography, and the purification step.

Embodiment 83. The method of embodiment 82, wherein the purification step comprises processing via the HIC.

Embodiment 84. The method of embodiment 83, wherein the HIC is phenyl SEPHAROSE® fast flow chromatography.

Embodiment 85. The method of embodiment 82, wherein the purification step comprises processing via the cation exchange chromatography.

Embodiment 86. The method of embodiment 85, wherein the cation exchange chromatography is POROS 50HS.

Embodiment 87. The method of any one of embodiments 67-86, wherein the purification platform further comprises a second depth filtration step comprising processing via the depth filter comprising the silica and the polyacrylic fiber, and wherein the second depth filtration step occurs after the capture step and prior to the purification step.

Embodiment 88. The method of embodiment 82, wherein the purification step comprises processing via the multimodal chromatography.

Embodiment 89. The method of embodiment 88, wherein the multimodal chromatography is Capto Adhere.

Embodiment 90. The method of embodiment 88 or 89, wherein the purification platform further comprises a second depth filtration step comprising processing via the depth filter comprising the hydrogel Q-functionalized non-woven media and a multi-zone microporous membrane, and wherein the second depth filtration step occurs after the capture step and prior to the purification step.

Embodiment 91. The method of any one of embodiments 67-90, wherein the purification platform is for purification of a target from the sample, wherein the sample comprises the target and one or more host cell impurities.

Embodiment 92. The method of embodiment 91, wherein the target comprises a polypeptide.

Embodiment 93. The method of embodiment 91 or 92, wherein the host cell impurity is a host cell protein.

Embodiment 94. The method of any one of embodiments 67-93, wherein the purification platform further comprises a virus inactivation step, wherein the virus inactivation step is performed after the capture step.

Embodiment 95. The method of embodiment 94, wherein the one or more depth filtration steps are performed after the virus inactivation step.

Embodiment 96. The method of any one of embodiments 67-95, wherein the purification platform further comprises an ultrafiltration/diafiltration (UFDF) step, and wherein the UFDF step is performed after the purification step.

Embodiment 97. The method of any one of embodiments 67-96, further comprising determining the enzymatic hydrolysis activity rate of the composition.

Embodiment 98. The method of any one of embodiments 67-97, further comprising determining the level of one or more hydrolytic enzymes in the composition.

Embodiment 99. The method of any one of embodiments 67-98, wherein the composition comprises a polysorbate.

Embodiment 100. The method of embodiment 99, wherein the polysorbate is selected from the group consisting of polysorbate 20, polysorbate 40, polysorbate 60, and polysorbate 80.

Embodiment 101. The method of any one of embodiments 67-100, further comprising a sample processing step.

Embodiment 102. The method of any one of embodiments 67-101, wherein the sample is, or is derived from, a cell culture sample.

Embodiment 103. The method of embodiment 102, wherein the cell culture sample comprises a host cell, and wherein the host cell is a Chinese hamster ovary (CHO) cell or an *E. coli* cell.

Embodiment 104. The method of any one of embodiments 67-103, wherein the sample comprises a host cell or components originating therefrom.

Embodiment 105. The method of any one of embodiments 67-104, wherein the sample comprises one or more host cell proteins, and wherein one of the one or more host cell proteins is a hydrolytic enzyme.

Embodiment 106. The method of embodiment 105, wherein the hydrolytic enzyme is a lipase, an esterase, a thioesterase, a phospholipase, or a ceramidase.

Embodiment 107. The method of any one of embodiments 67-106, wherein the sample comprises a target, and wherein the target is an antibody moiety.

Embodiment 108. The method of embodiment 107, wherein the antibody moiety is a monoclonal antibody.

Embodiment 109. The method of embodiment 107 or 108, wherein the antibody moiety is a human, humanized, or chimeric antibody.

Embodiment 110. The method of any one of embodiments 107-109, wherein the antibody moiety is selected from the group consisting of an anti-CD20 antibody, an anti-CD40 antibody, an anti-HER2 antibody, an anti-IL6 antibody, an anti-IgE antibody, an anti-IL13 antibody, an anti-TIGIT antibody, an anti-PD-L1 antibody, an anti-VEGF-A antibody, an anti-VEGF-A/ANG2 antibody, an anti-CD79b antibody, an anti-ST2 antibody, an anti-factor D antibody, an anti-factor IX antibody, an anti-factor X antibody, an anti-abeta antibody, an anti-tau antibody, an anti-CEA antibody, an anti-CEA/CD3 antibody, an anti-CD20/CD3 antibody, an anti-FcRH5/CD3 antibody, an anti-Her2/CD3 antibody, an anti-FGFR1/KLB antibody, a FAP-4-1 BBL fusion protein, a FAP-IL2v fusion protein, and a TYRP1 TCB antibody.

Embodiment 111. The method of any one of embodiments 107-110, wherein the antibody moiety is selected from the group consisting of ocrelizumab, pertuzumab, trastuzumab, tocilizumab, faricimab, polatuzumab, gantenerumab, cibisatamab, crenezumab, mosunetuzumab, tiragolumab, bevacizumab, rituximab, atezolizumab, obinutuzumab, lampalizumab, lebrikizumab, omalizumab ranibizumab, emicizumab, selicrelumab, prasinezumab, RO6874281, and RO7122290.

Embodiment 112. A pharmaceutical composition obtained from the method of any one of embodiments 67-111.

Those skilled in the art will recognize that several embodiments are possible within the scope and spirit of the disclosure of this application. The disclosure is illustrated further by the examples below, which are not to be construed as limiting the disclosure in scope or spirit to the specific procedures described therein.

EXAMPLES

Example

This example demonstrates a comparison between two purification platforms for purifying an antibody, trastuzumab, from unconditioned bulk using: (1) a common purification platform; and (2) an identical purification platform that included an additional PDD1 depth filtration step performed after conditioning the eluate from affinity chromatography and before cation-exchange (CEX) chromatography.

The common purification platform (1) was performed in duplicate and consisted of the following sequential steps: affinity chromatography, eluate conditioning, cation-exchange chromatography, anion-exchange chromatography, and tangential flow filtration and conditioning of the resulting pool from anion-exchange chromatography. Pool names and pool descriptions of the purification processes were as follows in Table 1.

TABLE 1

Purification pool names and pool descriptions.

| Pool name | Pool description |
| --- | --- |
| Condition affinity pool | Affinity pool that has been pH adjusted |
| Deep bed filtration pool | Filtration pool (flow-through) |
| Anion-exchange pool | Anion-exchange chromatography elution pool |
| Condition anion-exchange pool | Anion-exchange pool that has been pH adjusted |
| Unconditioned bulk | Tangential flow filtration pool after condition with diafiltration buffer |

The purification platform with the addition of a PDD1 depth filtration step (2) was performed in duplicate. Polysorbate hydrolytic activity at the unconditioned bulk level was compared by free fatty acid mass spectrometry (FAMS), the methodology of which is disclosed in more detail in the Materials and Methods section.

For the purification platform including a depth filtration step, the eluate was conditioned following affinity chromatography and prior to being filtered through a PDD1 depth filter (Pall PDD1; SUPRAcap™-50 SC050PDD1 (lot:

102992583); Area: 22 cm$^2$). The PDD1 depth filter was equilibrated using CEX equilibration buffer. The filtration of the conditioned affinity pool was pressure controlled. Filtration steps were performed at room temperature (15° C.-30° C.). Trastuzumab flowed through the PDD1 filter. Before usage and after filtration, the PDD1 depth filters were flushed with CEX equilibration buffer. The PDD1 depth filters were discarded after each use. Acceptable ranges of the CEX equilibration buffer were: 0.020-0.040 M MES (2-(N-morpholino) ethane sulfonic acid), 0.042-0.048 M NaCl, pH 5.50-5.70, and Conductivity of 5.10-5.70 mS/cm. Operation conditions of the PDD1 depth filters were as follows in Table 2.

TABLE 2

PDD1 depth filter operating conditions.

| Operation | Solution | Volume (L/m$^2$) |
|---|---|---|
| Equilibration | CEX equilibration buffer | 90 |
| Filtration (Pressure ≤ 5.0 bar) | Condition affinity pool | 290 |
| Rinse | CEX equilibration buffer | As required |

Cation-exchange chromatography (SP Sepharose® FF Chromatography) was carried out in a bind-and-elute mode. The cation-exchange step reduces the level of antibody aggregates, antibody variants, CHO HCP impurities, DNA, leached protein A, and other process-related impurities. Antibody charge variants are washed from the column with a gradient of increasing sodium chloride concentration and trastuzumab is eluted using a step elution. All chromatography steps are performed at ambient temperature (15° C.-30° C.).

Before loading onto the cation-exchange column, the affinity pool was conditioned by adjusting the pH to 5.5±0.3 with tris(hydroxymethyl)aminomethane (Tris) base. If the pool was over-titrated, the pool was adjusted to the specified pH with citric acid, followed by adjusting the conductivity to 3.5±1.0 mS/cm by the addition of highly purified water (if required). The cation-exchange column was equilibrated with equilibration buffer and loaded with the conditioned affinity pool. After loading, the column was washed with equilibration buffer, and then with a gradient wash of increasing conductivity, followed by equilibration buffer again. Trastuzumab was eluted from the column by a step elution with elution buffer. Collection of the eluate was initiated and terminated based on absorbance and volume.

Acceptable ranges of the CEX equilibration buffer were: 0.020-0.040 M MES, 0.042-0.048 M NaCl, pH 5.50-5.70, and Conductivity of 5.10-5.70 mS/cm. Acceptable ranges of the elution buffer were: 0.020-0.040 M MES, 0.092-0.098 M NaCl, pH 5.50-5.70, and Conductivity of 10.10-10.80 mS/cm. Operating conditions of the cation-exchange chromatography were as follows in Table 3.

TABLE 3

Cation-exchange chromatography operating conditions.

| | | Acceptable ranges | |
|---|---|---|---|
| Operation | Solution | Range | Flow rate (cm/h) |
| Bed Height | — | 32-38 cm | — |
| Equilibration | Equilibration buffer | ≥3 CV | ≤150 |
| Loading condition | 1.5M Tris base or 1M citric acid | pH 5.2-5.8 | NA |
| | HPW (if required) | Conductivity 2.5-4.5 mS/cm | NA |
| Load | Affinity pool | 10-45 g/L resin$^a$ | ≤150 |
| Wash 1 | Equilibration buffer | ≥3 CV | ≤150 |
| Gradient Wash | Equilibration buffer/ elution buffer gradient (21-72% elution buffer) | As required | ≤150 |
| Wash 2 | Equilibration buffer | ≥1.2 CV | ≤150 |
| Elution | Elution buffer | As required | ≤150 |

$^a$Grams trastuzumab per liter of SP Sepharose ® cation-exchange resin.

Anion-exchange chromatography (Q Sepharose® Chromatography) was performed in the flow-through mode and reduces CHO HCP, DNA, Protein A, and potential viruses. Under the load and wash conditions employed, trastuzumab flows through the column. All chromatography steps are performed at ambient temperature (15° C.-30° C.).

The pH of the cation-exchange pool was adjusted to pH 8.0±0.5 with Tris base, and MES if required, and the conductivity was adjusted with high purity water to 5.5-7.8 mS/cm. The anion-exchange column was equilibrated with equilibration buffer, and was then loaded with the pH-conditioned cation-exchange pool. After the load was complete, the column was washed with equilibration buffer. Pooling was based on absorbance and volume. The pH of the anion-exchange pool was adjusted to 6.0±0.1 with acetic acid.

Acceptable ranges of the equilibration buffer were: 0.015-0.035 M Tris, 0.025-0.075 M NaCl, and pH 7.5-8.5. Operating conditions of the cation-exchange chromatography were as follows in Table 4.

TABLE 4

Anion-exchange chromatography operating conditions.

| Operation | Solution |
|---|---|
| Bed Height | — |
| Equilibration | Equilibration buffer |
| Loading condition | 1.5M Tris base or 1M MES Highly purified water |
| Load | Condition normal flow virus filtration pool |
| Wash/Elution | Equilibration buffer |
| Pool pH adjustment | 0.5M acetic acid |

Tangential flow filtration (TFF) of the conditioned anion-exchange pool was performed for concentration and diafiltration. In order to achieve a protein concentration of 30±5 mg/mL for unconditioned bulk, the conditioned anion-exchange pool was concentrated by TFF device equipped with 30 kDa polyethersulfone (PES) membranes. Subsequently, the buffer composition was adjusted to meet the conditions by addition of a solution containing histidine.

Prior to use, the ultrafiltration membrane was equilibrated with diafiltration buffer. The conditioned anion-exchange pool was concentrated to an intermediate concentration of 10-50 g/L, diafiltered with a minimum of 8 pool volumes of diafiltration buffer in the TFF unit. Subsequently, the buffer composition was adjusted to 0.02 mol/L histidine/histidine HCl, pH 5.3±0.2 by addition of a corresponding amount of conditioning buffer. If necessary, the protein concentration was adjusted to 30±5 mg/mL by addition of diafiltration buffer.

The diafiltration buffer was 0.02 mol/L histidine/histidine-HCl, pH 5.3±0.2. Operating conditions of the cation-exchange chromatography were as follows in Table 5.

TABLE 5

TFF operating conditions.

| Operation | Solution | Range |
| --- | --- | --- |
| Equilibration TFF | Diafiltration buffer Condition anion-exchange pool | As required Depending on product amount 10-50 g/L |
| Diafiltration | Diafiltration buffer | ≥8 DV |

The amount of host cell proteins in the cation-exchange chromatography load composition was measured and results are provided in Table 6. A decrease in the level of host cell proteins was observed for both replicates of the purification platform with the PDD1 depth filter as compared to the common purification platform.

TABLE 6

Measured host cell proteins of cation-exchange chromatography load compositions.

| Process | Conc. OD280 | Density (L/m$^2$) | HCP [ng/mg] | HCP ml [ng/ml] |
| --- | --- | --- | --- | --- |
| Common (w/o PDD1 filtration) | 8.56 | —/— | 1558.3 | 13339.09 |
| w/PDD1 filtered Replicate 1 | 6.83 | 280 | 21.98 | 150.13 |
| w/PDD1 filtered Replicate 2 | 6.71 | 280 | 22.37 | 150.13 |

The amount of host cell proteins in the TFF pool after conditioning with diafiltration was measured and results are provided in Table 7. A decrease in the level of host cell proteins was observed for both replicates of the purification platform with the PDD1 depth filter as compared to the common purification platform.

TABLE 7

Measured host cell proteins of TFF pools after conditioning with diafiltration compositions.

| Process | Conc. OD280 (mg/ml) | HCP [ng/mg] | HCP [ng/ml] |
| --- | --- | --- | --- |
| Common (w/o PDD1 filtration) Replicate 1 | 29.1467 | <1 | 9.0 |
| Common (w/o PDD1 filtration) Replicate 2 | 29.3805 | <1 | 12.36 |
| w/PDD1 filtered Replicate 1 | 32.0042 | <1 | <1.2 |
| w/PDD1 filtered Replicate 2 | 28.7973 | <1 | <1.2 |

Figure 2:
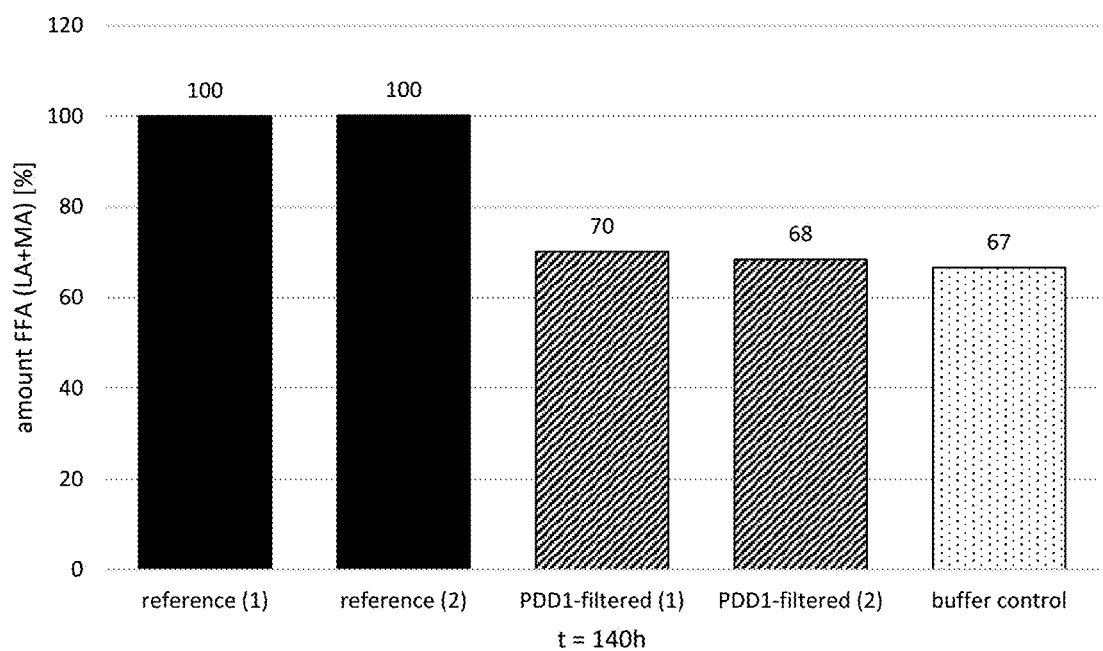
FIG. 2 shows a bar graph of the amount of free fatty acids measured in compositions obtained from purification platforms using a FAMS assay.

The hydrolytic activity in the TFF pool after conditioning with diafiltration was measured and results are provided in FIG. 2. Hydrolytic activity was measured using FAMS at 40° C., 0.04% (w/v) SR-PS20, 10 mM Methionine, 100 mM Tris pH 8.0, at a final trastuzumab concentration of 6 g/l. A decrease in the enzymatic hydrolysis activity rate, as indirectly measured by the amount of free fatty acids, was observed for both replicates of the purification platform with the PDD1 depth filter as compared to the replicates of the common purification platform (FIG. 2).

Materials and Methods

Determination of protein concentration. Protein concentrations were determined by UV spectroscopy either using a Cary® 50 UV-Vis Spectrophotometer (Varian) or Nano-Drop™ OneC (Thermo Scientific). Protein samples were diluted in their respective buffers and measured as duplicates. Concentrations were determined according to the following equation deriving from Lambert-Beer law: $c = (A\ 280\ nm - A\ 320\ nm)/\varepsilon \cdot d \cdot F$ with c protein concentration [mg/ml], A absorbance, $\varepsilon$ extinction coefficient [ml/(mg·cm)], d cell length [cm] and F dilution factor. Specific extinction coefficients for trastuzumab, faricimab and FAP-IL2v are 1.48, 1.7 and 1.35 ml/(mg·cm).

Lipase activity assay (LEAP assay). The lipase activity assay measured the lipase activity by monitoring the conversion of a non-fluorescent substrate (4-MU, Chem Impex Int'l Inc) to a fluorescent product (MU, Sigma-Aldrich) through the cleavage of the substrate ester bond. Protein pool samples to be analyzed were rebuffered to 150 mM Tris-Cl pH 8.0 by using Amicon Ultra-0.5 ml centrifugal filter units (10,000 Da cut-off, Merck Millipore). The assay reaction mixture contained 80 μL of reaction buffer (150 mM Tris-Cl pH 8.0, 0.25% (w/v) Triton X-100 and 0.125% (w/v) Gum Arabic), 10 μL 4-MU substrate (1 mM in DMSO), and 10 μL protein pool sample. Protein pool sample concentrations were adjusted to 10-30 g/L and tested at three different concentrations. Each reaction was set up in three technical replicates in 96-well half-area polystyrene plates (black with lid and clear flat bottom, Corning Incorporated) and the increase of fluorescent signal (excitation at 355 nm, emission at 460 nm) was monitored every 10 min by incubating the reaction plate for two hours at 37° C. in an Infinite 200Pro plate reader (Tecan Life Sciences). MU production rate was derived from the slope of the fluorescent time course (0.5 hour-2 hour), and represents the raw rate of a reaction (kraal [RFU/h]).

An enzyme blank reaction was additionally set up to measure any non-enzymatic cleavage of the substrate caused by the buffer matrix. 10 μL protein pool sample were replaced by 10 μL of 150 mM Tris-Cl pH 8.0 in the reaction mixture. The self-cleavage rate ($k_{self}$-cleavage [RFU/h]) was derived from the slope of the fluorescent time course (0.5 hour-2 hour). To convert the fluorescent signal (RFU) to μM of MU, a standard MU triplicate was added per plate. 10 MU (100 μM in DMSO) were supplemented with 10 μL of 150 mM Tris-Cl pH 8.0 and 80 μL of reaction buffer. The conversion factor a [RFU/μM] was calculated by averaging the fluorescent signal (0.5 hour-2 hour) and dividing it by the final concentration of MU present in the well.

The lipase activity for a sample given in [μM MU/h] was determined by subtracting the reaction rate of the enzyme blank ($k_{self}$-cleavage [RFU/h]) from the reaction rate of the sample ($k_{raw}$ [RFU/h]), and converting the fluorescent signal to μM MU/h by dividing the term by the conversion factor a [RFU/μM]. Activities were normalized to the protein concentration applied per well. To report hydrolytic activities in percent the lipase activity of the reference sample was set to 100%.

Free fatty acid and mass spectrometry (FAMS) assay. To monitor the content of free fatty acids after PS20 degradation in the respective elution fractions, samples were first prepared for PS20 stability studies and subsequently analyzed by mass spectrometry. Unless stated otherwise, protein pool samples were adjusted to the same protein concentration (as indicated in the respective experiment descriptions), containing 0.04% (w/v) SR-PS20, 10 mM L-Methionine and 100 mM Tris pH 8. L-methionine was added as an efficient antioxidant to control oxidative degradation of PS20 during the time-course of the experiment. As buffer control sample the applied protein volume was replaced by the same volume of the corresponding elution buffer system.

All reaction mixtures were incubated in a Thermomixer (Eppendorf) either at 37° C., or 40° C. under shaking at 600 rpm. Samples were withdrawn after defined time-points (as indicated in the respective figures, and stored at −80° C. until subsequent analysis.

50 μL of the sample was transferred to a new Eppendorf cup. 200 μL FFA dissolvent solution (500 ng/mL D23-lauric acid and 500 ng/mL $^{13}C_{14}$-myristic acid in acetonitrile) were added and vortexed briefly. The samples were centrifuged at 14.000 rpm for 5 minutes and transferred to an HPLC-vial for MS analysis. Separation of fatty acids from 5 μL of injected sample was performed on a Thermo Scientific™ Vanquish™ UHPLC-system using an ACQUITY UPLC® Peptide BEH C18 column (1.7 μm 2.1×150 mm and 300 Å). Eluent A (0.1% ammonium hydroxide in water) and Eluent B (100% acetonitrile) were used for the following gradient at a flow rate of 0.3 mL/min and a column temperature of 60° C. Initial conditions were at 70% eluent B. The gradient was changed linearly from 0.2 minute to 5.5 minute increasing eluent A to 100% and held until 6.0. Eluent B was set to 70% at 6.1 min and held until 10.0 min for equilibration. The Mass spectrometer (Triple TOF® 6600, AB Sciex) was operated in negative ionization mode with ion spray voltage at −4500 V. Source temperature was set to 450° C. and TOF mass range was 100-1000 m/Z. Declustering potential was −120 V and collision energy −10 V.

XICs for the masses of lauric acid, myristic acid, and isotopically labelled (D23)-lauric acid and ($^{13}C_{14}$) myristic acid were generated. Respective peaks were integrated and the peak area ratio between lauric acid and $D_{23}$-lauric acid as well as the ratio between myristic acid and $^{13}C_{14}$-myristic acid were determined. The peak area ratio was used to calculate the concentrations of lauric acid and myristic acid in the samples. Measurements were performed in duplicate. To report amount FFA (lauric acid (LA) and myristic acid (MA)) in percent the amount of the reference sample was set to 100%.

Example 2

This example demonstrates a comparison between three platforms for purifying an antibody, trastuzumab using: (1) a common purification platform; (2) the common purification platform with addition of a PDD1 depth filtration step performed after conditioning the eluate from affinity chromatography and before cation-exchange (CEX) chromatography; and (3) the common purification platform with addition of an EMPHAZE™ depth filtration step performed after conditioning the eluate from affinity chromatography and before cation-exchange (CEX) chromatography.

The common purification platform (1) consisted of the following: affinity chromatography, eluate conditioning, cation-exchange chromatography, anion-exchange chromatography, and tangential flow filtration and condition of the resulting pool from anion-exchange chromatography.

For the purification platforms including a depth filtration step, the eluate was conditioned following affinity chromatography and prior to being filtered through a depth filter. The PDD1 depth filter used was a Pall PDD1, SUPRAcap™-50 SC050PDD1 (lot.: 102992583), Area: 22 cm². The EMPHAZE™ depth filter used was EMPHAZE™ AEX Hybrid (lot.:S210650302), Area: 25 cm². Trastuzumab flows through the depth filters. Filtration steps are performed at ambient temperature (15° C.-30° C.).

Before usage, the depth filters were equilibrated using cation-exchange equilibration buffer. The filtration of the conditioned affinity pool is flow controlled. No rinsing was performed after filtration. This allows for the actual reduction of host cell proteins (enzymes) to be examined. The filters were discarded after each use. Acceptable ranges of the CEX equilibration buffer were: 0.020-0.040 M MES, 0.042-0.048 M NaCl, pH 5.50-5.70, and Conductivity of 5.10-5.70 mS/cm. Operation conditions of the depth filters were as follows in Table 8.

TABLE 8

Depth filter operating conditions.

| Operation | Solution | Volume (L/m²) | Flow (mL/min) |
|---|---|---|---|
| PDD1 filter flush | Water for injections | 90 | NA |
| EMPHAZE ™ filter flush | CEX equilibration buffer | 90 | NA |
| Equilibration | CEX equilibration buffer | 90 | NA |
| PDD1 Filtration (Pressure ≤2.4 bar) | Condition affinity pool | 227 | 10 |
| EMPHAZE ™ Filtration (Pressure ≤2.4 bar) | Condition affinity pool | 200 | 10 |
| Rinse | No | No | NA |

The amount of host cell proteins in the cation-exchange chromatography load composition was measured and results are provided in Table 9. Protein concentration measurements were performed according to Example 1. A decrease in the level of host cell proteins was observed for both the purification platform with the EMPHAZE™ depth filter and the purification platform with the PDD1 depth filter as compared to the common purification platform.

TABLE 9

Measured host cell proteins of cation-exchange chromatography load compositions.

| Sample | Conc. OD280 | Density (L/m²) | HCP [ng/mg] | HCP ml [ng/ml] |
|---|---|---|---|---|
| Common (w/o depth filtration) | 7.06 | —/— | 3653 | 25791.68 |
| w/EMPHAZE ™ filtration | 6.55 | 200 | 2160 | 14144.97 |
| w/PDD1 filtration | 6.45 | 227 | 4 | 27 |

Figure 3:
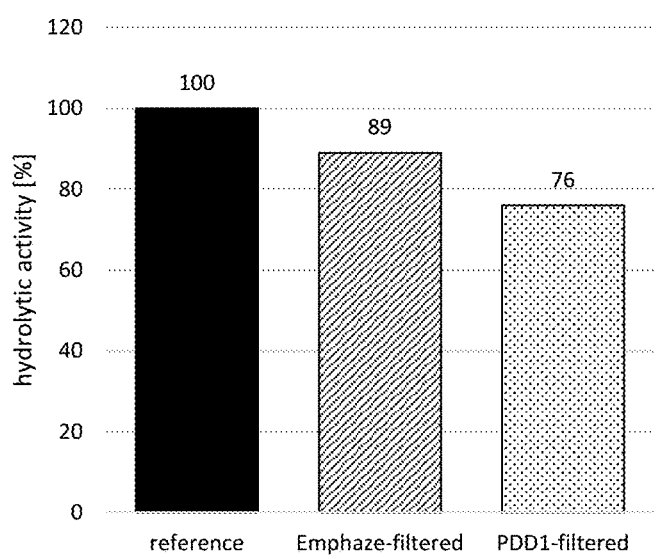
FIG. 3 shows a bar graph of the hydrolytic activity measured in compositions obtained from purification platforms using a lipase activity assay.

The lipase activity of the cation-exchange chromatography load of the common platform (after affinity chromatography, w/o depth filtration, reference) was compared to the corresponding cation-exchange chromatography load comprising an addition depth filtration step after affinity chromatography (FIG. 3). The lipase activity assay was performed according to Example 1.

Figure 4:
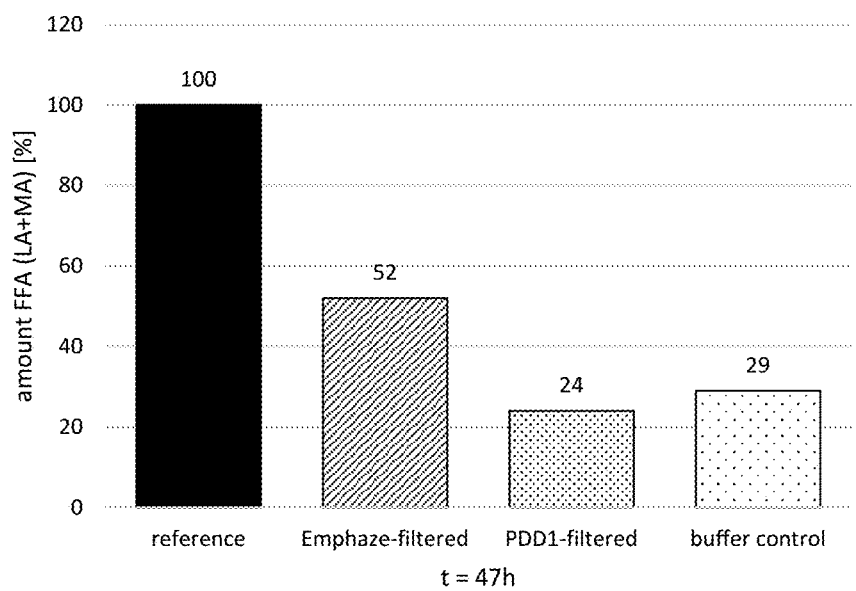
FIG. 4 shows a bar graph of the amount of free fatty acids measured in compositions obtained from purification platforms using a FAMS assay.

The hydrolytic activity of the cation-exchange chromatography load of the common platform (after affinity chromatography, w/o depth filtration, reference) were compared to the corresponding cation-exchange chromatography load comprising an addition depth filtration step after affinity chromatography (FIG. 4). FAMS analysis was performed according to Example 1. Hydrolytic activity was measured using FAMS at 40° C., 0.04% (w/v) SR-PS20, 10 mM Methionine, 100 mM Tris pH 8.0, and at a final trastuzumab concentration of 4.8 g/l. A decrease in the enzymatic hydrolysis activity rate, as measured by the lipase activity assay (FIG. 3) and a decrease in the amount of FAA in the FAMS assays (FIG. 4), was observed for both purification platforms comprising a depth filter as compared to the common purification platform.

Example 3

This example demonstrates use of purification platforms for purifying an anti-VEGF/Ang2 antibody using a depth filtration step performed on HCCF (harvest cell fluid) prior to sterilization and a second depth filter step performed after affinity chromatography (CaptureSelect™ FcXL). The purification platforms used are detailed in FIG. 5. A reference control was performed using the illustrated purification process without the additional depth filtration step of the HCCF (FIG. 5).

Figure 5:
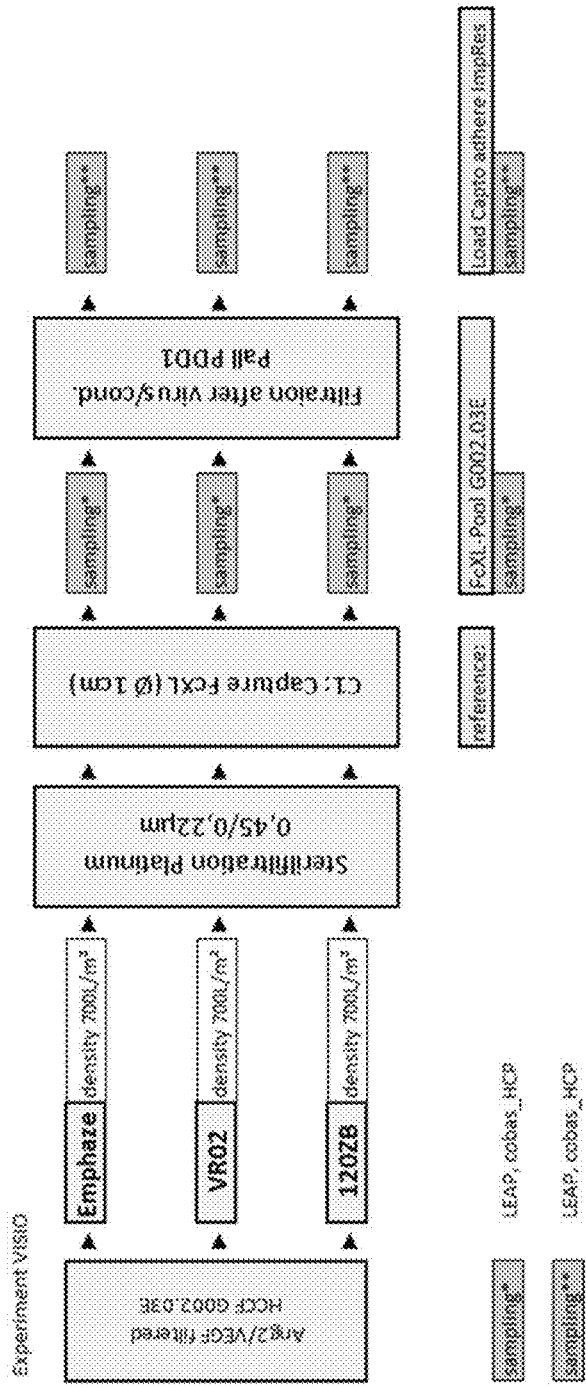
FIG. 5 shows a schematic of purification options for faricimab.

As shown in FIG. 5, the HCCF was filtered through three different depth filters designed to remove potential host cell proteins. Antibody flows through the filters. Filtration steps are performed at ambient temperature (15° C.-30° C.).

Before usage, the three depth filters were equilibrated using affinity equilibration buffer for EMPHAZE™ (EMPHAZE™ AEX Hybrid (lot.:S228585702), Area: 25 cm$^2$), VR02 (BioCap_VR02 (lot.:3923452), Area: 25 cm$^2$), and 120ZB (BioCap_120 ZB (lot.: 3923452), Area: 25 cm$^2$), and using cation-exchange equilibration buffer for PDD1 (SUPRAcap™-50 SC050PDD1 (lot.:103119429), Area: 22 cm$^2$). The filtration of the HCCF was pressure controlled (FeedPress=0.2 MPa; maximum feed flow: 25 mL/minute). Filtration of the conditioned affinity pools was flow controlled (FeedFlow=5.2 ml/min; pressure controlled: 0.2 MPa). After filtration the filters were flushed with the same buffers for product recovery. Filters were discarded after each use. Equilibration buffers are provided in Table 10.

TABLE 10

Depth filter equilibration buffers.

| Filter | Equilibration buffer |
| --- | --- |
| Filter 1 (EMPHAZE ™) | 25 mM Tris, 25 mM NaCl, pH 7.20 |
| Filter 2 (VR02) | 25 mM Tris, 25 mM NaCl, pH 7.20 |
| Filter 3 (120ZB) | 25 mM Tris, 25 mM NaCl, pH 7.20 |
| Filter 4 (PDD1) | 50 mM Tris/Acetate, pH 7.20 |

A PDD1 filter flush was performed using 200 mL (~90 L/m$^2$) of water for injections. An EMPHAZE™ filter flush was performed using 200 mL (~90 L/m$^2$) of Cl equilibration buffer. The filtered HCCF volume was 1750 mL (~700 L/m$^2$ for EMPHAZE™).

Operating conditions for CaptureSelect FcXL was performed as follows in Table 11.

TABLE 11

Operating conditions for CaptureSelect FcXL.

| Step | Buffer | Duration | Flow |
| --- | --- | --- | --- |
| Load Phase | HCCF | Load density 29 g/L | ≤200 cm/h |
| Wash 1 | 25 mM Tris, 25 mM NaCl, pH 7.20 | ≥2 CV | ≤200 cm/h |

TABLE 11-continued

Operating conditions for CaptureSelect FcXL.

| Step | Buffer | Duration | Flow |
| --- | --- | --- | --- |
| Wash 2 | H$_2$O | ≥5 CV | ≤200 cm/h |
| Elution | 30 mM Acidic Acid, pH 3.2 | OD *$^1$2.5 / 2.5 AU but max 1.6 CV (Flow Cell 1 cm) | ≤150 cm/h |
| Post Elution | 30 mM Acidic Acid, pH 3.2 | ≥1 CV | ≤200 cm/h |

The amount of host cell proteins load was measured at various points of the purification platforms (see FIG. 5) and results are provided in Table 12.

TABLE 12

Measured host cell proteins in compositions obtained for purification platforms. Asterisks reflect sampling points as indicated in FIG. 5.

| Sample | Density (L/m$^2$) | HCP [ng/mg] | HCP ml [ng/ml] |
| --- | --- | --- | --- |
| w/o Affinity Pool | — | 30094 | 516710.93 |
| w/o Load MM | — | 1051 | 18988.43 |
| EMPHAZE ™ Affinity Pool* | 700 | 17596 | 108568.63 |
| VR02 Affinity Pool* | 700 | 12814 | 63696.26 |
| 120ZB Affinity Pool* | 700 | 16109 | 122527.27 |
| EMPHAZE ™ PDD1 filtered** | 700 | 135 | 512.39 |
| VR02 PDD1 filtered** | 700 | 80 | 310.12 |
| 120ZB PDD1 filtered** | 700 | 335 | 2224.19 |

Figure 6A:
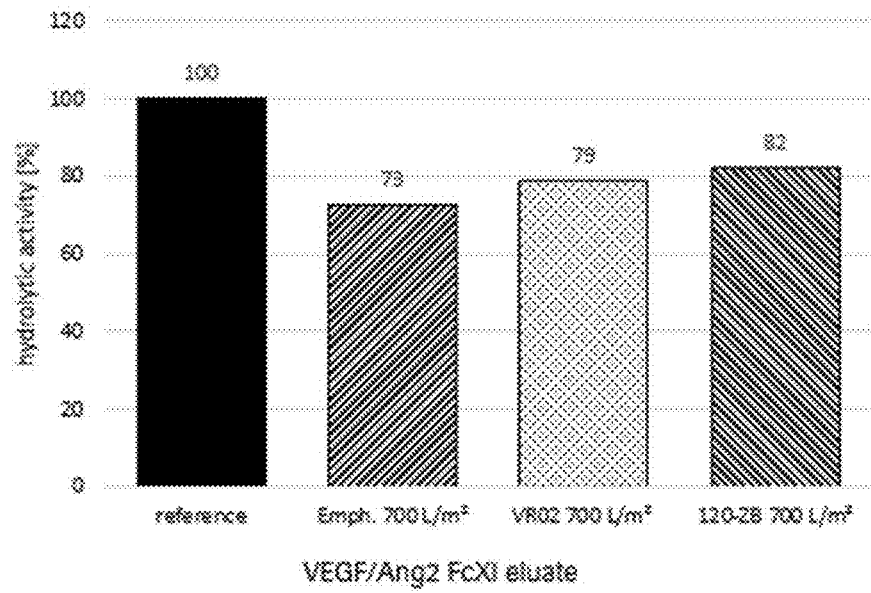
FIGS. 6A and 6B show bar graphs of PS20 hydrolytic activity measured in FcXL eluate for faricimab before (FIG. 6A) and after filtration on PDD1 filter (FIG. 6B).
Figure 6B:
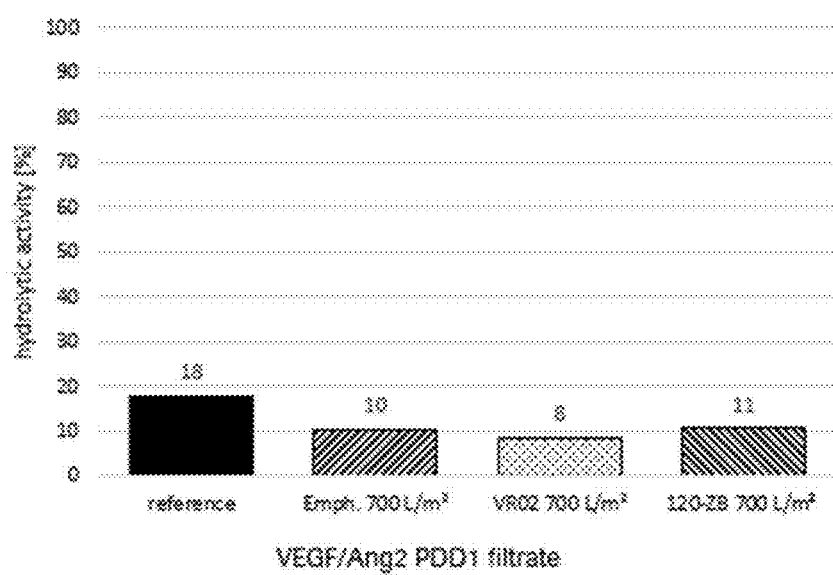

Hydrolytic activity was measured by lipase activity assay as described in Example 1. A decrease in the enzymatic hydrolysis activity rate of the FcXL eluate of the different purification platforms was observed with either of the tested depth filters (EMPHAZE™, VR02, and 120ZB) as compared to the common purification platform without an additional depth filter (FIG. 6A). A decrease in the enzymatic hydrolysis activity rate of the PDD1 filtrate of the different purification platforms was observed with either of the tested depth filters (EMPHAZE™, VR02, and 120ZB) as compared to the common purification platform without an additional depth filter (FIG. 6B).

Figure 7:
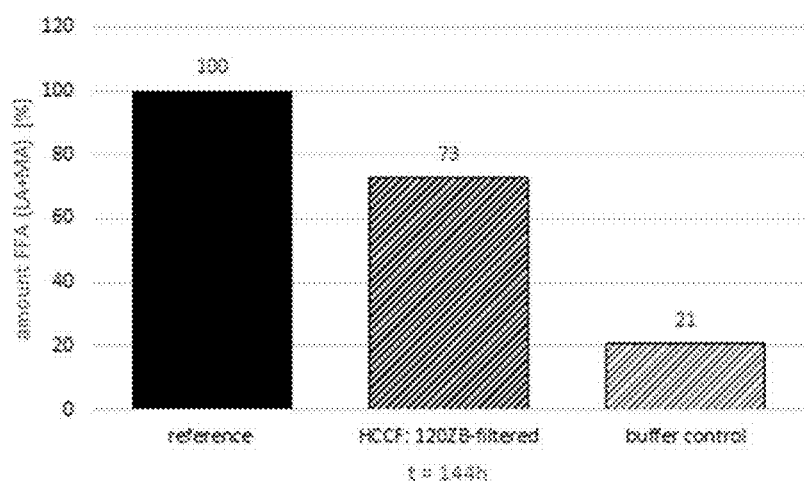
FIG. 7 shows a bar graph of the amount of free fatty acids measured in compositions obtained from purification platforms using a FAMS assay.

A FAMS assay was performed to compare two purification platforms for purifying an antibody to the strong cation exchange chromatography pool: (1) a common purification platform; and (2) an identical purification platform that included an additional 120 ZB depth filtration step performed prior to affinity chromatography. The common purification platform consisted of the following sequential steps: affinity chromatography, eluate conditioning, depth filtration, multi modal anion exchange chromatography, strong cation exchange chromatography and tangential flow filtration. The FAMS assay was performed according to Example 1 and the following conditions: 37° C., 0.04% (w/v) SR-PS20, 10 mM Methionine, 150 mM Tris pH 8.0, at a final antibody concentration of 50 g/l. A decrease in the enzymatic hydrolysis activity rate, as measured by the amount of free fatty acids, was observed for the purification platform with the 120ZB depth filter as compared to the common purification platform (FIG. 7).

Example 4

This example demonstrates a comparison of purification platforms for purifying anti-FAP-IL2v incorporating two different depth filters, XOSP or PDD1, for filtering the conditioned affinity chromatography (protein A chromatography) eluate.

HCCF samples were prepared and filtered as recited in Example 1.

Figure 8A:
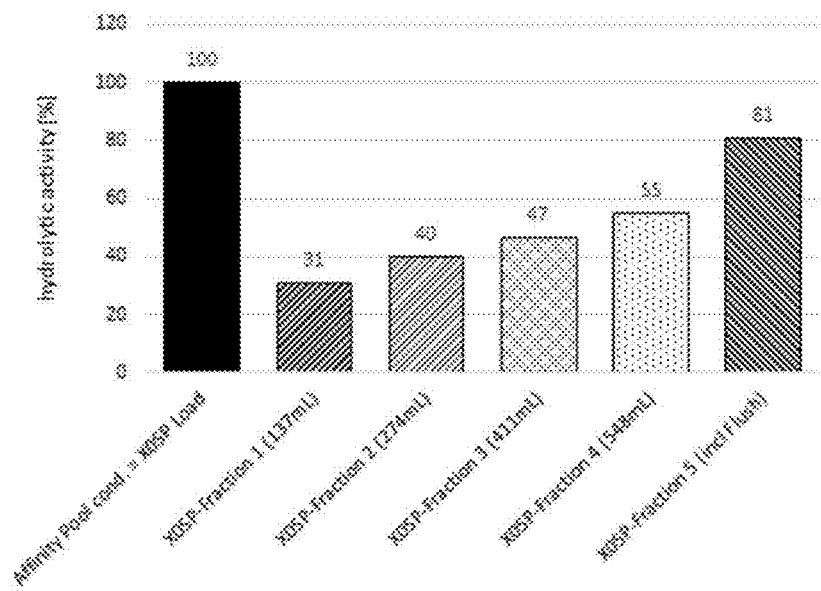
FIGS. 8A-8B show bar graphs of the hydrolytic activity measured in protein A eluates following filtration using a depth filter.
Figure 8B:
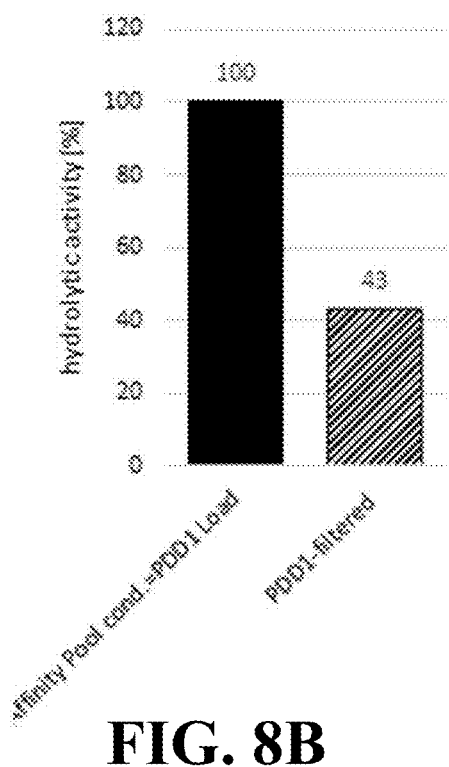

The lipase activity of protein A chromatography eluates of a common platform (without depth filtration) were compared to affinity chromatography eluates of depth filtration containing purification platforms with either a XOSP or a PDD1 depth filtration step performed on the protein A chromatography eluate. The lipase activity assay was performed according to Example 1. Results of lipase activity in fractions obtained from the XOSP depth filter are shown in FIG. 8A. Results of lipase activity obtained from the PDD1 depth filter are shown in FIG. 8B.

Example 5

This example demonstrates purification optimization experiments for purification of various antibody moieties performed to find options that minimize the hydrolytic degradation of polysorbate in antibody moiety compositions obtained from the purification platforms. Experiments disclosed herein evaluate the inclusion of depth filters, such as EMPHAZE™, as protein A and second chromatographic columns load filter, and a HIC medium (SARTOBIND® phenyl membrane) as a polishing column elution pool filter or load filter to the subsequent virus filtration step.

The potential to remove or reduce hydrolytic enzymes responsible for polysorbate degradation were evaluated for several depth filters including EMPHAZE™ and XOSP. The incorporation of an EMPHAZE™ filter was evaluated at two processing levels in a common mAb purification process flow. The first option is as a protein A load filter prior to protein A chromatography, where the HCCF is filtered before loading onto a protein A column. As summarized in Table 13, the relative hydrolytic activity is reduced by more than 40% when filtering the HCCF before protein A chromatography as compared to the common purification process.

TABLE 13

Relative hydrolytic activity of compositions obtained from a purification platform.

| Molecule | Load Material | Throughput (L/m²) | % Reduction in polysorbate degradation in ProA pools |
|---|---|---|---|
| Tocilizumab | HCCF | 300 | 47% |
| Ocrelizumab | HCCF | 800 | 39% |
| Anti-Influenza A mAb | HCCF | 280 | 93% |
| Selicrelumab | HCCF | 500 | 50% |

Figure 9:
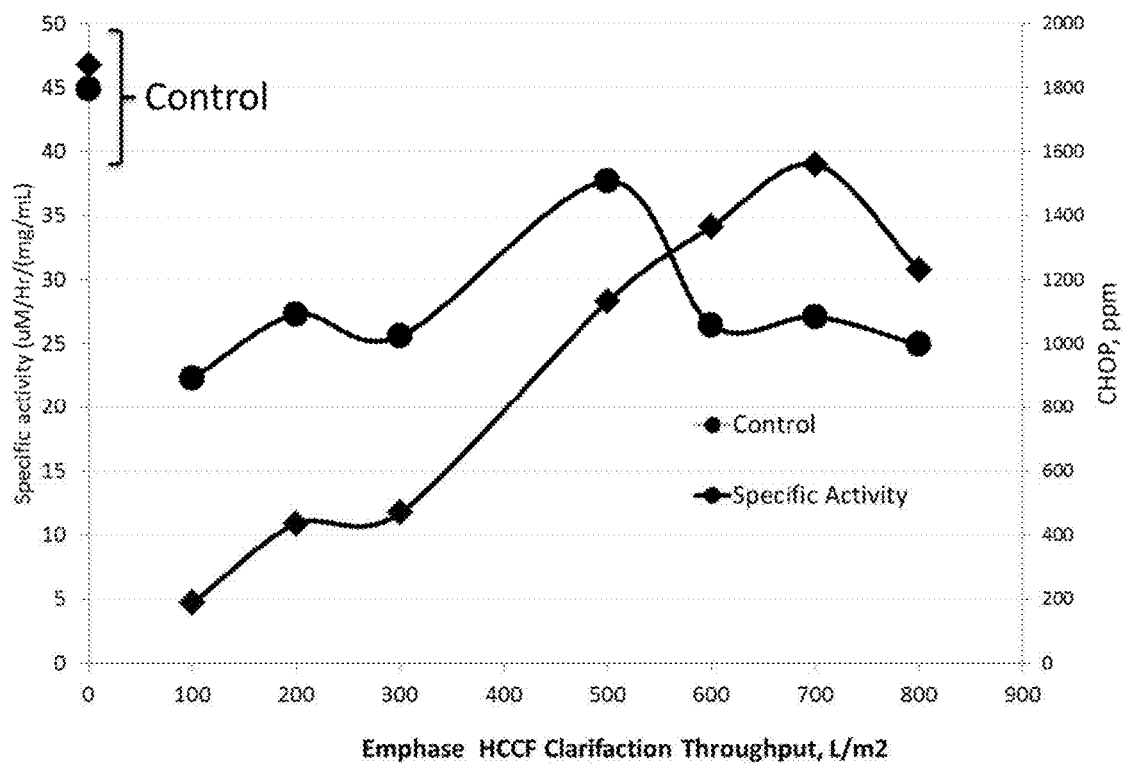
FIG. 9 shows relative levels of CHOP and polysorbate degradation activity of protein A eluates following EMP-HAZE™ depth filter clarification.

To demonstrate that the reduction in polylobate degradation achieved with EMPHAZE™ was not related to the reduction in host cell protein alone, HCCF samples at increasing EMPHAZE™ throughput were purified over Protein A and pools were analyzed for both CHOP and polysorbate degradation activity. As shown in FIG. 9, the reduction in CHOP value was dependent on EMPHAZE™ filtration throughput while the significant decrease in polysorbate degradation rate was relatively constant. The significant decrease in polysorbate degradation specific activity achieved compared to the control remains relatively constant up to 800 L/m² throughput despite a continuous increase in CHOP value nearly as high as the control with increasing EMPHAZE™ clarification throughput.

Figure 10:
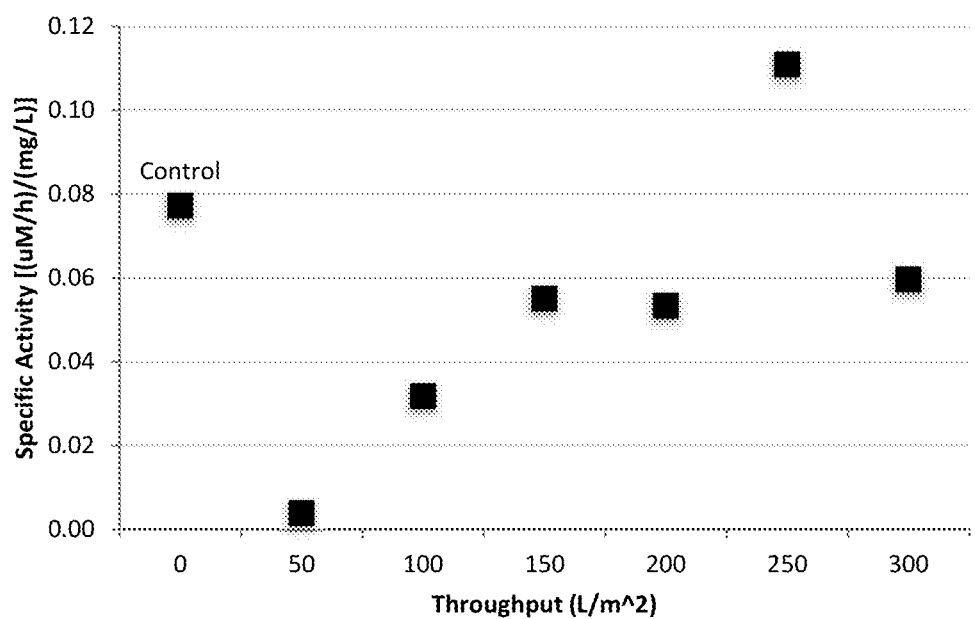
FIG. 10 shows specific activity of polysorbate degradation of a composition obtained from a XOSP depth filter (pH 5.5.) at different throughputs.

The second option evaluated was placement of EMPHAZE™ and XOSP depth filters downstream of the viral inactivation step or as load filter to the $2^{nd}$ column chromatography. For this evaluation, Protein A pools from several molecules were neutralized either to pH 5.5 or pH 8.0 and filtered over EMPHAZE™ or XOSP to 300 L/m² throughput. Polysorbate hydrolytic activities of filtered pools were compared to the control unfiltered samples. As summarized in Table 14, both EMPHAZE™ and XOSP filters showed significant reduction on polysorbate degradation compared to unfiltered controlled pools. As shown in FIG. 10, the polysorbate hydrolytic activities (as measured using the lipase activity assay in the purification of Anti-Tau mAb of the protein A pool) is dependent on filter throughput for the XOSP depth filter. at pH 5.5.

TABLE 14

Hydrolytic activity of compositions obtained from purification platforms.

| Molecule | Protein A pool pH | Filter Type | Specific degradation rate | % Reduction in PS20 degradation rate compared to reference |
|---|---|---|---|---|
| Anti-Tau mAb | 5.5 | X0SP | 14.3 | 33 |
| | | EMPHAZE ™ | — | 11 |
| Pertuzumab | 5.5 | X0SP | 0 | 100 |
| | 8 | EMPHAZE ™ | 39.4 | 36 |

Use of a HIC membrane was evaluated as an approach for reducing polysorbate degradation. The HIC membrane can be placed after the last polypeptide chromatography column step (e.g., anion-exchange chromatography), after a pH hold step (e.g., pH 5-6) performed prior to virus filtration, and/or after a virus filtration step performed prior to an UFDF step.

Figure 11A:
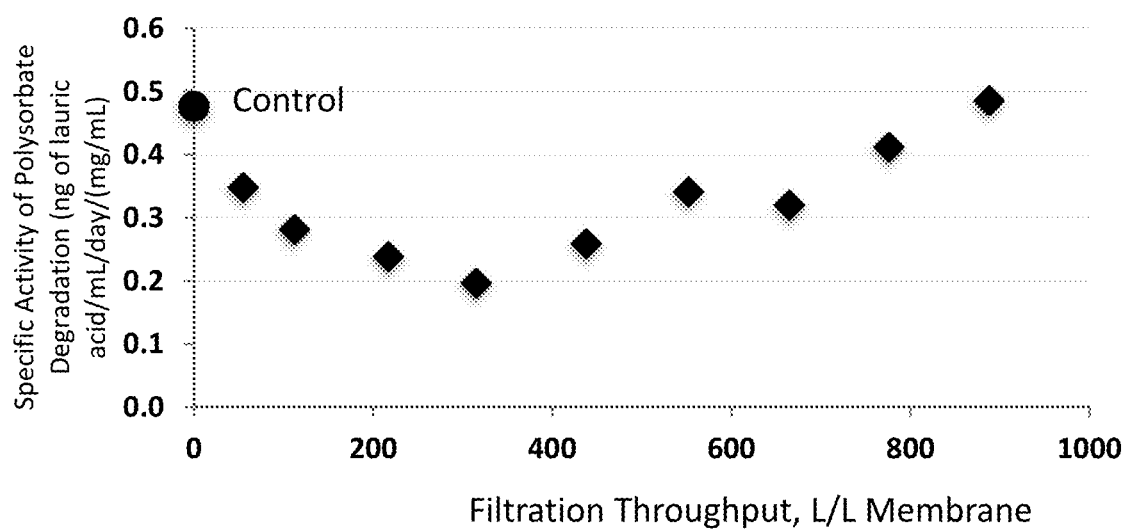
FIGS. 11A-11C show specific activity of polysorbate degradation at different throughputs for ocrelizumab at pH 5.5 (FIG. 11A), selicrelumab at pH 5.5 (FIG. 11B), and tocilizumab at pH 6.5 (FIG. 11C).
Figure 11B:
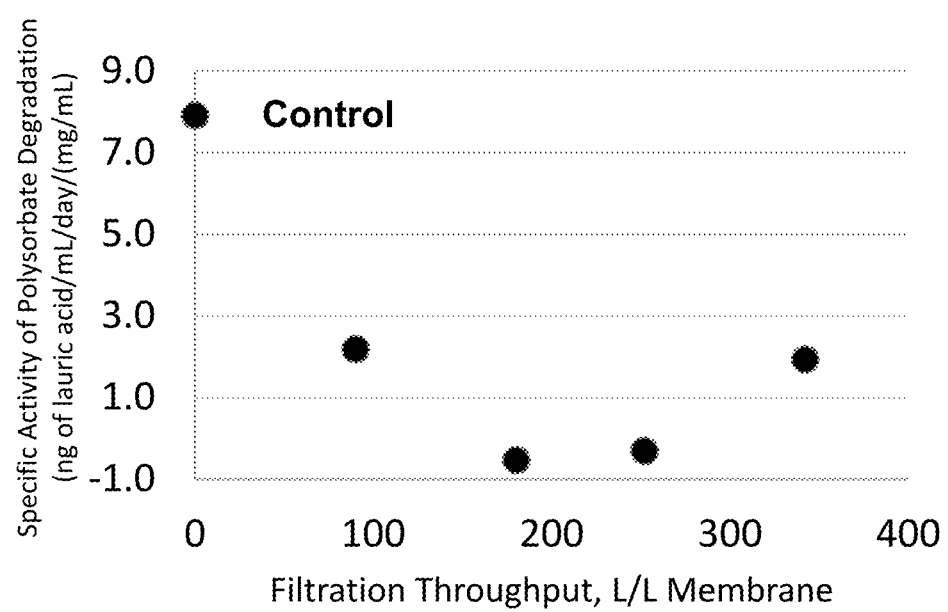
Figure 11C:
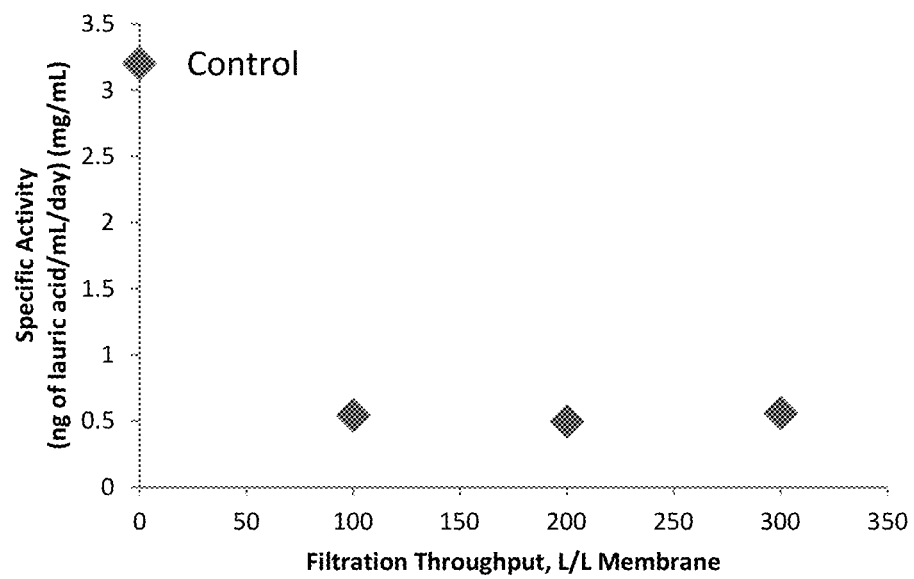

The primary HIC membrane evaluated in this study was a SARTOBIND® phenyl membrane. Last polypeptide chromatographic pools after adjusting to different pH values were filtered over a SARTOBIND® membrane filter. The filtered pools were analyzed for relative polysorbate degradation. As shown in FIGS. 11A-11C, the relative polysorbate activity decreased significantly compared to control. The same data also shows that the reduction in activity is membrane volume throughput dependent (FIGS. 11A-11C). Specifically, FIG. 11A shows specific activity of polysorbate degradation at different throughputs for ocrelizumab at pH 5.5. FIG. 11B shows specific activity of polysorbate degradation at different throughputs for selicrelumab at pH 5.5. FIG. 11B shows specific activity of polysorbate degradation at different throughputs for tocilizumab at pH 6.5 (FIG. 11C).

Materials and Methods

Resins Pro A Sepharose® FF, Fractogel® TMAE and Ceramic Hydroxyapatite resins were purchased from GE Healthcare (Uppsala, Sweden), TOSOH Biosciences (King of Prussia, PA) and Bio-Rad (Hercules, California) respectively. Amicon centrifugal filters and XOSP depth filters were from Millipore (Bedford, MA). EMPHAZE™ AEX depth filter was obtained for 3M (Meriden, CT) and SARTOBIND® phenyl membrane is from Sartorius (Bohemia, NY). 4-methyl umbelliferyl caprylate, Triton™ X-100 and gum arabic were obtained from Research Organcis (Cleveland, OH), and Acros Organics (Bridgewater, NJ), respectively. Super refined (SR) grade PS20 used in lipases activity assays was from Croda (Newark, NJ). All the monoclonal antibodies reported here were humanized or human IgG1s expressed in CHO cells and were produced at Roche (South San Francisco or Oceanside, CA).

For small scale EMPHAZE™ and other depth filters, 25 cm² sized capsules were used. The filter was first flushed with 25 mM Tris, 250 mM NaCl pH 7.5 for 100 L/m2 at 8 ml/min flow rate. Following equilibration, either HCCF (Pro A load) or neutralized protein A elution pool was filtered up to 800 L/m². Fractions were collected every 100 L/m² and purified over subsequent column steps and the polysorbate degradation activity measured.

For SARTOBIND® phenyl membrane evaluation, 3 ml sized device was used. The membrane was first flushed with 30 ml of equilibration buffer at 15 L/min flow rate. Following equilibration, the last chromatographic pool was filtered over SARTOBIND® phenyl membrane and fractions were collected and assayed for relative polylobate degradation activity.

All small-scale chromatographic runs were performed on 0.66 cm×20 cm columns. For Protein A purification, the column was first pre-equilibrated in equilibration buffer and HCCF was loaded to 10-20 g/L resin. Following loading, the column was washed with equilibration buffer for >3 column volumes and wash buffer for >4 column volumes. Bound protein was eluted with 2.5 mM HCl pH 2.7 or 150 mM acetic acid. Elution fractions from 0.5 OD to 0.5 OD were collected and neutralized to pH 5 and assayed for polysorbate degradation activity.

The lipase enzymatic activities were examined by following the cleavage of an ester bond in umbelliferyl substrates with structures similar to polysorbate. In this study, reaction mixture was prepared by mixing 10 µL of 10 mM 4-methyl umbelliferyl caprylate in DMSO, with 80 µL of reaction buffer (50 mM Tris, pH 8.0, 0.4% Triton™ X-100 and 0.1% gum arabic). The fluorescent excitation and emission wavelengths were set at 355 nm and 460 nm respectively. Fluorescence kinetics was continuously monitored for 2-4 hours at 37° C. Lipase activity of each sample was determined by calculating the initial reaction rate of the kinetic cure using a linear fitting and corrected for buffer only reaction rate to account for background hydrolysis. Specific activity is determined by dividing reaction rate by sample protein concentration.

The Protein samples were sterile filtered with 0.2 µm fluorodyne syringe filters and spiked with a 25× conditioning buffer (20 mg/mL methionine, 1% w/v SR PS20 in 10 mM histidine acetate pH 5). The spiked samples were aliquoted into Eppendorf tubes under aseptic condition and incubated at 25° C. for up to 20 days. Aliquots were taken at each time point and frozen at −70° C. until extraction for free fatty acid is performed.

The free fatty acids in each sample were extracted by acetonitrile solution containing isotope labeled FFA internal standards. After centrifugation at 14000 rpm for 5 minutes, the supernatants were transferred into HPLC vials with glass inserts and frozen until measurement. A Waters H-class Bio UPLC system with a Waters ACQUITY UPLC® BEH300 C18 (1.7 µm, 2.1×150 mm) column was used in combination of an AB Sciex 6600 mass spectrometer for FFA detection. Separation of free fatty acids from 5 µL of injected sample were performed using 5 mM ammonium acetate and 0.1% ammonium hydroxide in water as Buffer A and 100% acetonitrile as Buffer B at flow rate of 0.3 mL/min, column temperature of 60° C. The method started with 70% buffer B for 0.2 min, followed by a gradient to 100% B over 5.3 min and then returned to 70% B in 0.1 min and equilibrated at 70% B for 3.9 min. Mass spectrometer was operated in negative ionization mode with ion spray voltage at −4500 V. Source temperature was set to 450° C. and TOP mass range was 100-1000 m/z. Declustering potential was −120 V and collision energy was −10 V. Accumulation of FFA in the linear range was fitted to a linear regression to calculate the initial hydrolysis rate.

Host cell proteins in all in-process samples were measured by an in-house CHO protein (CHOP) ELISA assay and DNA was quantitated by an in-house qPCR method.

Example 6

This example demonstrates comparisons between the following two purification platforms for antibody purification, the purification platforms including: (1) depth filtration of HCCF using a 120ZB10A depth filter followed by protein A chromatography; or (2) depth filtration of HCCF using an EMPHAZE™ AEX depth filter followed by protein A chromatography.

Figure 12:
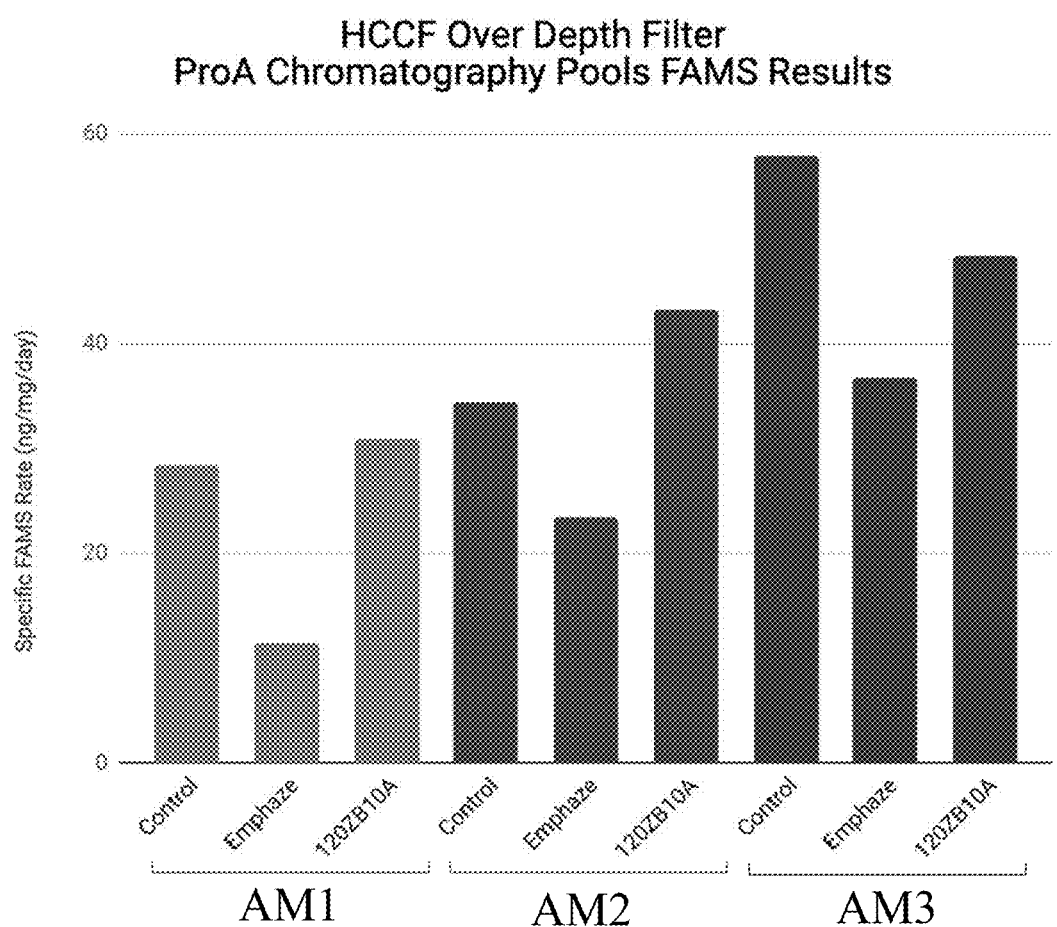
FIG. 12 shows a bar graph of specific FAMS rates of compositions obtained from purification platforms.

Harvest cell culture fluid (HCCF) from three different cell cultures for the expression of three different antibody moieties (AM1, AM2, and AM3) were individually collected. For the purification platform with a 120ZB10A depth filtration step (purification platform (1)), each HCCF pool was separately subjected to 120ZB10A depth filtration (at 300 L/m²), and then subjected to protein A chromatography. Aliquots of the pools following protein A chromatography were collected. Polysorbate hydrolytic activity of the aliquots was measured using FAMS, the methodology of which is disclosed in more detail in the Materials and Methods section of Example 1. The measured specific FAMS rates for the aliquots following protein A chromatography are shown in FIG. 12. Aliquots of the HCCF pools (prior to depth filtration) were used to obtain control measurements.

For the purification platform with an EMPHAZE™ AEX depth filtration step (purification platform (2)), each HCCF pool was separately subjected to EMPHAZE™ AEX depth filtration (at 300 L/m²), and then subjected to protein A chromatography. Aliquots of the pools following protein A chromatography were collected. Polysorbate hydrolytic activity of the aliquots was measured using FAMS, the methodology of which is disclosed in more detail in the Materials and Methods section of Example 1. The measured specific FAMS rates for the aliquots following protein A chromatography are shown in FIG. 12. Aliquots of the HCCF pools (prior to depth filtration) were used to obtain control measurements.

Example 7

This example demonstrates comparisons between the following two purification platforms for antibody purification, the purification platforms including: (1) protein A chromatography of HCCF followed by activated charcoal (40CR) filtration followed by cation ion exchange chromatography using POROS® 50HS; or (2) protein A chromatography of HCCF followed by depth filtration using a XOSP depth filter followed by HIC using phenyl SEPHAROSE® fast flow.

Figure 13:
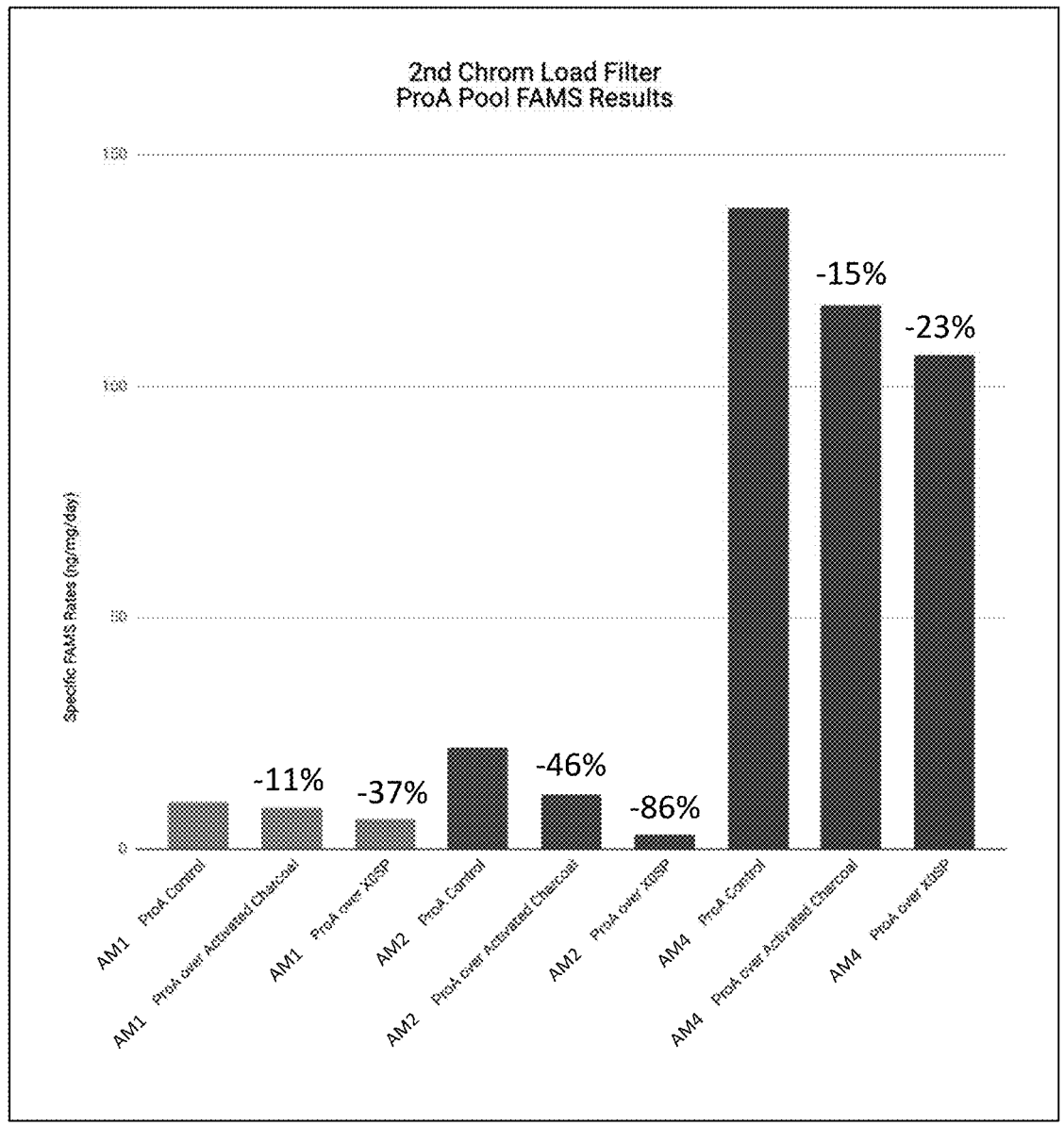
FIG. 13 shows a bar graph of specific FAMS rates of compositions obtained from purification platforms.
Figure 14:
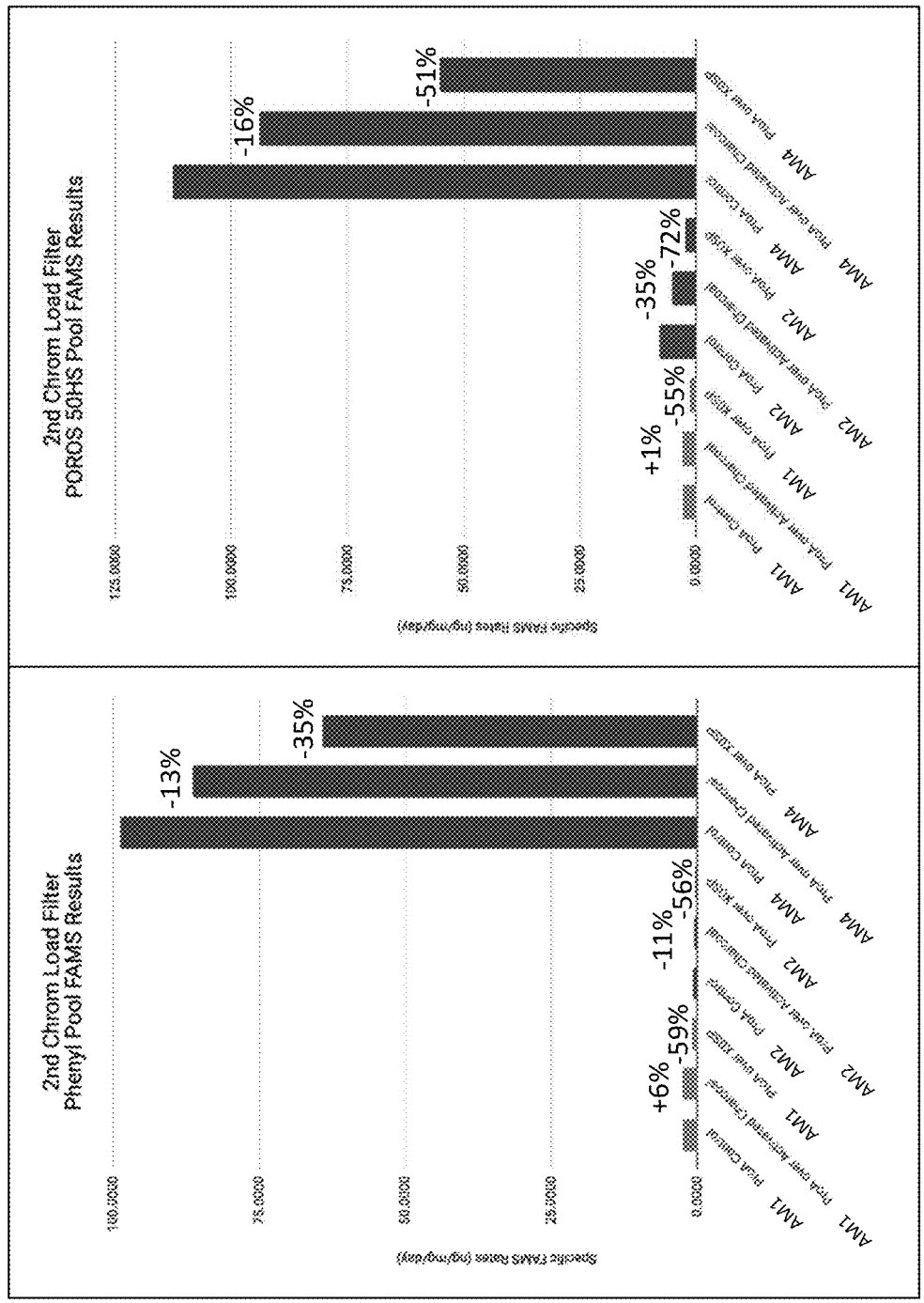
FIG. 14 shows a bar graph of specific FAMS rates of compositions obtained from purification platforms.

Harvest cell culture fluid (HCCF) from three different cell cultures for the expression of three different antibody moieties (AM1, AM2, and AM4) were individually collected. For the purification platform without a depth filtration step (purification platform (1)), the three HCCF samples were each separately subjected to protein A chromatography. The protein A chromatography pools were conditioned by adjusting the pH to 5.5±0.3 with tris(hydroxymethyl)aminomethane (Tris) base, and then the conditioned pools were separately subjected to 40CR filtration (at 300 L/m$^2$) followed by POROS® 50 HS chromatography. Aliquots of the pools following 40CR filtration and aliquots of the pools following POROS® 50HS filtration were collected. Polysorbate hydrolytic activity of the aliquots was measured using FAMS, the methodology of which is disclosed in more detail in the Materials and Methods section of Example 1. The measured specific FAMS rates for the aliquots of the pools following 40CR filtration and the aliquots of the pools following POROS® 50HS chromatography are shown in FIG. 13 and FIG. 14, respectively. Aliquots of the protein A chromatography pools (without 40CR filtration) were used to obtain control measurements.

For the purification platform with a XOSP depth filtration step (purification platform (2)), the three HCCF samples were each separately subjected to protein A chromatography. The protein A chromatography pools were conditioned by adjusting the pH to 5.5±0.3 with tris(hydroxymethyl)aminomethane (Tris) base, and then the conditioned pools were separately subjected to XOSP filtration (at 300 L/m$^2$) followed by processing using phenyl SEPHAROSE® fast flow chromatography. Aliquots of the pools following XOSP filtration and aliquots of the pools following phenyl SEPHAROSE® fast flow chromatography were collected. Polysorbate hydrolytic activity of the aliquots was measured using FAMS, the methodology of which is disclosed in more detail in the Materials and Methods section of Example 1. The measured specific FAMS rates for the aliquots of the pools following XOSP filtration and the aliquots of the pools following phenyl SEPHAROSE® fast flow chromatography are shown in FIG. 13 and FIG. 14, respectively. Aliquots of the protein A chromatography pools (without XOSP depth filtration) were used to obtain control measurements.

Example 8

This example demonstrates comparisons between the following three purification platforms for antibody purification, the purification platforms including: (1) protein A chromatography of HCCF followed by activated charcoal (40CR) filtration followed by multimodal chromatography using Capto Adhere; (2) protein A chromatography of HCCF followed by depth filtration using an EMPHAZE™ depth filter followed by multimodal chromatography using Capto Adhere; or (3) protein A chromatography of HCCF followed by depth filtration using a PDD1 depth filter followed by multimodal chromatography using Capto Adhere.

Figure 15:
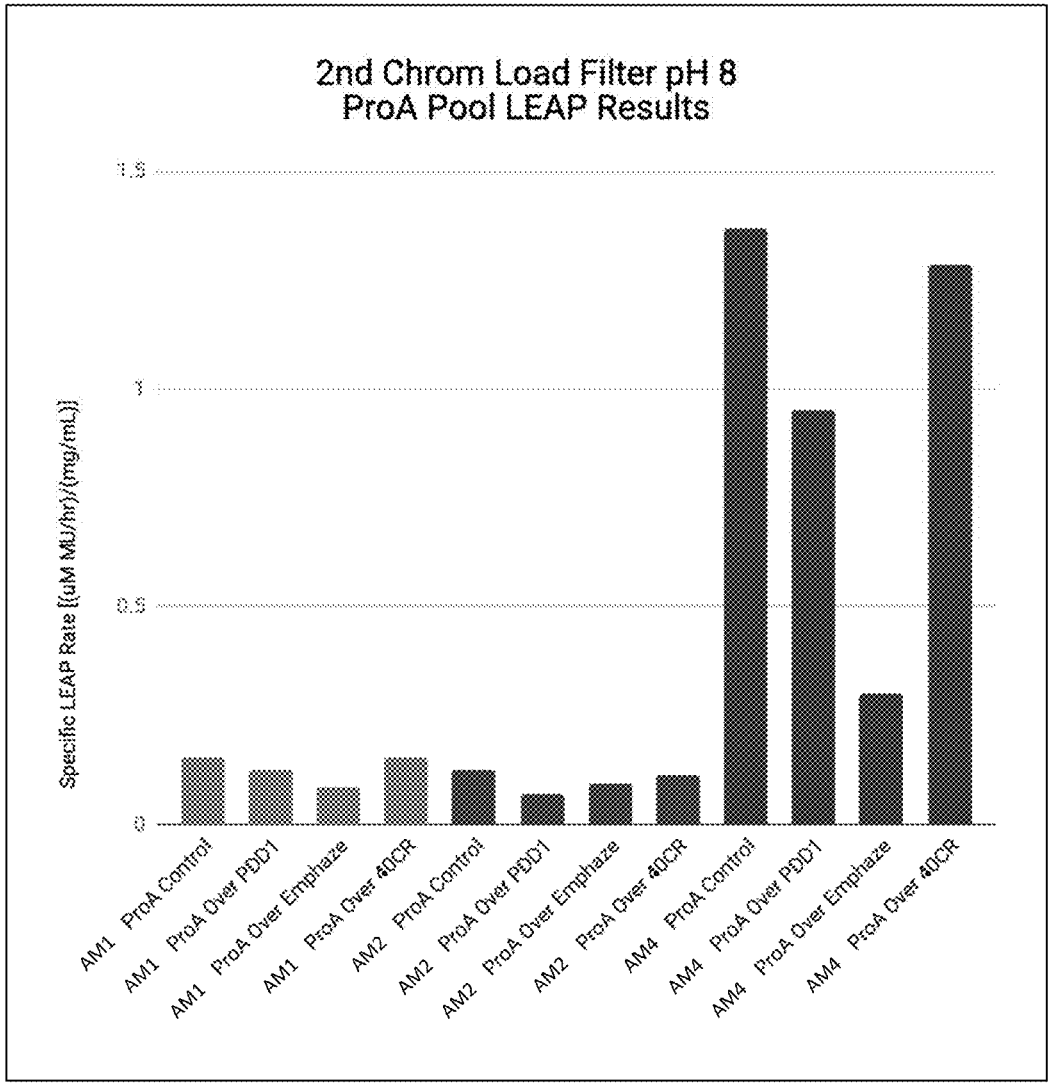
FIG. 15 shows a bar graph of specific LEAP rates of compositions obtained from purification platforms.

Harvest cell culture fluid (HCCF) from three different cell cultures for the expression of three different antibody moieties (AM1, AM2, and AM4) were individually collected. For the purification platform without a depth filtration step (purification platform (1)), the three HCCF samples were each separately subjected to protein A chromatography. The protein A chromatography pools were conditioned by adjusting the pH to 8.0±0.5 with Tris base, and then the conditioned pools were separately subjected to 40CR filtration (at 300 L/m$^2$) followed by Capto Adhere chromatography. Aliquots of the pools following 40CR filtration were collected. Polysorbate hydrolytic activity of the aliquots was measured using the LEAP assay, the methodology of which is disclosed in more detail in the Materials and Methods section of Example 1. The measured specific LEAP rates for the aliquots of the pools following 40CR filtration are shown in FIG. 15. Aliquots of the protein A chromatography pools (without 40CR filtration) were used to obtain control measurements.

For the purification platform with an EMPHAZE™ depth filtration step (purification platform (2)), the three HCCF samples were each separately subjected to protein A chromatography. The protein A chromatography pools were conditioned by adjusting the pH to 8.0±0.5 with Tris base, and then the conditioned pools were separately subjected to EMPHAZE™ depth filtration (at 300 L/m$^2$) followed by Capto Adhere chromatography. Aliquots of the pools following EMPHAZE™ depth filtration were collected. Polysorbate hydrolytic activity of the aliquots was measured using the LEAP assay, the methodology of which is disclosed in more detail in the Materials and Methods section of Example 1. The measured specific LEAP rates for the aliquots of the pools following EMPHAZE™ depth filtration are shown in FIG. 15. Aliquots of the protein A chromatography pools (without EMPHAZE™ depth filtration) were used to obtain control measurements.

For the purification platform with a PDD1 depth filtration step (purification platform (3)), the three HCCF samples were each separately subjected to protein A chromatography. The protein A chromatography pools were conditioned by adjusting the pH to 8.0±0.5 with Tris base, and then the conditioned pools were separately subjected to PDD1 depth filtration (at 300 L/m$^2$) followed by Capto Adhere chromatography. Aliquots of the pools following PDD1 depth filtration were collected. Polysorbate hydrolytic activity of the aliquots was measured using the LEAP assay, the methodology of which is disclosed in more detail in the Materials and Methods section of Example 1. The measured specific LEAP rates for the aliquots of the pools following PDD1 depth filtration are shown in FIG. 15. Aliquots of the protein A chromatography pools (without PDD1 depth filtration) were used to obtain control measurements.

Example 9

This example demonstrates the evaluation and comparison of workflows for purifying a TYRP1 TCB antibody (such as disclosed in PCT/EP2019/08614, which is incorporated herein by reference in its entirety), wherein the workflows use different pre-C1 depth filters followed by a pre-C2 filtration step using a MerckMillipore Millistak+® HC Pro XOSP filter. The pre-C1 depth filters compared are a depth filter comprising chemically defined synthetic materials (3M™ EMPHAZE™ AEX Hybrid Purifier) and a harvest clarification depth filter (ZETA PLUS™ EXT ZB Series, 120ZB). The 120ZB and EMPHAZE™ depth filters are both positively charged, and the XOSP depth filer is negatively charged at pH>4.5.

Figure 16:
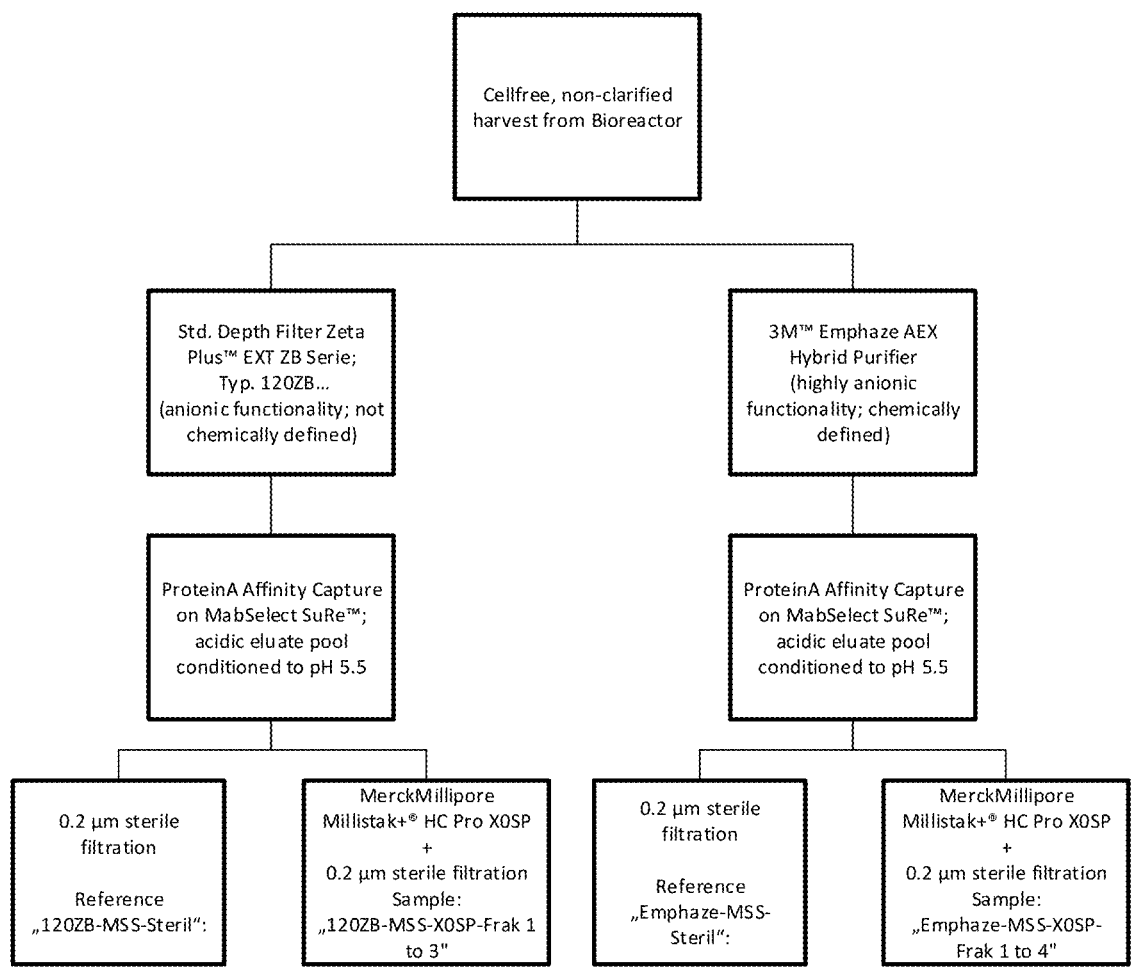
FIG. 16 shows a schematic of purification workflows.

The experimental workflow and assignment of sample names is illustrated in FIG. 16. Briefly, cell-free harvest fluid with a turbidity of about 80 NTU and containing a TYRP1 TCB antibody was collected from a bioreactor for use as load material for the described experiments. Prior to Protein A chromatography, one portion of the cell-free harvest fluid was filtered using a 120ZB depth filter and a second portion was filtered using an EMPHAZE™ depth filter. Both filtrates were then sterile filtered and subjected to Protein A chromatography using MABSELECT SURE™ media from GE Healthcare. The eluates from the 120ZB depth filter workflow and the EMPHAZE™ depth filter workflow were each titrated to pH 5.5 with 1 M TRIS/HCl, pH 9.0. For each workflow, the titrated eluate was divided into aliquots; one aliquot was sterile filtered using a 0.2 µm sterile filter and kept as a reference and a second aliquot (about 100 mL to about 120 mL) was filtered using a small-scale MerckMillipore Millistak+® HC Pro XOSP filter (5 cm² filter area). From the 120ZB workflow, three fraction of eluate from XOSP filtration were collected. From the EMPHAZE™ workflow, four fraction of eluate from XOSP filtration were collected. Each XOSP eluate fraction was subsequently filtered using a 0.2 µm sterile filter.

Figure 17:
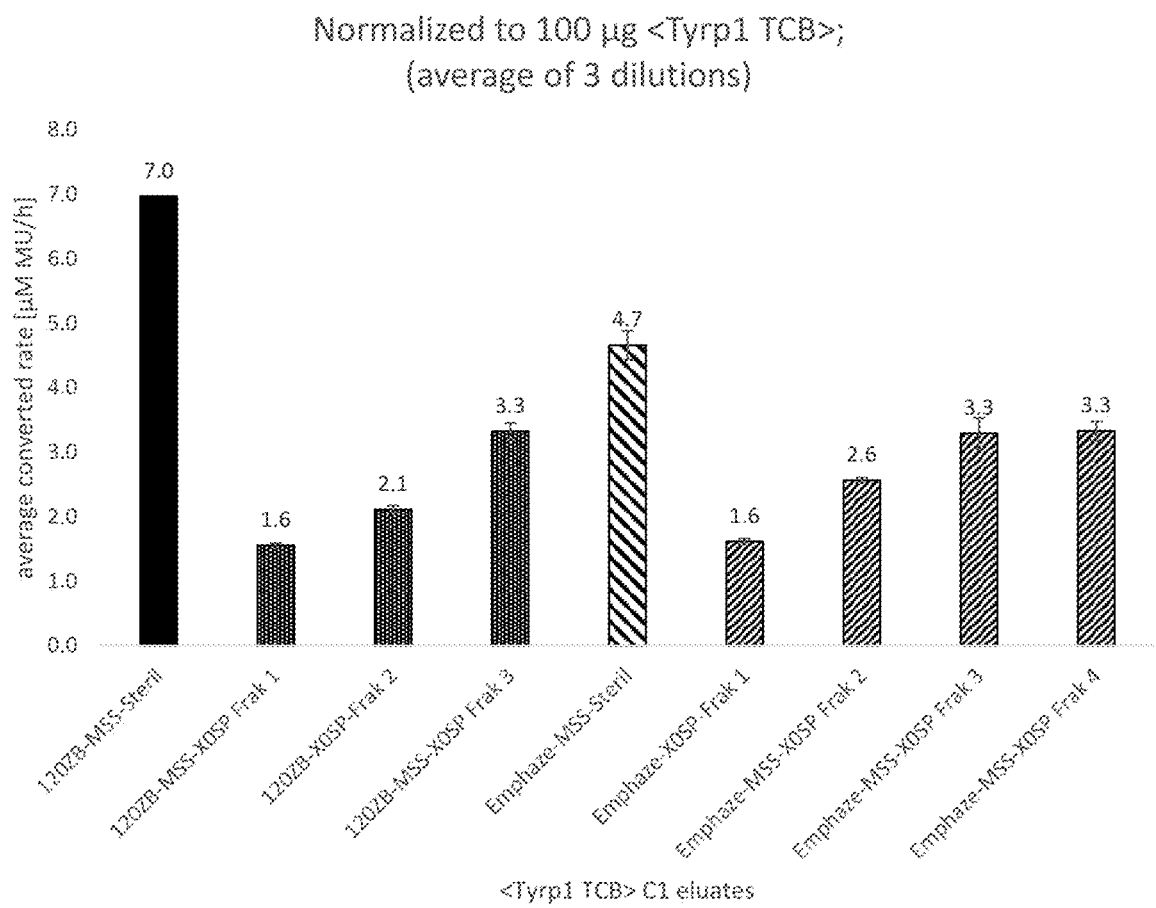
FIG. 17 shows a bar graph of the average conversion rate of compositions obtained from purification platforms as measured using a LEAP assay.

Each resulting aliquot was then analyzed by the LEAP assay according to the methods provided in Example 1. Comparison of the LEAP assay results shows that both pre-C1 depth filter workflows worked well to reduce hydrolytic activity, and that the XOSP filter significantly reduces the hydrolytic activity of the output of the capture column (FIG. 17). Comparison of the 120ZB and EMPHAZE™ workflows shows that the Protein A eluate of the EMPHAZE™ filtered material has 33% less hydrolytic activity as compared to the 120ZB filtered Protein A eluate (FIG. 17).

Example 10

This example demonstrates the evaluation and comparison of purifying different HCCF samples containing TYRP1 TCB antibodies (such as disclosed in PCT/EP2019/08614, which is incorporated herein by reference in its entirety) using a purification platform that includes a XOSP depth filtration step performed on a protein A chromatography eluate.

Two different HCCF samples were prepared (CF 238 and CF 239) from the separate cultivation of cells producing TYRP1 TCB antibodies. Protein A chromatography was performed using MABSELECT SURE™ media. The eluates were collected (CF 238 MSS eluate and CF 239 MSS eluate), each titrated to pH 5.5 with 1 M TRIS/HCl, pH 9.0, and then subjected to XOSP depth filtration. Specifically, 35 L of CF 238 MSS eluate or 20 L of the CF239 MSS eluate, respectively, were filtered over a XOSP filter (1 m² or 0.55 m², respectively) with a flow rate of 160 L/m²/h. In parallel, aliquots of the CF 238 and CF 239 HCCF samples were each purified using a reference purification platform that did not include the XOSP depth filtration step after protein A chromatography.

Figure 18A:
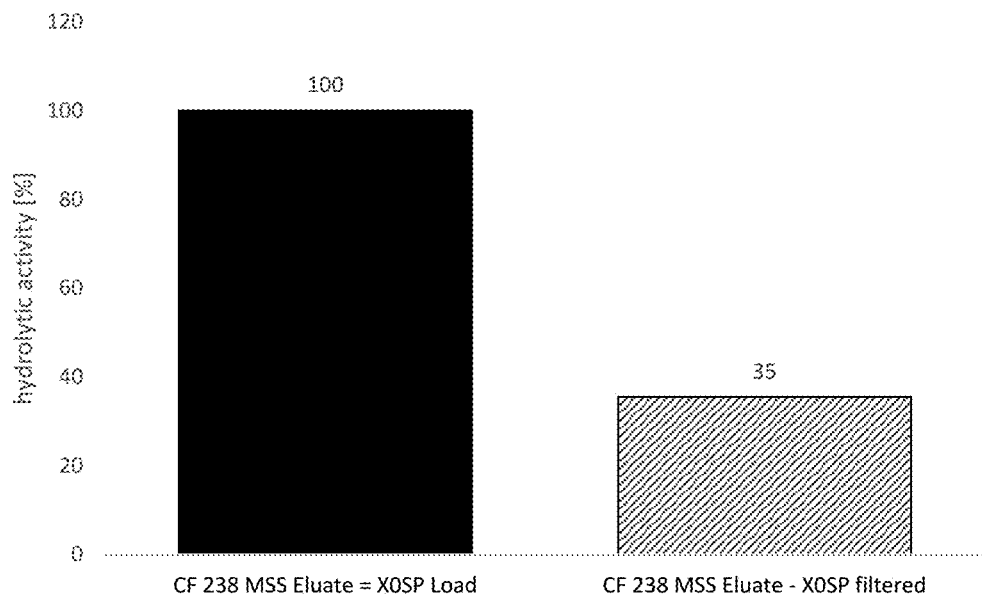
FIGS. 18A and 18B show bar graphs of the hydrolytic activity of compositions obtained from purification platforms as measured using a lipase activity assay.
Figure 18B:
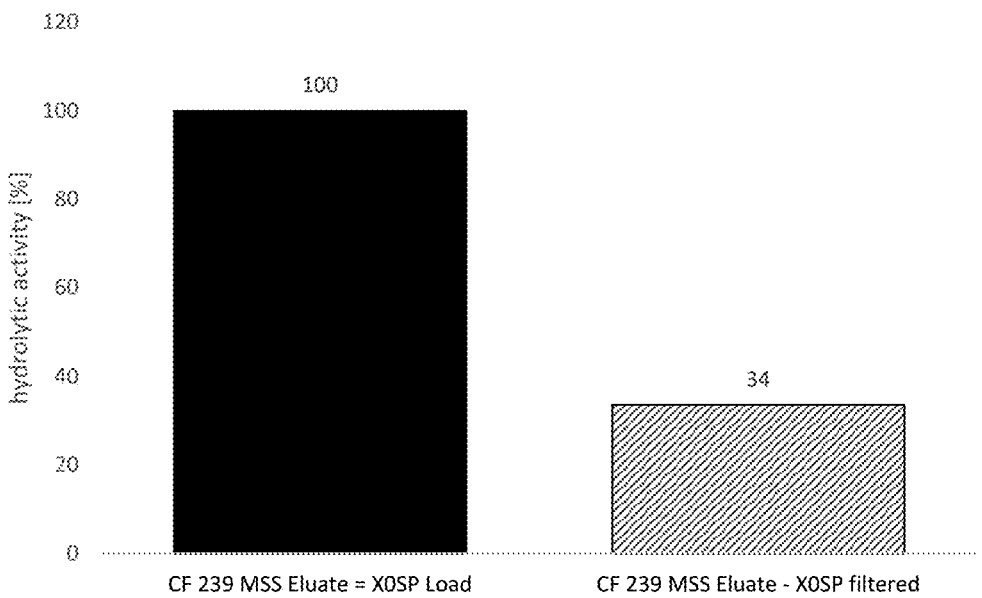

The lipase activity of each resulting eluate was performed as discussed in Example 1. Results of lipase activity obtained from the reference and the XOSP depth filter containing purification platforms for both CF 238 and CF 239 are shown in FIGS. 18A (CF 238) and 18B (CF 239). As illustrated in FIGS. 18A and 18B, the hydrolytic activity is significantly reduced in the eluate from the XOSP containing purification platform.

Example 11

This example demonstrates a comparison of purifying prasinezumab using four purification platforms incorporating different depth filtration steps for filtering conditioned affinity chromatography (protein A chromatography) eluate. Specifically, the four different depth filtration steps were based on the following: (i) PDD1; (ii) XOSP; (iii) PDD1 followed by XOSP; and (iv) XOSP followed by PDD1.

The affinity chromatography eluate was conditioned to pH 6.0+/−0.2 with 2 M Tris. The PDD1 and XS0P filters were equilibrated with at least 220 ml of the corresponding buffer (25 mM Tris/acetate). Both filters were loaded with <200 L/m². The flow rate for the PDD1 and the XS0P filters was 11 ml/min. The pressure was controlled during the duration of the experiment. The eluate from the depth filters was fractionated after 100 L/m² and 200 L/m².

Figure 19A:
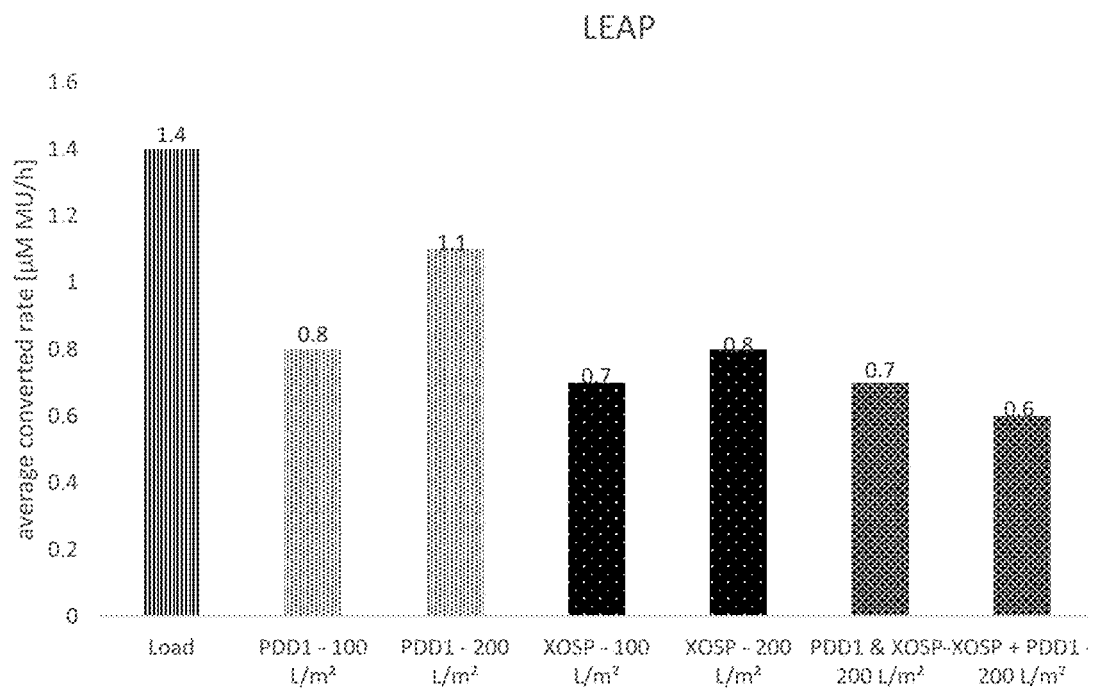
FIG. 19A shows a bar graph of the average conversion rate of compositions obtained from purification platforms as measured using a LEAP assay.
Figure 19B:
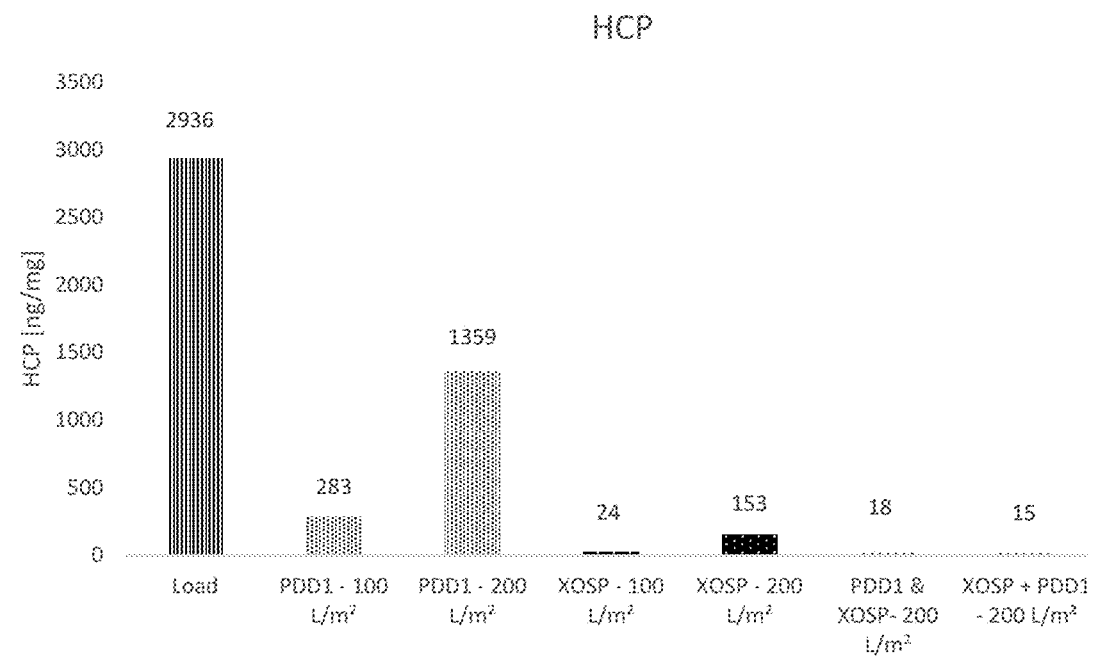
FIG. 19B shows a bar graph of the hydrolytic activity of compositions obtained from purification platforms as measured using a lipase activity assay.

The lipase activity and HCP amounts in a protein A chromatography eluate of a reference approach (without depth filtration; load) were compared to eluate collected following each depth filtration step of the four purification platforms. The lipase activity assay was performed according to Example 1. Results of lipase activity in fractions obtained from the depth filters are shown in FIG. 19A. Results of HCP measurements are shown in FIG. 19B.

What is claimed is:

1. A method of reducing an enzymatic hydrolysis activity rate of a composition obtained from a purification platform, the method comprising subjecting a sample to the purification platform comprising, in order:
   (a) a capture step comprising processing via affinity chromatography; and
   (b) a purification step comprising processing via a chromatography selected from the group consisting of a HIC, a cation exchange chromatography, and a multimodal chromatography,
   wherein the purification platform further comprises one or more depth filtration steps,
      wherein the one or more depth filtration steps are performed at any one or more of: prior to the capture step; after the capture step; or after the capture step and prior to the purification step,
   wherein each depth filtration step comprises processing via a depth filter, and
   wherein the depth filter comprises materials selected from the group consisting of:
      (i) a silica filter aid and a polyacrylic fiber pulp; and
      (ii) cellulose fibers, diatomaceous earth, and perlite,
         wherein the depth filter comprising the cellulose fibers, diatomaceous earth, and perlite comprises two layers, wherein each layer comprises a cellular filter matrix impregnated with a filter aid comprising one or more of diatomaceous earth or perlite, and wherein each layer further comprises a resin binder,
   thereby reducing the enzymatic hydrolysis activity rate of the composition as compared to purification of the sample using the same purification platform without the one or more depth filtration steps.

2. The method of claim 1, wherein the relative reduction of the enzymatic hydrolysis activity rate of the composition, as compared to purification of the sample using the same purification platform without the depth filtration step, is at least about 20%.

3. The method of claim 1, wherein the level of one or more hydrolytic enzymes in the composition obtained from the purification platform is reduced as compared to purification of the sample using the same purification platform without the one or more depth filtration steps, and wherein the relative reduction of the level of one or more hydrolytic enzymes in the composition, as compared to purification of the sample using the same purification platform without the depth filtration step, is at least about 20%.

4. The method of claim 1, wherein the degradation of a polysorbate in the composition obtained from the purification platform is reduced as compared to purification of the sample using the same purification platform without the one or more depth filtration steps, and wherein the relative reduction of degradation of the polysorbate in the composition, as compared to purification of the sample using the same purification platform without the depth filtration step, is at least about 5%.

5. The method of claim 1, wherein the depth filter is selected based on the pH of the solution entering the depth filter, and wherein the depth filter comprising the silica filter aid and the polyacrylic fiber pulp is selected when the solution entering the depth filter is about 5 to about 6.5.

6. The method of claim 1, wherein the HIC is a phenyl SEPHAROSE® fast flow chromatography.

7. The method of claim 1, wherein the cation exchange chromatography is POROS®50HS.

8. The method of claim 1, wherein the purification platform further comprises a second depth filtration step comprising processing via the depth filter comprising the silica filter aid and the polyacrylic fiber pulp, and wherein the second depth filtration step occurs after the capture step and prior to the purification step.

9. The method of claim 1, wherein the multimodal chromatography is Capto Adhere.

10. The method of claim 1, wherein the purification platform further comprises a second depth filtration step comprising processing via a depth filter comprising a hydrogel Q-functionalized non-woven media and a multi-zone microporous membrane, and wherein the second depth filtration step occurs after the capture step and prior to the purification step.

11. The method of claim 1, wherein the purification platform is for purification of a target from the sample, wherein the sample comprises the target and one or more host cell impurities, and wherein the host cell impurity is a host cell protein.

12. The method of claim 1, wherein the purification platform further comprises a virus inactivation step, wherein the virus inactivation step is performed after the capture step.

13. The method of claim 12, wherein the one or more depth filtration steps are performed after the virus inactivation step.

14. The method of claim 1, wherein the purification platform further comprises an ultrafiltration/diafiltration (UFDF) step, and wherein the UFDF step is performed after the purification step.

15. The method of claim 1, further comprising determining the enzymatic hydrolysis activity rate of the composition.

16. The method of claim 1, further comprising determining the level of one or more hydrolytic enzymes in the composition.

17. The method of claim 1, wherein the sample comprises one or more host cell proteins, wherein one of the one or more host cell proteins is a hydrolytic enzyme, and wherein the hydrolytic enzyme is a lipase, an esterase, a thioesterase, a phospholipase, or a ceramidase.

18. The method of claim 1, wherein the affinity chromatography is a protein A chromatography from FcXL affinity chromatography or MABSELECT SURE™.

* * * * *